(12) United States Patent
Jewett et al.

(10) Patent No.: US 12,503,715 B2
(45) Date of Patent: Dec. 23, 2025

(54) CELL-FREE EXTRACT PREPARATION PROTOCOL FOR ENRICHMENT OF MEMBRANE VESICLES AND INCREASED GLYCOPROTEIN YIELDS

(71) Applicant: Northwestern University, Evanston, IL (US)

(72) Inventors: Michael C. Jewett, Evanston, IL (US); Jasmine M. Hershewe, Evanston, IL (US); Katherine F. Warfel, Evanston, IL (US)

(73) Assignee: Northwestern University, Evanston, IL (US)

( * ) Notice: Subject to any disclaimer, the term of this patent is extended or adjusted under 35 U.S.C. 154(b) by 839 days.

(21) Appl. No.: 17/771,590

(22) PCT Filed: Oct. 26, 2020

(86) PCT No.: PCT/US2020/057325
§ 371 (c)(1),
(2) Date: Apr. 25, 2022

(87) PCT Pub. No.: WO2021/081485
PCT Pub. Date: Apr. 29, 2021

(65) Prior Publication Data
US 2022/0380826 A1 Dec. 1, 2022

Related U.S. Application Data

(60) Provisional application No. 62/926,166, filed on Oct. 25, 2019.

(51) Int. Cl.
*C12P 21/00* (2006.01)
*C12N 9/10* (2006.01)

(52) U.S. Cl.
CPC .......... *C12P 21/005* (2013.01); *C12N 9/1081* (2013.01); *C12Y 204/99019* (2015.07)

(58) Field of Classification Search
CPC ............................... C12P 21/005; C12P 19/18
See application file for complete search history.

(56) References Cited

U.S. PATENT DOCUMENTS

| | | |
|---|---|---|
| 4,496,538 A | 1/1985 | Gordon |
| 4,727,136 A | 2/1988 | Jennings et al. |
| 5,478,730 A | 12/1995 | Akakhov et al. |
| 5,556,769 A | 9/1996 | Wu et al. |
| 5,623,057 A | 4/1997 | Marburg et al. |
| 5,665,563 A | 9/1997 | Beckler |
| 5,679,352 A | 10/1997 | Chong et al. |
| 6,168,931 B1 | 1/2001 | Swartz et al. |
| 6,248,334 B1 | 6/2001 | Lees et al. |
| 6,531,131 B1 | 3/2003 | Gu et al. |
| 6,869,774 B2 | 3/2005 | Endo et al. |
| 6,994,986 B2 | 2/2006 | Swartz et al. |
| 7,118,883 B2 | 10/2006 | Inoue et al. |
| 7,189,528 B2 | 3/2007 | Higashide et al. |
| 7,338,789 B2 | 3/2008 | Swartz et al. |
| 7,387,884 B2 | 6/2008 | Suzuki et al. |
| 7,399,610 B2 | 7/2008 | Shikata et al. |
| 8,703,471 B2 | 4/2014 | Aebi et al. |
| 8,999,668 B2 | 4/2015 | DeLisa et al. |
| 9,399,057 B2 | 7/2016 | Boyen et al. |
| 10,987,432 B2 | 4/2021 | Huang et al. |
| 2004/0209321 A1 | 10/2004 | Swartz et al. |
| 2005/0054044 A1 | 3/2005 | Swartz et al. |
| 2005/0170452 A1 | 8/2005 | Wildt et al. |
| 2006/0211085 A1 | 9/2006 | Bobrowicz |
| 2006/0234345 A1 | 10/2006 | Schwartz et al. |
| 2006/0252672 A1 | 11/2006 | Betenbaugh et al. |
| 2006/0257399 A1 | 11/2006 | Gerngross et al. |
| 2006/0286637 A1 | 12/2006 | Hamilton |
| 2007/0026485 A1 | 2/2007 | DeFrees et al. |
| 2007/0154983 A1 | 7/2007 | Calhoun et al. |
| 2007/0178551 A1 | 8/2007 | Gerngross |
| 2008/0138857 A1 | 6/2008 | Swartz et al. |
| 2009/0317862 A1 | 12/2009 | Imataka et al. |
| 2012/0171720 A1 | 7/2012 | Church et al. |
| 2014/0045267 A1 | 2/2014 | LaJoie |
| 2014/0255987 A1 | 9/2014 | DeLisa |
| 2014/0295492 A1 | 10/2014 | Jewett et al. |
| 2015/0259757 A1 | 9/2015 | Jewett et al. |
| 2018/0016612 A1 | 1/2018 | Jewett et al. |
| 2018/0016614 A1 | 1/2018 | Jewett et al. |

(Continued)

FOREIGN PATENT DOCUMENTS

| | | |
|---|---|---|
| WO | 2003056914 A1 | 7/2003 |
| WO | 2004013151 A2 | 2/2004 |

(Continued)

OTHER PUBLICATIONS

Kim et al., "A Highly Efficient and Economical Cell-free Protein Synthesis System Using the S12 Extract of *Escherichia coli*", Biotechnology and Bioprocess Engineering, vol. 13, pp. 464-469. (Year: 2008).*

(Continued)

*Primary Examiner* — Michelle F. Paguio Frising
*Assistant Examiner* — Grant C Currens
(74) *Attorney, Agent, or Firm* — Quarles & Brady LLP

(57) ABSTRACT

Disclosed are protocols for preparing cell-free extracts preparation protocols that are enriched in membrane vesicles and use of the disclosed extract in cell-free glycoprotein synthesis methods and platforms for increasing glycoprotein yields.

3 Claims, 45 Drawing Sheets

(56) References Cited

U.S. PATENT DOCUMENTS

| | | | |
|---|---|---|---|
| 2018/0298416 A1* | 10/2018 | Jewett | C12N 1/20 |
| 2018/0325998 A1 | 11/2018 | Leonard et al. | |
| 2019/0284600 A1 | 9/2019 | Jewett et al. | |

FOREIGN PATENT DOCUMENTS

| | | |
|---|---|---|
| WO | 2004035605 A2 | 4/2004 |
| WO | 2006102652 A2 | 9/2006 |
| WO | 2006119987 A2 | 11/2006 |
| WO | 2007120932 A2 | 10/2007 |
| WO | 2013067523 A1 | 5/2013 |
| WO | 2019035916 A1 | 2/2019 |

OTHER PUBLICATIONS

Sun, Z.Z. et al. Protocols for implementing an *Escherichia coli* based TX-TL cell-free expression system for synthetic biology_ J Vis Exp, e50762 (2013).
Tan, T., et al., "Hydrogen sulfide formation as well as ethanol production in different media by cysND-and/or cysIJ-inactivated mutant strains of Zymomonas mobilis ZM4", Bioprocess and biosystems engineering, 2013, vol. 36, No. 10, pp. 1363-1373.
Tarui, H., Imanishi, S. & Hara, T. A novel cell-free translation/glycosylation system prepared from insect cells. J Biosci Bioeng 90, 508-14 (2000).
Thomassin, JL., et al., "Both group 4 capsule and lipopolysaccharide O-antigen contribute to enteropathogenic *Escherichia coli* resistance to human alpha-defensin 5", PloS One, 2013, vol. 8, No. 12, pp. 1-12.
Weerapana, E. & Imperiali, B. Asparagine-linked protein glycosylation: from eukaryotic to prokaryotic systems. Glycobiology 16, 91R-101R (2006).
Wolfert, M.A. & Boons, G.J. Adaptive immune activation: glycosylation does matter. Nat Chem Biol 9, 776-84 (2013).
Zhu, Y., et al., "Construction and characterization of pta gene-deleted mutant of Clostridium tyrobutyricum for enhanced butyric acid fermentation", Biotechnology and Bioengineering, 2005, vol. 90, No. 2, pp. 154-166.
Lingappa, Vishwanath R., et al. "Coupled cell-free synthesis, segregation, and core glycosylation of a secretory protein." Proceedings of the National Academy of Sciences 75.5 (1978): 2338-2342.
Anders Pedersen et al: "Rational improvement of cell-free protein synthesis", New Biotechnology, vol. 28, No. 3, Apr. 3, 2011 (Apr. 3, 2011), pp. 218-224.
Kim T W et al: "Simple procedures for the construction of a robust and cost-effective cell-free protein synthesis system", Journal of Biotechnology, Elsevier, Amsterdam NL, vol. 126, No. 4, Dec. 1, 2006 (Dec. 1, 2006), pp. 554-561.
Hershewe Jasmine M. et al: "Improving cell-free glycoprotein synthesis by characterizing and enriching native membrane vesicles", Nature Communications, vol. 12, No. 1, Apr. 22, 2021 (Apr. 22, 2021).
European Search Report, corresponding to EP 20 87 9701, dated Nov. 24, 2023.
Hamilton, S.R. et al. Production of complex human glycoproteins in yeast. Science 301, 1244-6 (2003).
Hayes, C. Biomolecular Breadboards:Protocols:cost estimate. http://www.openwetware.org/wiki/Biomolecular_Breadboards:Protocols:cost_estimate. vol. 2017 (2012).
Hebert, D.N., Lamriben, L., Powers, E.T. & Kelly, J.W. The intrinsic and extrinsic effects of N-linked glycans on Jlycoproteostasis. Nat Chem Biol 10, 902-910 (2014).
Helenius, A. & Aebi, M. Intracellular functions of N-linked glycans. Science 291, 2364-9 (2001).
Imperiali, B. & O'Connor, S.E. Effect of N-linked glycosylation on glycopeplide and glycoprotein structure. Curr Opin Chem Biol 3, 643-9 (1999).
International Preliminary Report on Patentability for PCT/US2016/069512 dated Jul. 12, 2018.

International Search Report and Written Opinion for PCT/US2016/069512 dated Apr. 20, 2017.
Jackson, K., Kanamori, T., Ueda, T. & Fan, Z.H. Protein synthesis yield increased 72 limes in the cell-free Pure system. Integr Biol {Camb) 6, 781-8 (2014).
Jaroentomeechai, T. et al. A Pipeline for Studying and Engineering Single-Subunit Oligosaccharyltransferases. Methods Enzymol 597, 55-81 (2017).
Jervis, A.J. et al. Characterization of the structurally diverse N-linked glycans of *Campylobacter* species. J Bacteriol 194, 2355-62 (2012).
Kaiser, L. et al. Efficient cell-free production of olfactory receptors: detergent optimization, structure, and ligand binding analyses. Proc Nall Acad Sci US A 105, 15726-31 (2008).
Karim, A.S. & Jewett, M.C. A cell-free framework for rapid biosynthetic pathway prototyping and enzyme discovery. Melab Eng 36, 116-126 (2016).
Kienesberger, S., et al., "Comparative genome analysis of *Campylobacter fetus* subspecies revealed horizontally acquired genetic elements important for virulence and niche specificity", PLoS One, 2014, vol. 9, No. 1, pp. 1-13.
Kiga, D. et al. An engineered *Escherichia coli* tyrosyl-tRNA synthetase for site-specific incorporation of an unnatural mino acid into proteins in eukaryotic translation and its application in a wheat germ cell-free system. Proc Nall Acad Sci US A 99, 9715-20 (2002).
Kightlinger, W. et al. Design of glycosylation sites by rapid synthesis and analysis of glycosyltransferases. Nat Chem Biol (2018).
Kowarik, M. et al. N-linked glycosylation of folded proteins by the bacterial oligosaccharyltransferase. Science 314, 1148-50 (2006).
Kwon, Y.C. & Jewett, M.C. High-throughput preparation methods of crude extract for robust cell-free protein synthesis. Sci Rep 5, 8663 (2015).
Lanclol, P.M., Gage, F.H. & Varki, A.P. The glycans of stem cells. Curr Opin Chem Biol 11, 373-80 (2007).
Liu, D. & Reeves, P.R. *Escherichia coli* K12 regains its O antigen. Microbiology 140 { PI 1), 49-57 (1994).
Lizak, C., Gerber, S., Numao, S., Aebi, M. & Locher, K.P. X-ray structure of a bacterial oligosaccharyltransferase. Nature 474, 350-5 (2011).
Martin, R.W. et al. Cell-free protein synthesis from genomically recoded bacteria enables multisite incorporation of oncanonical amino acids. Nat Commun 9, 1203 (2018).
Matsuoka, K., Komori, H., Nose, M., Endo, Y. & Sawasaki, T. Simple screening method for autoantigen proteins using he N-terminal biolinylaled protein library produced by wheat cell-free synthesis. J Proteome Res 9, 4264-73 (2010).
Merrill, J.H., Ollis, A.A., Fisher, A.G. & Delisa, M.P. Glycans-by-design: engineering bacteria for the biosynthesis of complex glycans and glycoconjugates. Biotechnol Bioeng 110, 1550-64 (2013).
Meuris, L. et al. GlycoDelete engineering of mammalian cells simplifies N-glycosylation of recombinant proteins. Nat Biotechnol 32, 485-9 (2014).
Mikami, S., Kobayashi, T., Yokoyama, S. & Imalaka, H. A hybridoma-based in vitro translation system that efficiently synthesizes glycoproteins. J Biotechnol 127, 65-78 (2006).
Moore, S.J. et al. Rapid acquisition and model-based analysis of cell-free transcription-translation reactions from onmodel bacteria. Proc Nall Acad Sci U S A 115, E4340-E4349 (2018).
Moreno, S.N., Ip, H.S. & Cross, G.A. An mRNA-dependent in vitro translation system from Trypanosoma brucei. Mol Biochem Parasitol 46, 265-74 (1991).
Musumeci, M.A. et al. In vitro activity of Neisseria meningitidis Pgll O-oligosaccharyltransferase with diverse synthetic ipid donors and a UDP-activated sugar. J Biol Chem 288, 10578-87 (2013).
Narang et al., 1979, Meth. Enzymol. 68:90-99.
Olllis, A.A. et al. Substitute sweeteners: diverse bacterial oligosaccharyltransferases with unique N-glycosylation site preferences. Sci Rep 5, 15237 (2015).
Olllis, A.A., Zhang, S., Fisher, A.G. & Delisa, M.P. Engineered oligosaccharyltransferases with greatly relaxed cceptor-site specificity. Nat Chem Biol 10, 816-22 (2014).
Owczarzy et al., 2008, Biochemistry, 47: 5336-5353.
Pardee, K. et al. Paper-based synthetic gene networks. Cell 159, 940-54 (2014).

(56) References Cited

OTHER PUBLICATIONS

Pettersen, E.F. et al. UCSF Chimera-a visualization system for exploratory research and analysis. J Comput Chem 25, 1605-12 (2004).
Raman, R., Raguram, S., Venkataraman, G., Paulson, J.C. & Sasisekharan, R. Glycomics: an integrated systems approach to structure-function relationships of glycans. Nat Methods 2, 817-24 (2005).
Ramirez, A.S. et al. Characterization of the single-subunit oligosaccharyltransferase STT3A from Trypanosoma brucei using synthetic peptides and lipid-linked oligosaccharide analogs. Glycobiology 27, 525-535 (2017).
Rothblatt, J.A. & Meyer, D.I. Secretion in yeast: reconstitution of the translocation and glycosylation of alpha-factor and invertase in a homologous cell-free system. Cell 44, 619-28 (1986).
Rudd, P.M. & Dwek, R.A. Glycosylation: heterogeneity and the 3D structure of proteins. Grit Rev Biochem Mol Biol 32, 1-100 (1997).
Rudd, P.M., Elliott, T., Cresswell, P., Wilson, I.A. & Dwek, R.A. Glycosylation and the immune system. Science 291, 2370-6 (2001).
Salehi, A.S. et al. Cell-free protein synthesis of a cytotoxic cancer therapeutic: Onconase production and a just-add-watercell-free system. Biotechnol J 11, 274-81 (2016).
Sambrook et al., 1989, Molecular Cloning—A Laboratory Manual, Cold Spring Harbor Laboratory, Cold Spring Harbor, New York; Wetmur, 1991, Critical Review in Biochem. and Mol. Biol. 26(3/4):227-259.
Schoborg, J.A. et al. A cell-free platform for rapid synthesis and testing of active oligosaccharyltransferases. Biotechno Bioeng 115, 739-750 (2018).
Schwarz, F. et al. A combined method for producing homogeneous glycoproteins with eukaryotic N-glycosylation. Natchem Biol 6, 264-6 (2010).
Schwarz, F. et al. Relaxed acceptor site specificity of bacterial oligosaccharyltransferase in vivo. Glycobiology 21, 15-54 (2011).
Scott, NE., et al., "Comparative proteomics and glycoproteomics reveal increased N-linked glycosylation and relaxed sequon specificity in Campylobacter jejuni NCTC11168 O", Journal of Proteome Research, 2014, vol. 13, No. 11, pp. 5136-5150.
Shibutani, M., Kim, E., Lazarovici, P., Oshima, M. & Guroff, G. Preparation of a cell-free translation system from PC12 cell. Neurochem Res 21, 801-7 (1996).
Sinclair, A.M. & Elliott, S. Glycoengineering: the effect of glycosylation on the properties of therapeutic proteins. J Pharm Sci 94, 1626-35 (2005).
Srichaisupakit, A., Ohashi, T., Misaki, R. & Fujiyama, K. Production of initial-stage eukaryotic N-glycan and its protein glycosylation in Escherichia coli. J Biosci Bioeng 119, 399-405 (2015).
Stapleton, J.A. & Swartz, J.R. Development of an in vitro compartmentalization screen for high-throughput directed volution of [FeFe] hydrogenases. PLoS One 5, e15275 (2010).
Stech, M. et al. Cell-free synthesis of functional antibodies using a coupled in vitro transcription-translation system based on CHO cell lysates. Sci Rep 7, 12030 (2017).
Liguori, L., Marques, B. & Lenormand, J. L. A bacterial cell-free expression system to produce membrane proteins and proteoliposomes: From cDNA to functional assay. Current Protocols in Protein Science (2008) doi:10.1002/0471140864.ps0522s54.
Liu, D. V., Zawada, J. F. & Swartz, J. R. Streamlining *Escherichia Coli* S30 extract preparation for economical cell-free protein synthesis. Biotechnol. Prog. (2005) doi:10.1021/bp049789y.
Liu, X. et al. Design of a Transcriptional Biosensor for the Portable, On-Demand Detection of Cyanuric Acid. ACS Synth. Biol. acssynbio. 9b00348 (2019) doi:10.1021/acssynbio.9b00348.
Martin, R. W. et al. Cell-free protein synthesis from genomically recoded bacteria enables multisite incorporation of noncanonical amino acids. Nat. Commun. (2018) doi:10.1038/s41467-018-03469-5.
Matthies, D. et al. Cell-free expression and assembly of ATP synthase. J. Mol. Biol. (2011) doi: 10.1016/j.jmb.2011.08.055.

McBroom, A. J., Johnson, A. P., Vemulapalli, S. & Kuehn, M. J. Outer membrane vesicle production by *Escherichia coli* is independent of membrane instability. J. Bacteriol. 188, 5385-5392 (2006).
Meyer, A. J. et al. Organism engineering for the bioproduction of the triaminotrinitrobenzene (TATB) precursor phloroglucinol (PG). ACS Synth. Biol. 8, acssynbio.9b00393 (2019).
Mol, E. A., Goumans, M. J., Doevendans, P. A., Sluijter, J. P. G. & Vader, P. Higher functionality of extracellular vesicles isolated using size-exclusion chromatography compared to ultracentrifugation. Nanomedicine Nanotechnology, Biol. Med. 13, 2061-2065 (2017).
Monguió-Tortajada, M., Gálvez-Montón, C., Bayes-Genis, A., Roura, S. & Borràs, F. E. Extracellular vesicle isolation methods: rising impact of size-exclusion chromatography. Cell. Mol. Life Sci. 76, 2369-2382 (2019).
Natarajan, A. et al. Engineering orthogonal human O-linked glycoprotein biosynthesis in bacteria. Nat. Chem. Biol. (2020) doi:10.1038/s41589-020-0595-9.
Oza, J. P. et al. Robust production of recombinant phosphoproteins using cell-free protein synthesis. Nat. Commun. (2015) doi:10.1038/ncomms9168.
Pan, C. et al. Biosynthesis of conjugate vaccines using an O-linked glycosylation system. MBio 7, (2016).
Pardee, K. et al. Paper-based synthetic gene networks. Cell 159, 940-954 (2014).
Pardee, K. et al. Portable, On-Demand Biomolecular Manufacturing. Cell 167, 248-259.e12 (2016).
Pardee, K. et al. Rapid, Low-Cost Detection of Zika Virus Using Programmable Biomolecular Components. Cell 165, 1255-1266 (2016).
Sachse, R. et al. Synthesis of membrane proteins in eukaryotic cell-free systems. Eng. Life Sci. 13, 39-48 (2013).
Sachse, R., Dondapati, S. K., Fenz, S. F., Schmidt, T. & Kubick, S. Membrane protein synthesis in cell-free systems: From bio-mimetic systems to bio-membranes. FEBS Letters (2014) doi:10.1016/j.febslet.2014.06.007.
Salehi, A. S. M. et al. Cell-Free Protein Synthesis Approach to Biosensing hTRβ-Specific Endocrine Disruptors. Anal. Chem. 89, 3395-3401 (2017).
Silverman, A. D., Karim, A. S. & Jewett, M. C. Cell-free gene expression: an expanded repertoire of applications. Nat. Rev. Genet. 1-20 (2019) doi:10.1038/s41576-019-0186-3.
Schuwirth, B. S. et al. Structures of the bacterial ribosome at 3.5 A resolution. Science 310, 827-34 (2005).
Schwarz, F. et al. Relaxed acceptor site specificity of bacterial oligosaccharyltransferase in vivo. Glycobiology (2011) doi:10.1093/glycob/cwq130.
Silverman, A. D., Akova, U., Alam, K. K., Jewett, M. C. & Lucks, J. B. Design and optimization of a cell-free atrazine biosensor. ACS Synth. Biol. 9, 671-677 (2020).
Stark, J. C. et al. BioBits Health: Classroom Activities Exploring Engineering, Biology, and Human Health with Fluorescent Readouts. ACS Synth. Biol. 8, 1001-1009 (2019).
Stark, J. C. et al. BioBitsTM Bright: A fluorescent synthetic biology education kit. Sci. Adv. 4, (2018).
Stark, J. C. et al. On-demand, cell-free biomanufacturing of conjugate vaccines at the point-of-care. bioRxiv (2019) doi:10.1101/681841.
Thavarajah, W., Jewett, M. C. & Lucks, J. B. Point-of-Use Detection of Environmental Fluoride via a Cell-Free Riboswitch-Based Biosensor. (2019) doi:10.1021/acssynbio.9b00347.
Valderrama-Rincon, J. D. et al. An engineered eukaryotic protein glycosylation pathway in *Escherichia coli*. Nat. Chem. Biol. 8, 434-436 (2012).
Voyvodic, P. L. et al. Plug-and-play metabolic transducers expand the chemical detection space of cell-free biosensors. Nat. Commun. 10, 1-8 (2019).
Zawada, J. F. et al. Microscale to manufacturing scale-up of cell-free cytokine production—a new approach for shortening protein production development timelines. Biotechnol Bioeng 108, 1570-1578 (2011).
Young, N. M. et al. Structure of the N-linked glycan present on multiple glycoproteins in the gram-negative bacterium, Campylobacter jejuni. J. Biol. Chem. (2002) doi:10.1074/jbc.M206114200.

(56) References Cited

OTHER PUBLICATIONS

Zemella, A. et al. Cell-free protein synthesis as a novel tool for directed glycoengineering of active erythropoietin. Sci. Rep. 8, 1-12 (2018).
Zemella, A., Thoring, L., Hoffmeister, C. & Kubick, S. Cell-Free Protein Synthesis: Pros and Cons of Prokaryotic and Eukaryotic Systems. ChemBioChem 16, 2420-2431 (2015).
Hershewe, Jasmine. "Characterization and enrichment of membrane-bound components in Escherichia coli cell-free protein synthesis extracts: applications in glycoprotein production." Recent Advances In Fermentation Technology (RAFT 13). SIMB, 2019.
Jaroentomeechai, T., Stark, J.C., Jewett, M.C., & DeLisa, M.P., Navigating Glycospace with Escherichia coli-based Cell-Free GlycoProtein Synthesis (CF-GPS), presented at the International Conference on Biomolecular Engineering, Singapore, Jan. 5, 2016.
Ahn, J.H., Hwang, M.Y., Lee, K.H., Choi, C.Y. & Kim, D.M. Use of signal sequences as an in situ removable sequence lement to stimulate protein synthesis in cell-free extracts. Nucleic Acids Res 35, e21 (2007).
Albayrak, C. & Swartz, J.R. Cell-free co-production of an orthogonal transfer RNA activates efficient site-specific non-atural amino acid incorporation. Nucleic Acids Res 41, 5949-63 (2013).
Alberts et al., in Molecular Biology of the Cell, 3d edition, Garland Publishing, 1994.
Alemka, A., et al., "N-glycosylation of Campylobacter jejuni surface proteins promotes bacterial fitness, Infection and Immunity", 2013, vol. 81, No. 5, pp. 1674-1682.
Baba, T. et al. Construction of Escherichia coli K-12 in-frame, single-gene knockout mutants: the Keio collection. Mal Sys! Biol 2, 2006 0008 (2006).
Beaucage et al., 1981, Tetrahedron Letters 22:1859-1862.
Bundy, B.C. & Swartz, J.R. Site-specific incorporation of p-propargyloxyphenylalanine in a cell-free environment for direct protein-protein click conjugation. Bioconjug Chem 21, 255-63 (2010).
Chen, L. et al. Outer membrane vesicles displaying engineered glycotopes elicit protective antibodies. Proc Nall Acad Sci US A 113, E3609-18 (2016).
Datsenko, K.A. & Wanner, B.L. One-step inactivation of chromosomal genes in Escherichia coli K-12 using PCR products. Proc Nall Acad Sci U SA 97, 6640-5 (2000).
Dudley, et al. "Cell-Free Mixing of Escherichia coli Crude Extracts to Prototype and Rationally Engineer High-Titer Mevalonate Synthesis," ACS Synth Biol 5 (12), 1578-1588.
Feldman, M.F. et al. Engineering N-linked protein glycosylation with diverse O antigen lipopolysaccharide structures in Escherichia coli. Proc Nall Acad Sci US A 102, 3016-21 (2005).
Glover, K.J., Weerapana, E., Numao, S. & Imperiali, B. Chemoenzymatic synthesis of glycopeptides with PgIB, a bacterial oligosaccharyl transferase from Campylobacter jejuni. Chem Biol 12, 1311-5 (2005).
Goodchild, 1990, Bioconjugate Chemistry 1(3): 165-187.
Goshima, N. et al. Human protein factory for converting the transcriptome into an in vitro-expressed proteome. Nature Methods 5, 1011-1017 (2008).
Guarino, C. "Investigating Oligosaccharyltransferases Of N-Linked Glycosylation Using Escherichia coli." PhD Dissertation; Cornell University. 2013.
Hagelueken, G. et al. A coiled-coil domain acts as a molecular ruler to regulate O-antigen chain length in ipopolysaccharide. Nat Struct Mol Biol 22, 50-56 (2015).
Liu, D.V. et al. (2005) Streamlining Escherichia coli S30 Extract Preparation for Economical Cell-Free Protein Synthesis. Biotechnol. Prog. 21, 460-465.
Berrier C, et al. (2011) Coupled cell-free synthesis and lipid vesicle insertion of a functional oligomeric channel MscL. Biochim Biophys Acta—Biomembr 1808(1):41-46.
Boland C, et al. (2014) Cell-free expression and in meso crystallisation of an integral membrane kinase for structure determination. Cell Mol Life Sci 71(24):4895-4910.

Foshag D, et al. (2018) The E. coli S30 lysate proteome: A prototype for cell-free protein production. N Biotechnol. doi:10.1016/j.nbt.2017.09.005.
Guarino, C., & DeLisa, M. P. (2012). A prokaryote-based cell-free translation system that efficiently synthesizes glycoproteins. Glycobiology, 22(5), 596-601.
Hare JF, Olden K, Kennedy EP (1974) Heterogeneity of Membrane Vesicles from Escherichia coli and their Subfractionation with Antibody to ATPase. Proc Natl Acad Sci U S A 71:4843-4846.
Jaroentomeechai T, et al. (2018) Single-pot glycoprotein biosynthesis using a cell-free transcription-translation system enriched with glycosylation machinery. doi:10.1038/s41467-018-05110-x.
Jewett MC, Calhoun KA, Voloshin A, Wuu JJ, Swartz JR (2008) An integrated cell-free metabolic platform for protein production and synthetic biology. Mol Syst Biol 4:220.
Jewett MC, Swartz JR (2004) Mimicking theEscherichia coli cytoplasmic environment activates long-lived and efficient cell-free protein synthesis. Biotechnol Bioeng 86(1):19-26.
Kwon, YC, Jewett, MC (2015) High-throughput preparation methods of crude extract for robust cell-free protein synthesis. Sci Rep. 5:8663.
Patel L, Schuldiner S, Kaback HR (1975) Reversible effects of chaotropic agents on the proton permeability of Escherichia coli membrane vesicles* (active transport/membrane potential/ft-galactosides/amino acids/lipophiliccations/carbodiimides) Available at: https://www.pnas.org/content/pnas/72/9/3387.full.pdf [Accessed Oct. 23, 2019].
Schoborg JA, et al. (2017) A cell-free platform for rapid synthesis and testing of active oligosaccharyltransferases. Biotechnol Bioeng. doi:10.1002/bit.26502.
Wuu JJ, Swartz JR (2008) High yield cell-free production of integral membrane proteins without refolding or detergents. Biochim Biophys Acta—Biomembr 1778(5):1237-1250.
International Search Report and Written Opinion, corresponding to PCT/US2020/057325, dated Feb. 11, 2021.
Adiga, R. et al. Point-of-care production of therapeutic proteins of good-manufacturing-practice quality. Nat. Biomed. Eng. 2, (2018).
Aebersold, R. et al. How many human proteoforms are there? Nature Chemical Biology vol. 14 206-214 (2018).
Alaimo, C. et al. Two distinct but interchangeable mechanisms for flipping of lipid-linked oligosaccharides. EMBO J. 25, 967-976 (2006).
Bernath, K., Magdassi, S. & Tawfik, D. S. Directed evolution of protein inhibitors of DNA-nucleases by in vitro compartmentalization (IVC) and nano-droplet delivery. J. Mol. Biol. 345, 1015-1026 (2005).
Böing, A. N. et al. Single-step isolation of extracellular vesicles by size-exclusion chromatography. J. Extracell. Vesicles 3, (2014).
Borkowski, O. et al. Large scale active-learning-guided exploration for in vitro protein production optimization. Nat. Commun. 11, 1872 (2020).
Brödel, A. K. et al. IRES-mediated translation of membrane proteins and glycoproteins in eukaryotic cell-free systems. PLoS One 8, (2013).
Buntru, M., Vogel, S., Stoff, K., Spiegel, H. & Schillberg, S. A versatile coupled cell-free transcription-translation system based on tobacco BY-2 cell lysates. Biotechnol. Bioeng. 112, 867-878 (2015).
Calhoun, K. A. & Swartz, J. R. An economical method for cell-free protein synthesis using glucose and nucleoside monophosphates. Biotechnol. Prog. (2005) doi:10.1021/bp050052y.
Cappuccio, J. A. et al. Cell-free co-expression of functional membrane proteins and apolipoprotein, forming soluble nanolipoprotein particles. Mol. Cell. Proteomics (2008) doi:10.1074/mcp.M800191-MCP200.
Carlson, E. D., Gan, R., Hodgman, C. E. & Jewett, M. C. Cell-free protein synthesis: applications come of age. Biotechnol. Adv. 30, 1185-1194 (2012).
Caschera, F. & Noireaux, V. Synthesis of 2.3 mg/ml of protein with an all Escherichia coli cell-free transcription-translation system. Biochimie (2014) doi:10.1016/j.biochi.2013.11.025.
Cole, S. D. et al. Quantification of Interlaboratory Cell-Free Protein Synthesis Variability. ACS Synth. Biol. 8, 2080-2091 (2019).

(56) References Cited

OTHER PUBLICATIONS

Contreras-Llano, L. E. et al. Holistic engineering of cell-free systems through proteome-reprogramming synthetic circuits. Nat. Commun. 11, 1-10 (2020).

DeLisa, M. et al. Cell-free synthetic glycobiology: designing and engineering glycomolecules outside of living cells. Front. Chem. 8, 645 (2020).

Des Soye, B. J., Gerbasi, V. R., Thomas, P. M., Kelleher, N. L. & Jewett, M. C. A highly productive, one-pot cell-free protein synthesis platform based on genomically recoded *Escherichia coli*. Cell Chem. Biol. (2019) doi:10.1016/j.chembiol.2019.10.008.

Dudley, Q. M., Karim, A. S., Nash, C. J. & Jewett, M. C. Cell-free prototyping of limonene biosynthesis using cell-free protein synthesis. Metab. Eng. (2020) doi:10.1016/j.ymben.2020.05.006.

Faridmoayer, A. et al. Extreme substrate promiscuity of the Neisseria oligosaccharyl transferase involved in protein O-glycosylation. J. Biol. Chem. 283, 34596-34604 (2008).

Faridmoayer, A., Fentabil, M. A., Mills, D. C., Klassen, J. S. & Feldman, M. F. Functional characterization of bacterial oligosaccharyltransferases involved in O-linked protein glycosylation. J. Bacteriol. 189, 8088-8098 (2007).

Fishov, I. & Woldringh, C. L. Visualization of membrane domains in *Escherichia coli*. Mol. Microbiol. (1999) doi:10.1046/j.1365-2958.1999.01425.x.

Goerke, A. R. & Swartz, J. R. Development of cell-free protein synthesis platforms for disulfide bonded proteins. Biotechnol. Bioeng. 99, 351-367 (2008).

Goerke, A. R. & Swartz, J. R. High-level cell-free synthesis yields of proteins containing site-specific non-natural amino acids. Biotechnology and Bioengineering vol. 102 400-416 (2009).

Gregorio, N. E. et al. Unlocking Applications of Cell-Free Biotechnology through Enhanced Shelf Life and Productivity of *E. coli* Extracts. ACS Synth. Biol. 9, 766-778 (2020).

Gurramkonda, C. et al. Improving the recombinant human erythropoietin glycosylation using microsome supplementation in CHO cell-free system. Biotechnol. Bioeng. 115, 1253-1264 (2018).

Huang, A. et al. Biobits TM explorer: A modular synthetic biology education kit. Sci. Adv. 4, (2018).

Huang, C., Quinn, D., Sadovsky, Y., Suresh, S. & Hsia, K. J. Formation and size distribution of self-Assembled vesicles. Proc. Natl. Acad. Sci. U. S. A. 114, 2910-2915 (2017).

Hunt, J. P., Yang, S. O., Wilding, K. M. & Bundy, B. C. The growing impact of lyophilized cell-free protein expression systems. Bioengineered 8, 325-330 (2017).

Jung, J. K. et al. Cell-free biosensors for rapid detection of water contaminants. Nat. Biotechnol. (2020) doi:10.1038/s41587-020-0571-7.

Karim, A. S. & Jewett, M. C. A cell-free framework for rapid biosynthetic pathway prototyping and enzyme discovery. Metab. Eng. (2016) doi:10.1016/j.ymben.2016.03.002.

Karim, A. S. et al. In vitro prototyping and rapid optimization of biosynthetic enzymes for cell design. Nat. Chem. Biol. (2020) doi:10.1038/s41589-020-0559-0.

Katzen, F. & Kudlicki, W. Efficient generation of insect-based cell-free translation extracts active in glycosylation and signal sequence processing. J. Biotechnol. 125, 194-197 (2006).

Katzen, F., Chang, G. & Kudlicki, W. The past, present and future of cell-free protein synthesis. Trends Biotechnol. 23, 150-156 (2005).

Kightlinger, W. et al. A cell-free biosynthesis platform for modular construction of protein glycosylation pathways. Nat. Commun. 2019 101 10, 1-13 (2019).

Kightlinger, W. et al. Design of glycosylation sites by rapid synthesis and analysis of glycosyltransferases article. Nat. Chem. Biol. 14, 627-635 (2018).

Kightlinger, W., Warfel, K. F., DeLisa, M. P. & Jewett, M. C. Synthetic Glycobiology: Parts, Systems, and Applications. ACS Synth. Biol. 40, 7 (2020).

Krogh, A., Larsson, B., Von Heijne, G. & Sonnhammer, E. L. L. Predicting transmembrane protein topology with a hidden Markov model: Application to complete genomes. J. Mol. Biol. (2001) doi:10.1006/jmbi.2000.4315.

Lai, H.-E. et al. A GenoChemetic strategy for derivatization of the violacein natural product scaffold. bioRxiv (2019).

\* cited by examiner

| Lane | S12/S30 | Extract replicate (#) | Notes |
|---|---|---|---|
| Ladder | - | - | - |
| 1 | S12 | 1 | - |
| 2 | S12 | 2 | - |
| 3 | S12 | 3 | - |
| 4 | S30 | 1 | - |
| 5 | S30 | 2 | - |
| 6 | S30 | 3 | - |
| 7 | S12 | N/A | No overexpression, strain background control |
| 8 | S30 | N/A | No overexpression, strain background control |

FIG. 9C

CELL-FREE EXTRACT PREPARATION PROTOCOL FOR ENRICHMENT OF MEMBRANE VESICLES AND INCREASED GLYCOPROTEIN YIELDS

CROSS-REFERENCE TO RELATED PATENT APPLICATIONS

This application represents the national stage entry of PCT/US2020/057325 filed on Oct. 26, 2020, which claims the benefit of priority under 35 U.S.C. § 119(e) to U.S. Provisional Patent Application No. 62/926,166, filed on Oct. 25, 2019, the contents of each are incorporated herein by reference in their entireties.

STATEMENT REGARDING FEDERALLY SPONSORED RESEARCH OR DEVELOPMENT

This invention was made with government support under HDTRA1-15-1-0052 awarded by the Defense Threat Reduction Agency (DTRA). The government has certain rights in the invention.

BACKGROUND

The field of the invention relates to compositions and methods for performing cell-free glycoprotein synthesis. In particular, the field of the invention relates to protocols for preparing cell-free extracts that are enriched in membrane vesicles and the use thereof in methods and platforms for performing cell-free glycoprotein synthesis and increasing glycoprotein yields.

Protein glycosylation, the enzymatic modification of amino acid sidechains with sugar moieties, plays critical roles in cellular function, human health, and biotechnology. However, studying and producing defined glycoproteins remains challenging. Cell-free glycoprotein synthesis (CFgPS) systems, in which protein synthesis and glycosylation are performed in crude cell extracts, offer new approaches to address these challenges. However, there is a need for better components and protocols in order to increase glycoprotein yields and simplify known CFgPS systems and methods. Here, the inventors disclose protocols for prepating cell-free extracts that are enriched in membrane vesicles. The inventors' extracts can be utilized in methods and platforms for performing cell-free glycoprotein synthesis and increasing glycoprotein yields.

SUMMARY

The disclosed subject matter relates to protocols for preparing a cell-free extract in which the extract is enriched in membrane vesicles comprising components for glycosylation. The disclosed extracts may be utilized in cell-free glycoprotein synthesis (CFGpS) reactions and platforms in order to substantial increase yields of glycoprotein. In particular, the disclosed cell-free extracts may be utilized in methods and platforms for synthesizing a glycosylated protein in a cell-free glycoprotein synthesis (CFGpS) reaction via coordinated transcription, translation, and glycosylation in a cell-free reaction mixture in order to increase yields of the glycoprotein.

BRIEF DESCRIPTION OF THE FIGURES

FIGS. 9A-9C. Western blot analysis of membrane protein enrichment in S30 and S12 extracts. (A-B) Each uncropped α-FLAG blot against the indicated recombinant protein is presented. The theoretical mass of each recombinant protein is presented next to black arrows. We observe the well-documented effect that membrane proteins run anomalously on SDS-PAGE, running 'light' with respect to protein ladder standard. (C) A lane key is presented below. Note, for CB1 blot, extra controls, indicated to the right of blot, were needed to confirm the presence of the protein.

DETAILED DESCRIPTION

Definitions

Figure 1A:
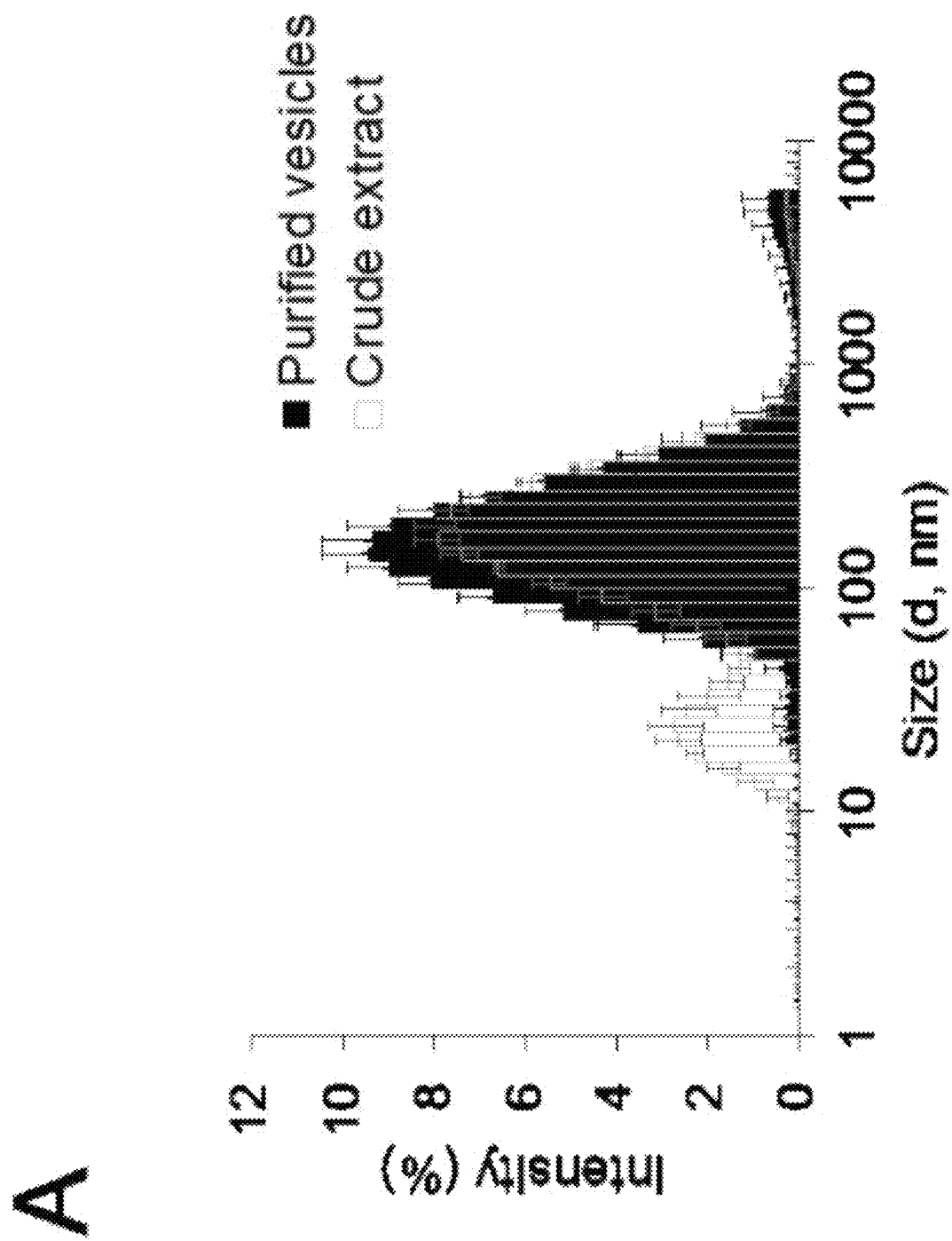
FIGS. 1A-1D. Characterization of membrane vesicles in crude CFE extracts. (A) DLS analysis of crude extracts and SEC purified vesicles. Crude extract trace is translucent to show overlap. Error bars represent the standard deviation within triplicate analysis of three independently prepared extracts. For purified vesicles, error bars represent the standard deviation of triplicate analysis of the most concentrated vesicle elution fractions. (B) Illustration of particles detected in crude CFE extracts. (C) Cryo-EM micrographs of crude extracts. Black arrows indicate vesicles with apparent unilamellar morphology. White arrows indicate nested or multilamellar morphologies. Cropped images indicate representative vesicles. Scale bars are 100 nm. (D) Cryo-EM micrographs of SEC purified vesicles. Cropped images indicate representative purified vesicles. Scale bars are 100 nm.

The disclosed subject matter may be further described using definitions and terminology as follows. The definitions and terminology used herein are for the purpose of describing particular embodiments only, and are not intended to be limiting.

As used in this specification and the claims, the singular forms "a," "an," and "the" include plural forms unless the context clearly dictates otherwise. For example, the term "a gene" or "an oligosaccharide" should be interpreted to mean "one or more genes" and "one or more oligosaccharides," respectively, unless the context clearly dictates otherwise.

As used herein, the term "plurality" means "two or more."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "substantially" and "significantly" will mean more than plus or minus 10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

The phrase "such as" should be interpreted as "for example, including." Moreover the use of any and all exemplary language, including but not limited to "such as", is intended merely to better illuminate the invention and does not pose a limitation on the scope of the invention unless otherwise claimed.

Furthermore, in those instances where a convention analogous to "at least one of A, B and C, etc." is used, in general such a construction is intended in the sense of one having ordinary skill in the art would understand the convention (e.g., "a system having at least one of A, B and C" would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or "B" or "A and B."

All language such as "up to," "at least," "greater than," "less than," and the like, include the number recited and refer to ranges which can subsequently be broken down into ranges and subranges. A range includes each individual member. Thus, for example, a group having 1-3 members refers to groups having 1, 2, or 3 members. Similarly, a group having 6 members refers to groups having 1, 2, 3, 4, or 6 members, and so forth.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use and aspect of a described embodiment or feature contained in the same, or a definitive decision to use a specific skill regarding a described embodiment or feature contained in the same. In this latter context, the modal verb "may" has the same meaning and connotation as the auxiliary verb "can."

Cell-Free Protein Synthesis (CFPS)

The methods and compositions disclosed herein may be utilized in cell-free protein synthesis methods as known in the art. See, for example, U.S. Pat. Nos. 4,496,538; 4,727,136; 5,478,730; 5,556,769; 5,623,057; 5,665,563; 5,679,352; 6,168,931; 6,248,334; 6,531,131; 6,869,774; 6,994,986; 7,118,883; 7,189,528; 7,338,789; 7,387,884; 7,399,610; 8,703,471; and 8,999,668. See also U.S. Published Application Nos. 2015-0259757, 2014-0295492, 2014-0255987, 2014-0045267, 2012-0171720, 2008-0138857, 2007-0154983, 2005-0054044, and 2004-0209321. See also U.S Published Application Nos. 2005-0170452; 2006-0211085; 2006-0234345; 2006-0252672; 2006-0257399; 2006-0286637; 2007-0026485; and 2007-0178551; 2014-0295492; 2018-0016612; 2018-0016614; 2018-0298416; and 2019/0284600. See also Published PCT International Application Nos. WO 2003/056914; WO 2004/013151; WO 2004/035605; WO 2006/102652; WO 2006/119987; and WO 2007/120932. See also Jewett, M. C., Hong, S. H., Kwon, Y. C., Martin, R. W., and Des Soye, B. J. 2014, "Methods for improved in vitro protein synthesis with proteins containing non standard amino acids," U.S. Patent Application Ser. No. 62/044,221; Jewett, M. C., Hodgman, C. E., and Gan, R. 2013, "Methods for yeast cell-free protein synthesis," U.S. Patent Application Ser. No. 61/792,290; Jewett, M. C., J. A. Schoborg, and C. E. Hodgman. 2014, "Substrate Replenishment and Byproduct Removal Improve Yeast Cell-Free Protein Synthesis," U.S. Patent Application Ser. No. 61/953,275; and Jewett, M. C., Anderson, M. J., Stark, J. C., Hodgman, C. E. 2015, "Methods for activating natural energy metabolism for improved yeast cell-free protein synthesis," U.S. Patent Application Ser. No. 62/098,578. See also Guarino, C., & DeLisa, M. P. (2012). A prokaryote-based cell-free translation system that efficiently synthesizes glycoproteins. Glycobiology, 22(5), 596-601. The contents of all of these references are incorporated in the present application by reference in their entireties.

In certain exemplary embodiments, one or more of the methods described herein are performed in a vessel, e.g., a single vessel or multiple vessels. The term "vessel," as used herein, refers to any container suitable for holding on or more of the reactants (e.g., for use in one or more transcription, translation, and/or glycosylation steps) described herein. Examples of vessels include, but are not limited to, a microtitre plate, a test tube, a microfuge tube, a beaker, a flask, a multi-well plate, a cuvette, a flow system, a microfiber, a microscope slide and the like.

In certain exemplary embodiments, physiologically compatible (but not necessarily natural) ions and buffers are utilized for transcription, translation, and/or glycosylation, e.g., potassium glutamate, ammonium chloride and the like. Physiological cytoplasmic salt conditions are well-known to those of skill in the art.

The methods and compositions disclosed herein may be utilized in cell-free protein methods in order to prepare glycosylated macromolecules (e.g., glycosylated peptides, glycosylated proteins, and glycosylated lipids). Glycosylated proteins that may be prepared using the disclosed strains and systems may include proteins having N-linked glycosylation (i.e., glycans attached to nitrogen of asparagine and/or arginine side-chains) and/or O-linked glycosylation (i.e., glycans attached to the hydroxyl oxygen of serine, threonine, tyrosine, hydroxylysine, and/or hydroxyproline). Glycosylated lipids may include O-linked glycans via an oxygen atom, such as ceramide.

The glycosylated macromolecules disclosed herein may include unbranched and/or branched sugar chains composed of monomers as known in the art such as, but not limited to, glucose (e.g., β-D-glucose), galactose (e.g., β-D-galactose), mannose (e.g., β-D-mannose), fucose (e.g., α-L-fucose), N-acetyl-glucosamine (GlcNAc), N-acetyl-galactosamine (GalNAc), neuraminic acid, N-acetylneuraminic acid (i.e., sialic acid), and xylose, which may be attached to the glycosylated macromolecule, growing glycan chain, or donor molecule (e.g., a donor lipid and/or a donor nucleotide) via respective glycosyltransferases (e.g., oligosaccharyltransferases, GlcNAc transferases, GalNAc transferases, galactosyltransferases, and sialyltransferases). The glycosylated macromolecules disclosed herein may include glycans as known in the art.

The disclosed cell-free protein synthesis methods and systems may utilize components that are crude and/or that are at least partially isolated and/or purified. As used herein, the term "crude" may mean components obtained by disrupting and lysing cells and, at best, minimally purifying the crude components from the disrupted and lysed cells, for example by centrifuging the disrupted and lysed cells and collecting the crude components from the supernatant and/or pellet after centrifugation. The term "isolated or purified" refers to components that are removed from their natural environment, and are at least 60% free, preferably at least 75% free, and more preferably at least 90% free, even more preferably at least 95% free from other components with which they are naturally associated.

The disclosed methods and compositions may be utilized for performing cell-free glycoprotein synthesis (CFGpS). In particular, the disclosed methods and composition relate to prokaryotic cell lysates enriched with components for glycosylation. Optionally, the lysates disclosed herein are prepared from genetically modified strains of prokaryotes. In some embodiments, the genetically modified prokaryote is a genetically modified strain of *Escherichia coli* or any other prokaryote suitable for preparing a lysate for CFGpS. Optionally, the modified strain of *Escherichia coli* is derived from rEc.C321. Preferably, the modified strain includes genomic modifications (e.g., deletions of genes rendering the genes inoperable) that preferably result in lysates capable of high-yielding cell-free protein synthesis. Also, preferably, the modified strain includes genomic modification (e.g., deletions of genes rendering the genes inoperable) that preferably result in lysates comprising sugar precursors for glycosylation at relatively high concentrations (e.g., in comparison to a strain not having the genomic modification). In some embodiments, a lysate prepared from the modified strain comprises sugar precursors at a concentration that is at least 20%, 30%, 40%, 50%, 60%, 70%, 80%, 90%, 100%, 150%, 200%, or higher than a lysate prepared from a strain that is not modified. By way of example, but not by way of limitation, bacterial source strains useful in the present methods, kits, and systems include rEcol ΔprfA ΔendA Δgor Δrne (705), *E. coli* BL21(DE3), *E. coli* CLM24, *E. coli* CLM24 ΔlpxM, *E. coli* CLM24 ΔlpxM CH-IpxE, *E. coli* CLM24 ΔlpxM CH-IpxE TT-IpxE, *E. coli* CLM24 ΔlpxM CH-IpxE TT-IpxE KL-IpxE, and *E. coli* CLM24 ΔlpxM CH-IpxE TT-IpxE KL-IpxE KO-IpxE.

In some embodiments, the modified strain includes a modification that results in an increase in the concentration of a monosaccharide utilized in glycosylation (e.g., glucose, mannose, N-acetyl-glucosamine (GlcNAc), N-acetyl-galactosamine (GalNAc), galactose, sialic acid, neuraminic acid, fucose). As such, the modification may inactivate an enzyme that metabolizes a monosaccharide or polysaccharide utilized in glycosylation. In some embodiments, the modification inactivates a dehydratase or carbon-oxygen lyase enzyme (EC 4.2) (e.g., via a deletion of at least a portion of the gene encoding the enzyme). In particular, the modification may inactivate a GDP-mannose 4,6-dehydratase (EC 4.2.1.47). When the modified strain is *E. coli*, the modification may include an inactivating modification in the gmd gene (e.g., via a deletion of at least a portion of the gmd gene).

In some embodiments, the modified strain includes a modification that inactivates an enzyme that is utilized in the glycosyltransferase pathway. In some embodiments, the modification inactivates an oligosaccharide ligase enzyme (e.g., via a deletion of at least a portion of the gene encoding the enzyme). In particular, the modification may inactivate an 0-antigen ligase that optionally conjugates an O-antigen to a lipid A core oligosaccharide. The modification may include an inactivating modification in the waaL gene (e.g., via a deletion of at least a portion of the waaL gene).

In some embodiments, the modified strain includes a modification that inactivates a dehydratase or carbon-oxygen lyase enzyme (e.g., via a deletion of at least a portion of the gene encoding the enzyme) and also the modified strain includes a modification that inactivates an oligosaccharide ligase enzyme (e.g., via a deletion of at least a portion of the gene encoding the enzyme). The modified strain may include an inactivation or deletion of both gmd and waaL.

In some embodiments, the modified strain may be modified to express one or more orthogonal or heterologous genes. In particular, the modified strain may be genetically modified to express an orthogonal or heterologous gene that is associated with glycoprotein synthesis such as a glycosyltransferase (GT) which is involved in the lipid-linked oligosaccharide (LLO) pathway. In some embodiments, the modified strain may be modified to express an orthogonal or heterologous oligosaccharyltransferase (EC 2.4.1.119) (OST). Oligosaccharyltransferases or OSTs are enzymes that transfer oligosaccharides from lipids to proteins.

In particular, the modified strain may be genetically modified to express an orthogonal or heterologous gene in a glycosylation system (e.g., an N-linked glycosylation system and/or an O-linked glycosylation system). The N-linked glycosylation system of *Campylobacter jejuni* has been transferred to *E. coli*. (See Wacker et al., "N-linked glycosylation in *Campylobacter jejuni* and its functional transfer into *E. coli*," Science 2002, Nov. 29; 298(5599):1790-3, the content of which is incorporated herein by reference in its entirety). In particular, the modified strain may be modified to express one or more genes of the pgl locus of *C. jejuni* or one or more genes of a homologous pgl locus. The genes of the pgl locus include pglG, pglF, pglE, waJ, pglD, pglC, pglA, pglB, pglJ, pglI, pglH, pglK, and gne, and are used to synthesize lipid-linked oligosaccharides (LLOs) and transfer the oligosaccharide moieties of the LLOs to a protein via an oligosaccharyltransferase.

Suitable orthogonal or heterologous oligosaccharyltransferases (OST) which may be expressed in the genetically modified strains may include *Campylobacter jejuni* oligosaccharyltransferase PglB. The gene for the *C. jejuni* OST is referred to as pglB, which sequence is provided as SEQ ID NO:5 and the amino acid sequence of *C. jejuni* PglB is provided as SEQ ID NO:6. PglB catalyzes transfer of an oligosaccharide to a D/E-Y-N-x-S/T motif (Y, X P) present on a protein. Additional non-limiting examples of OST enzymes useful in the methods, kits, and systems disclosed herein include *Campylobacter coli* PglB, *Campylobacter lari* PglB, *Desulfovibrio desulfuricans* PglB, *Desulfovibrio gigas* PglB, and *Desulfovibrio vulgaris* PglB.

Crude cell lysates may be prepared from the modified strains disclosed herein. The crude cell lysates may be prepared from different modified strains as disclosed herein and the crude cell lysates may be combined to prepare a mixed crude cell lysate. In some embodiments, one or more crude cell lysates may be prepared from one or more modified strains including a genomic modification (e.g., deletions of genes rendering the genes inoperable) that preferably result in lysates comprising sugar precursors for glycosylation at relatively high concentrations (e.g., in comparison to a strain not having the genomic modification). In some embodiments, one or more crude cell lysates may be prepared from one or more modified strains that have been modified to express one or more orthogonal or heterologous genes or gene clusters that are associated with glycoprotein synthesis.

The methods disclosed herein may be utilized to prepare crude cell lysates or mixed crude cell lysates that are enriched in glycosylation components, such as lipid-linked oligosaccharides (LLOs), glycosyltransferases (GTs), oligosaccharyltransferases (OSTs), or any combination thereof. In some embodiments, the crude cell lysates or mixed crude cell lysates are enriched in $Man_3GlcNAc_2$ LLOs representing the core eukaryotic glycan and/or $Man_3GlcNAc_4Gal_2Neu_5Ac_2$ LLOs representing the fully sialylated human glycan. By way of example, but not by way of limitation, glycan structures useful in the disclosed methods, kits and systems include *Francisella tularensis* SchuS4 O-polysaccharides, *Escherichia coli* O78 O-polysaccharides, *Escherichia coli* 0-7 O-polysaccharides, *Escherichia coli* O-9 O-polysaccharides primer, *Campylobacter jejuni* heptasaccharides N-glycan, *Campylobacter lari* PglB hexasaccharides N-glycan, engineered *Campylobacter lari* PglB hexasaccharides N-glycan, Wolinella *succinogenes* hexasaccharide N-glycan, and eukaryotic Man3GlcNac2 N-glycan structure.

The disclosed crude cell lysates may be used in cell-free glycoprotein synthesis (CFGpS) systems to synthesize a variety of glycoproteins. The glycoproteins synthesized in the CFGpS systems may include prokaryotic glycoproteins and eukaryotic proteins, including human proteins. The CFGpS systems may be utilized in methods for synthesizing glycoproteins in vitro by performing the following steps using the crude cell lysates or mixtures of crude cell lysates disclosed herein: (a) performing cell-free transcription of a gene for a target glycoprotein; (b) performing cell-free translation; and (c) performing cell-free glycosylation. The methods may be performed in a single vessel or multiple vessels. Preferably, the steps of the synthesis method may be performed using a single reaction vessel. The disclosed methods may be used to synthesis a variety of glycoproteins, including prokaryotic glycoproteins and eukaryotic glycoproteins.

Cell-Free Extract Preparation Protocol for Enrichment of Membrane Vesicles and Increased Glycoprotein The disclosed subject matter relates to protocols for preparing a cell-free extract in which the extract is enriched in membrane vesicles comprising components for glycosylation. The disclosed extracts may be utilized in cell-free glycoprotein synthesis reactions and platforms in order to substantial increase yields of glycoprotein. In particular, the disclosed cell-free extracts may be utilized in methods and platforms for synthesizing a glycosylated protein in a cell-free glycoprotein synthesis (CFGpS) reaction via coordinated transcription, translation, and glycosylation in a cell-free reaction mixture in order to increase yields of the glycoprotein.

In some embodiments, the disclosed methods and platforms relate to synthesizing a glycosylated protein in a cell-free glycoprotein synthesis (CFGpS) reaction via coordinated transcription, translation, and glycosylation in a cell-free reaction mixture, where the reaction mixture comprises a cell-free fraction obtained by lysing prokaryotic cells to obtain lysed cells (e.g., by sonicating the prokaryotic cells and/or by homogenizing the prokaryotic cells), subjecting the lysed cells to centrifugal separation at a force greater than 5,000×g and less than about 30,000×g (or less than about 25,000×g, 20,000×g, 18,000×g, or 15,000×g) collecting the supernant to obtain the cell-free fraction. Such methods typically comprise and such platforms comprise components for: (i) transcribing and translating the protein in the cell-free reaction mixture; and (ii) glycosylating the protein in the reaction mixture with at least one polysaccharide to obtain the glysosylated protein. In some embodiments, the lysed cells are subjected to centrifugal separation at a force greater than 5,000×g and less than about 18,000×g or less than about 15,000×g. In further embodiments, the lysed cells are subjected to centrifugal separation at a force of about 12,000×g.

The disclosed cell-free fraction typically is enriched in membrane vesicles, for example, relative to a cell-free fraction obtained by subjecting the lysed cells to centrifugal separation at a force greater than about 15,000×g or greater than about 18,000×g. In some embodiments, the cell-free fraction comprises the membrane vesicles at a concentration of at least about $4\times10^{12}$, $5\times10^{12}$, or $6\times10^{12}$, $7\times10^{12}$, or $8\times10^{12}$ particles/ml.

The membrane vesicles present in the cell-free fraction typically have an average effective diameter less than one micron. In some embodiments, the membrane vesicles have an average effective diameter of about 10 nm, 20 nm, 30 nm, 40 nm, 50 nm, 60 nm, 70 nm, 80 nm, 90 nm or 100 nm, to about 150 nm, 200 nm, 250 nm, 300 nm, 350 nm, 400 nm, 450 nm, or 500 nm. In further embodiments, the membrane vesicles have an average effective diameter of about 50 nm to about 200 nm.

The membrane vesicles may comprise phospholipid vesicles. In some embodiments, the prokaryotic cells utilized to prepared the cell-free extract express a transmembrane oligosaccharyltransferase that glycosylates the protein in the cell-free reaction mixture and the membrane vesicles comprise the transmembrane oligosaccharyltransferase (e.g., a bacterial transmembrane oligosaccharyltransferase). The transmembrane oligosaccharyltransferase may be a native oligosaccharyltransferase and/or the transmembrane oligosaccharyltransferase may be an exogenous oligosaccharyltransferase. In some embodiments, the transmembrane oligosaccharyltransferase is selected from PglB, PglO, and STT3.

The membrane vesicles may comprise oligosaccharides for glycosylating the glycoprotein in the disclosed methods and platforms. In some embodiments, the membrane vesicles comprise lipid-linked oligosaccharides (LLO) donors and the protein is glycosylated with the LLO donors.

Suitable cells for the disclosed methods and platforms include prokaryotic cells. Suitable prokaryotic cells include, but are not limited to, *Escherichia coli.*

EXAMPLES

The following Examples are illustrative and should not be interpreted to limit the scope of the claimed subject matter.

Example 1—Enriching Membrane Vesicles in *E. coli* CFPS Extracts for Increased Glycoprotein Production in Cell-free Glycoprotein Synthesis Systems Abstract The disclosed subject matter relates to the characterization of membrane-bound components in *Escherichia coli* cell-free protein synthesis (CFPS) extracts with the aim of understanding the CFPS system for engineering new functionality. In particular, this work has implications for interfacing CFPS with protein glycosylation (i.e., the covalent attachment of sugars to proteins) because many of the enzymes and sugar donors necessary for protein glycosylation are membrane-bound. Glycosylation is vastly important for structure and function of proteins and is a key consideration in recombinant protein production. The inventors have found that cell-free extracts can be prepared which comprise lipid vesicles having an effective diameter on the order of tens to hundreds of nanometers that are formed upon cell lysis and carried through extract processing into the final extract. The inventors have developed methods for producing active extracts containing higher concentrations of membrane vesicles. For glycoprotein production, the inventors have shown that extracts prepared from chassis strains overexpressing membrane-bound glycosylation machinery contain vesicles enriched with active machinery of interest. Surprisingly, optimizations of extract processing resulted in higher glycoprotein yields in cell-free glycoprotein synthesis (CFGpS) reactions by >60%, while drastically cutting extract processing time. These results are broadly applicable for enriching membrane-bound proteins of varying complexity in *E. coli* extracts, and will specifically have great impact for the expansion of on-demand cell-free glycoprotein synthesis.

Applications

Applications of the disclosed subject matter include, but are not limited to: (i) Enriching membrane-bound components in cell-free extracts; (ii) Screening activity of membrane proteins in extract; (iii) Enriching membrane proteins in extract to interface with CFPS products; and (iv) Improving yields for on-demand biomanufacturing of vaccines and glycoprotein therapeutics.

Advantages

Advantages of the disclosed subject matter include, but are not limited to: (i) Increases membrane vesicles present in CFPS extracts; (ii) Increases concentrations of membrane-bound components in CFPS extracts; (iii) Reduces extract processing time, and can be done on simpler instrumentation than previously used methods; and (iv) Increases glycoprotein yields in cell-free glycosylation systems.

Technical Description

The inventors have determined that centrifugal g force impacts the concentration of membrane vesicles that are present in a cell-free extract prepared from a host cell culture. One aspect of the disclosed subject matter is the unexpected innovation that S12 extracts prepared using centrifugation of 12,000×g comprise a greater concentration of membrane vesicles in the extract instead of the commonly used S30 extracts prepared using centrifugation of 30,000× g. The S12 extracts which are enriched in membrane vesicles have substantial utility for in cell-free glycosylation systems and method. The inventors have shown that cell-free glycosylation can be enhanced by more than 60% using S12 extracts. The inventors also surprising show that vesicles can be prepared from either homogenization or sonication lysis methods. The disclosed technology reduces extract processing time, and can be done on simpler instrumentation than previously used methods.

REFERENCES

Kwon, Y C, Jewett, M C (2015) High-throughput preparation methods of crude extract for robust cell-free protein synthesis. *Sci Rep*. 5:8663.

Foshag D, et al. (2018) The *E. coli* S30 lysate proteome: A prototype for cell-free protein production. *N Biotechnol*. doi:10.1016/j.nbt.2017.09.005.

Hare J F, Olden K, Kennedy E P (1974) Heterogeneity of Membrane Vesicles from *Escherichia coli* and their Subfractionation with Antibody to ATPase. *Proc Natl Acad Sci USA* 71:4843-4846.

Patel L, Schuldiner S, Kaback H R (1975) Reversible effects of chaotropic agents on the proton permeability of *Escherichia coli* membrane vesicles* (active transport/membrane potential/ft-galactosides/amino acids/lipophilic cations/carbodiimides) Available at: https://www.pnas.org/content/pnas/72/9/3387.full.pdf [Accessed Oct. 23, 2019].

Jewett M C, Calhoun K A, Voloshin A, Wuu J J, Swartz J R (2008) An integrated cell-free metabolic platform for protein production and synthetic biology. *Mol Syst Biol* 4:220.

Berrier C, et al. (2011) Coupled cell-free synthesis and lipid vesicle insertion of a functional oligomeric channel MscL. *Biochim Biophys Acta—Biomembr* 1808(1):41-46.

Jewett M C, Swartz J R (2004) Mimicking the *Escherichia coli* cytoplasmic environment activates long-lived and efficient cell-free protein synthesis. *Biotechnol Bioeng* 86(1):19-26.

Boland C, et al. (2014) Cell-free expression and in meso crystallisation of an integral membrane kinase for structure determination. *Cell Mol Life Sci* 71(24):4895-4910.

Wuu J J, Swartz J R (2008) High yield cell-free production of integral membrane proteins without refolding or detergents. *Biochim Biophys Acta—Biomembr* 1778(5):1237-1250.

Schoborg J A, et al. (2017) A cell-free platform for rapid synthesis and testing of active oligosaccharyltransferases. *Biotechnol Bioeng*. doi:10.1002/bit.26502.

Jaroentomeechai T, et al. (2018) Single-pot glycoprotein biosynthesis using a cell-free transcription-translation system enriched with glycosylation machinery. doi: 10.1038/s41467-018-05110-x.

Example 2—Improving Cell-Free Glycoprotein Synthesis by Characterizing and Enriching Native Membrane Vesicles Abstract Cell-free gene expression (CFE) systems from crude cellular extracts have attracted much attention for accelerating the design of cellular function, on-demand biomanufacturing, portable diagnostics, and educational kits. Many essential biological processes that could endow CFE systems with desired functions, such as protein glycosylation, rely on the activity of membrane-bound components. However, without the use of synthetic membrane mimics, activating membrane-dependent functionality in bacterial CFE systems remains largely unstudied. Here, we address this gap by characterizing native, cell-derived membrane vesicles in *Escherichia coli*-based CFE extracts and describing methods to enrich vesicles with heterologous, membrane-bound machinery. We first use nanocharacterization techniques to show that lipid vesicles in CFE extracts are tens to hundreds of nanometers across, and on the order of $\sim 3\times10^{12}$ particles/mL. We then determine how extract processing methods, such as post-lysis centrifugation, can be used to modulate concentrations of membrane vesicles in CFE systems. By tuning these methods, we show that increasing the number of vesicle particles to $\sim 7\times10^{12}$ particles/mL can be used to increase concentrations of heterologous membrane protein cargo expressed prior to lysis. Finally, we apply our methods to enrich membrane-bound oligosaccharyltransferases and lipid-linked oligosaccharides for improving N-linked and O-linked glycoprotein synthesis. We anticipate that our findings will facilitate in vitro gene expression systems that require membrane-dependent activities and open new opportunities in glycoengineering.

Introduction

Lipid membranes play pivotal roles in biological functions across all domains of life, with ~20-30% of genes encoding for membrane proteins and many essential processes taking place on and across membranes[1,2]. For example, membranes are required for molecular transport, immunological defense, energy regeneration, and post-translational protein modification. Despite the absence of intact cellular membranes, crude extracts of organisms have proven useful in a variety of in vitro studies by reconstituting some of these biological phenomena. This is possible due to the presence of membrane structures which form upon fragmentation and rearrangement of cell membranes during cell lysis and extract preparation. In eukaryotic-derived cell-free gene expression (CFE) systems, endoplasmic reticulum (ER)-derived microsomes enhance functionality, enabling the synthesis of membrane proteins, proteins with disulfide bonds, and protein glycosylation[3-7]. Eukaryotic ER microsomes have been routinely characterized for quality control with fluorescence microscopy due to their micron-scale size, enabling the development of diverse systems that leverage microsomes[8-10]. Analogously, in *E. coli*-derived CFE systems, inverted membrane vesicles harboring electron transport chain machinery activate oxidative phosphorylation and ATP regeneration[11,12]. While vesicles in typical *E. coli* extracts have been analyzed using biochemical methods, sucrose fractionation, and phospholipid quantitation, the use of methods to count and characterize intact, cell-derived vesicles have not yet been pursued[13-15]. This is due, in part, to the fact that vesicles in *E. coli* extracts are on the nanoscale and therefore require higher-resolution techniques than fluorescence microscopy for characterization. While exogenous membranes such as nanodiscs, synthetic phospholipid structures, purified microsomes, and purified vesicles have enabled membrane biology in CFE systems[16-21], using native membranes from the host simplifies processing and is an appealing alternative. Therefore, characterization workflows for analyzing native vesicles are a foundational step for enabling applications of membrane-bound biology in *E. coli*-based CFE.

A technical renaissance has recently transformed CFE systems from a molecular biology technique to a widely applicable bioproduction and prototyping platform, with *E. coli* systems at the forefront[4,22-27]. A body of work dedicated to optimization of extract preparation and reaction conditions has simplified, expedited, and improved the cost and performance of *E. coli* CFE systems[22,28-30]. Optimized *E. coli*-based CFE reactions: (i) quickly synthesize grams of protein per liter in batch reactions[31-33], (ii) are scalable from the nL to 100 L scale[34,35], and (iii) can be freeze-dried for months of shelf-stability and distribution to the point of care[6,22,29,36-41]. Freeze-dried CFE systems are poised to make disruptive impacts in biotechnology, having already been leveraged for point-of-use biosensing[42-47], therapeutic and vaccine production[38,39,48], and educational kits[22,49-51].

In a growing number of contexts, CFE extracts have been tailored to new applications by pre-enriching soluble, heterologous components in vivo prior to cell lysis, avoiding the need for purification. Examples include incorporation of site-specific non-canonical amino acids into proteins[32,52,53], biosensing of analytes[46,54,55], and assembly of metabolic pathways for production of valuable small molecules[26,56-58]. Yet, the design of membrane-incorporated components to enhance CFE systems has remained largely unstudied. Enriching membrane-bound components in CFE systems would enable compelling applications. For example, protein glycosylation, which is mediated by membrane-bound components, is a key consideration in cell-free biomanufacturing of protein therapeutics and conjugate vaccines. We recently described cell-free glycoprotein synthesis (CFGpS), a platform for one-pot biomanufacturing of defined glycoproteins in extracts enriched with heterologous, membrane-bound glycosylation machinery[48]. To date, CFGpS has been used to produce model glycoproteins, human glycoproteins, and conjugate vaccines[39,48,59-61]. Importantly, CFGpS reactions can be freeze-dried for shelf-stability and rehydrated at the point of care to make effective vaccines[39]. Because CFGpS activity relies on membrane-bound glycosylation components, methods to characterize and quality-control the membrane-bound components in extracts is paramount for moving the technology forward.

In this work, we characterize size distributions and concentrations of native membrane vesicles in extracts, providing a benchmark for analysis and engineering of CFE systems. We investigate the impacts of upstream extract processing steps on vesicle profiles, revealing simple handles to modulate vesicle concentration in extracts. We use native membrane vesicles to enrich a variety of heterologous, membrane-bound proteins and substrates in extracts without the use of synthetically-derived membranes. Finally, we apply our findings to improve glycoprotein yields in our existing asparagine-linked (N-linked) CFGpS system and a new membrane-dependent CFGpS system based on serine/threonine-linked (O-linked) glycosylation. The implications of our work extend beyond glycosylation and are applicable to engineering new CFE systems with membrane-associated activities.

Results

In this study, we aimed to characterize membrane vesicles in *E. coli*-based CFE systems that form upon fragmentation of cell membranes during cell lysis. Then, we wished to use this knowledge to control enrichment of membrane-bound components for enhancing defined function. To achieve these goals, we (i) use nanocharacterization techniques to determine the sizes and quantities of membrane vesicles in *E. coli* extracts; (ii) determine how extract processing can control the enrichment of vesicles in extracts; (iii) enrich several heterologous, membrane-bound components in extracts via vesicles; and (iv) demonstrate that enrichment of membrane-bound components improves cell-free glycoprotein synthesis systems for N- and O-linked glycosylation.

Figure 1B:
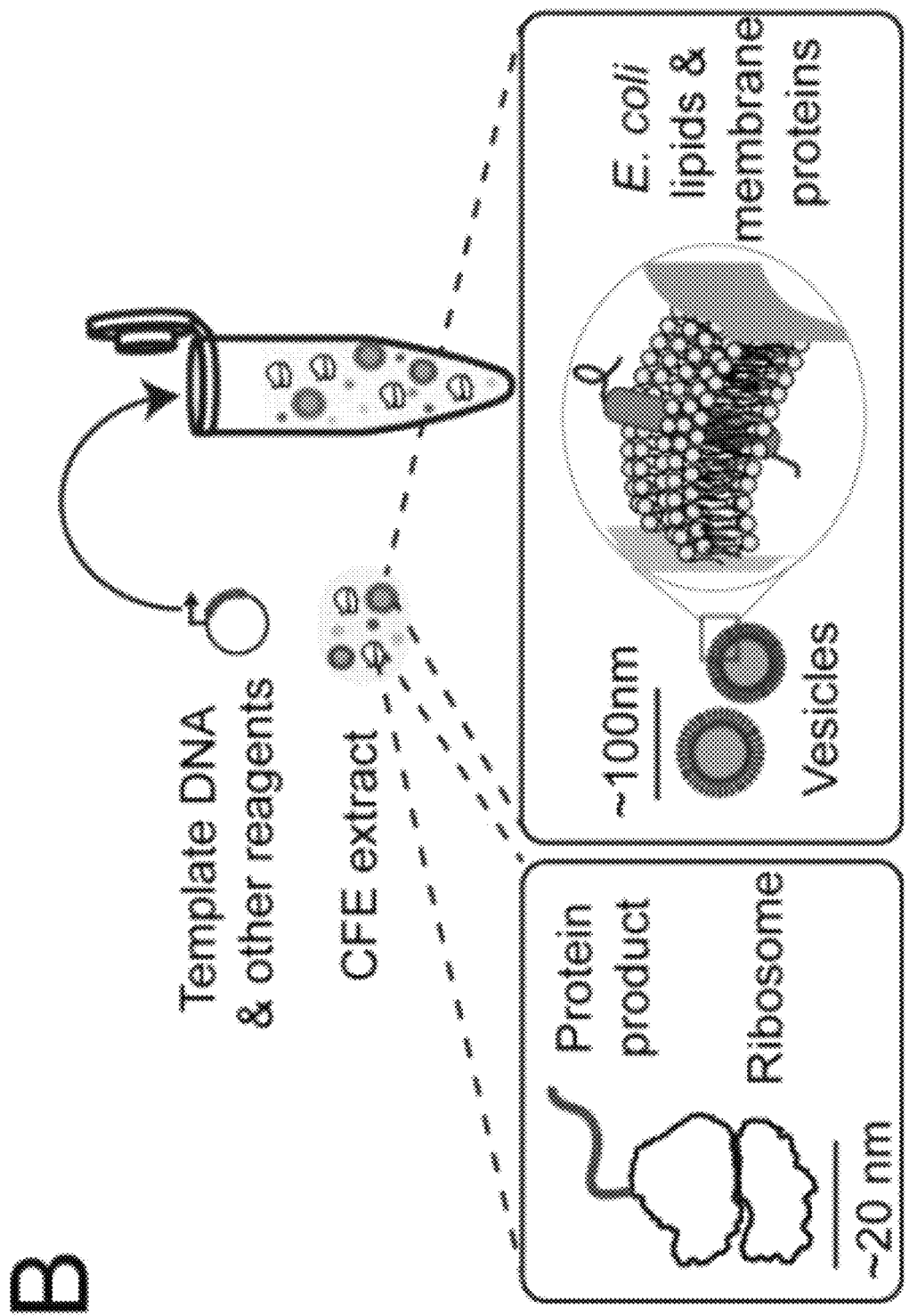
Figure 5:
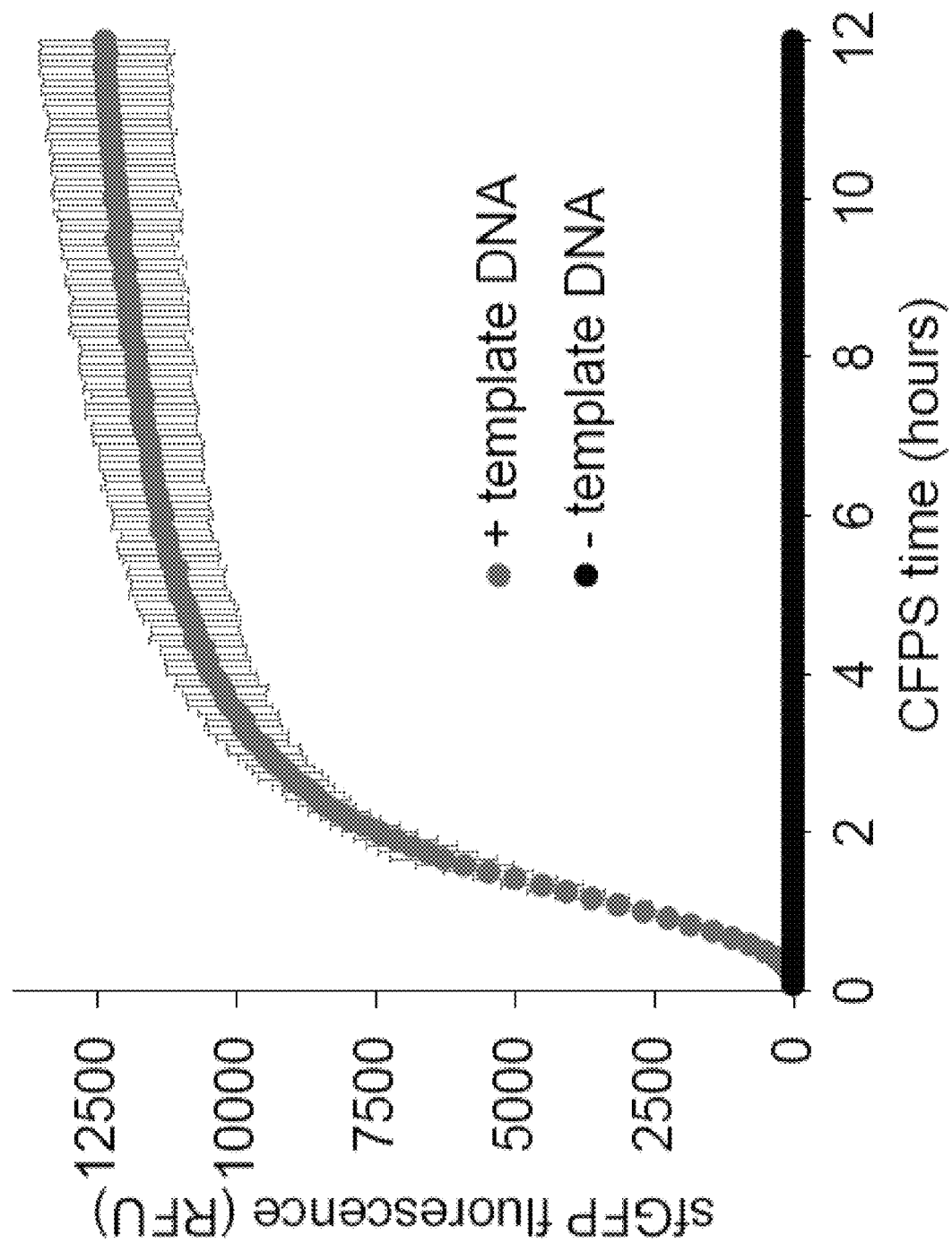
FIG. 5. Production of an sfGFP reporter in standard cell-free expression reaction conditions. Protein synthesis proceeds when template DNA is present, and no fluorescence is observed when template DNA is omitted. Error bars represent standard deviations of three independent CFE reactions.
Figure 6A:
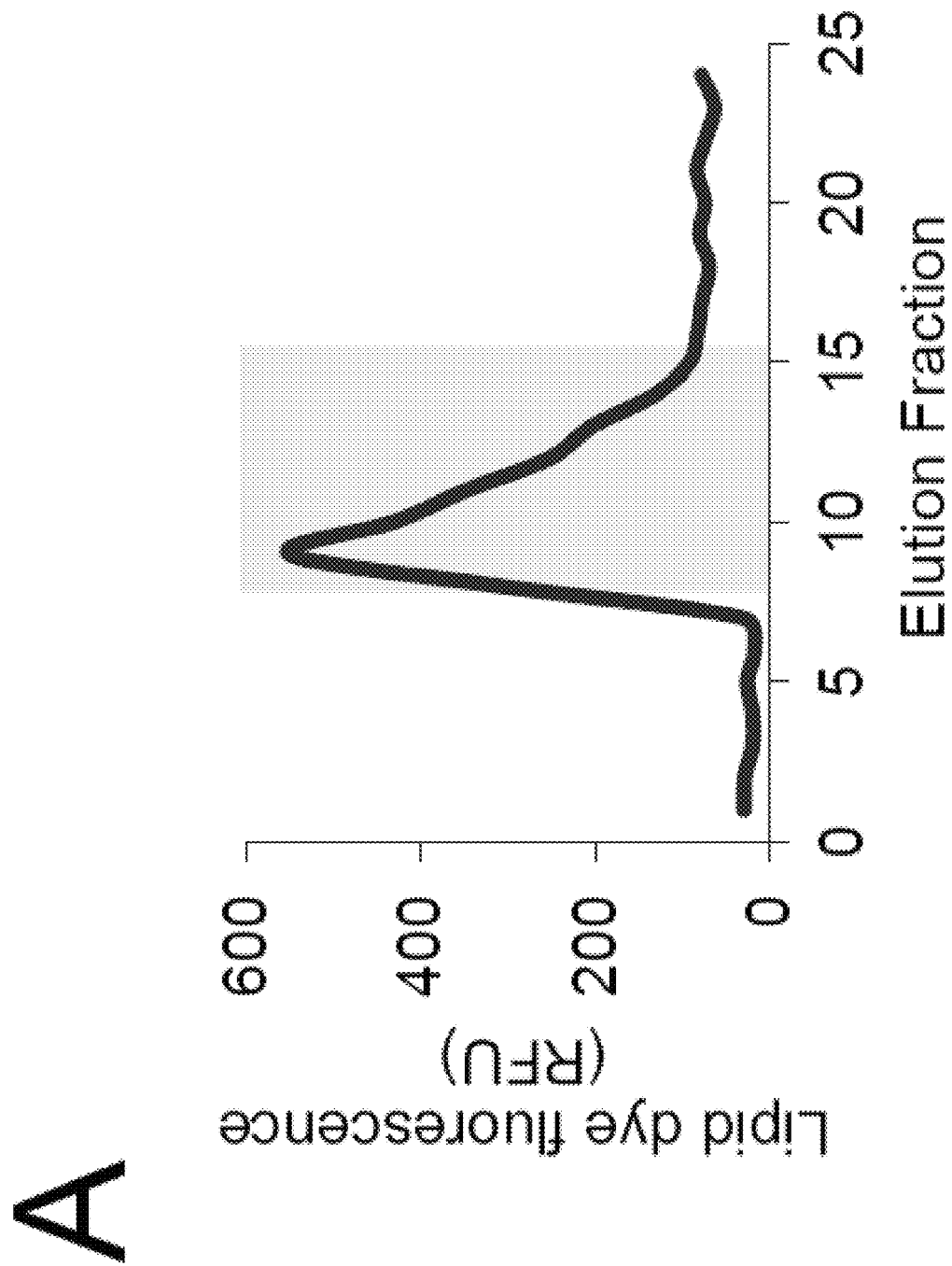
FIGS. 6A-6C. Purification and characterization of membrane vesicles from CFE extracts. (A) SEC chromatogram of extracts probed with FM 4-64 lipid dye. The gray segment indicates the vesicle elution fraction. (B) NTA analysis of purified vesicles collected from fractions 9 and 10 eluted in (A). (C) Zeta potential analysis of purified vesicles in PBS. Error bars represent standard deviation of triplicate measurements of purified vesicles.
Figure 6B:
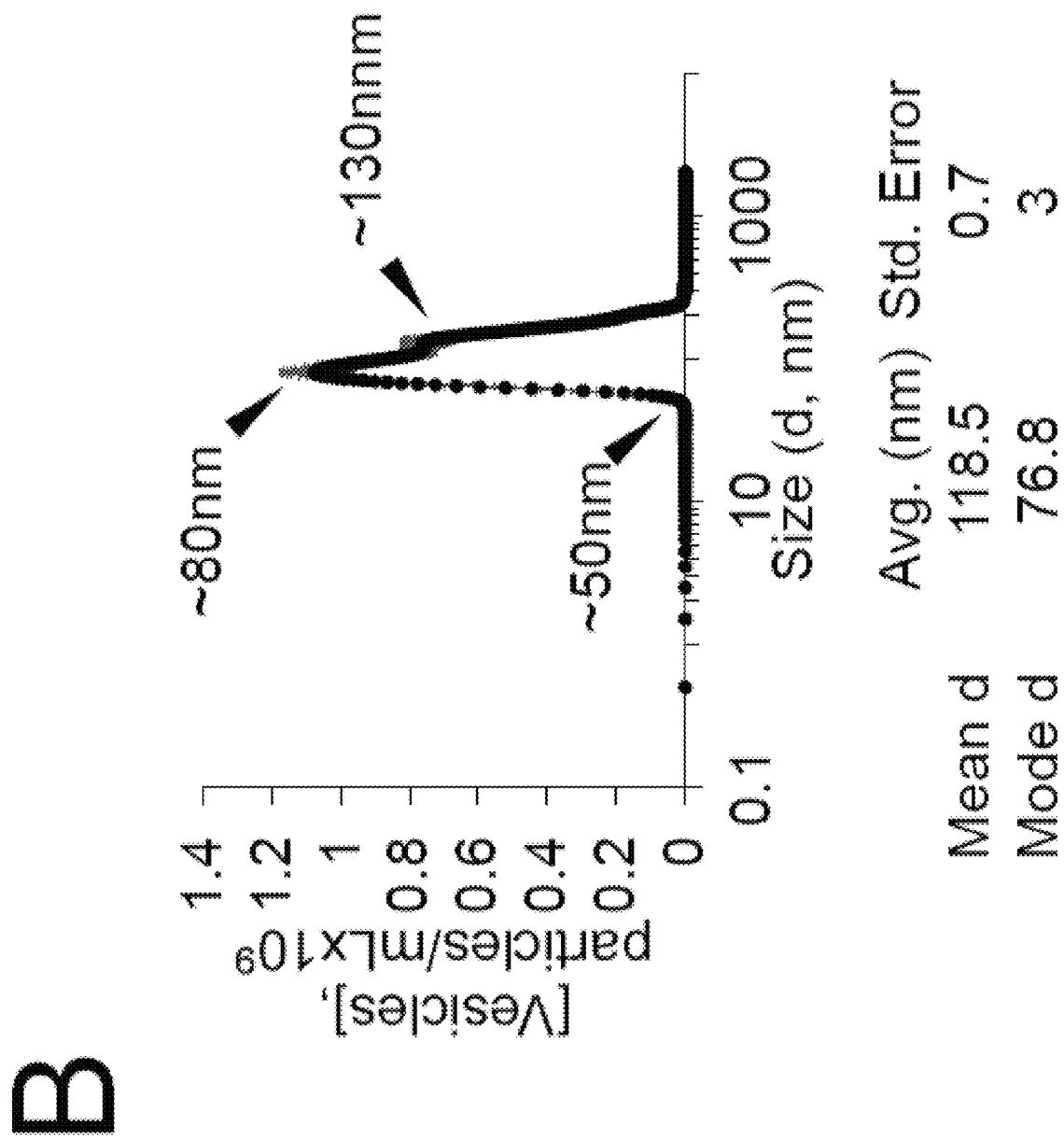
Figure 6C:
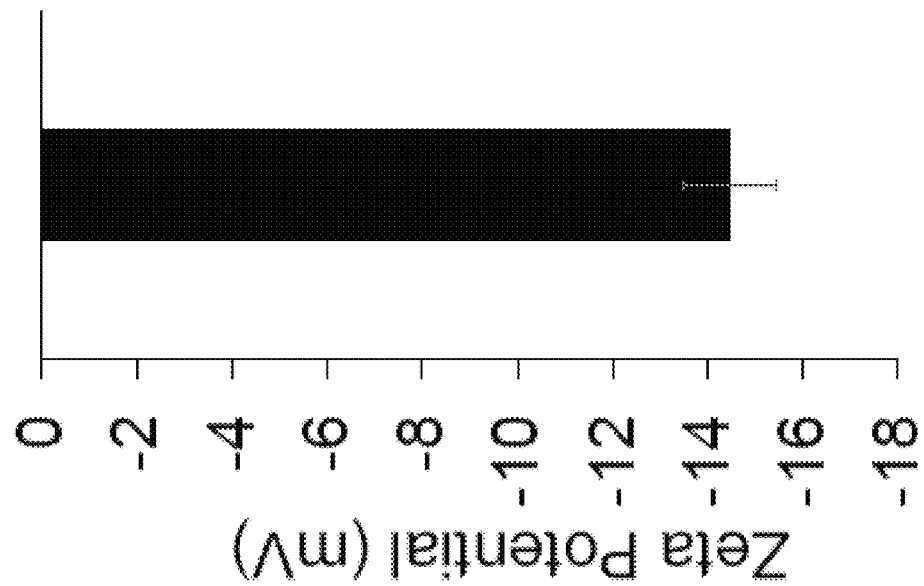

Characterization of membrane vesicles in CFE extracts. Initially, we used several nanocharacterization techniques to analyze the size of vesicles and visualize these particles in CFE extracts. Dynamic light scattering (DLS) analysis of crude extract revealed two major peaks: one narrower peak with an intensity maximum at ~20 nm, and a broader peak at ~100-200 nm (FIG. 1A). The 20 nm peak represents small cell-derived particles, including assembled 20 nm *E. coli* ribosomes[62], which we confirmed to be active in our extracts (FIG. 5). We hypothesized that particles measured in the ~100-200 nm peak were vesicles. An illustration of particles detected in extract is shown in FIG. 1B. To directly analyze membrane vesicles without ribosomes and other cellular particles, we identified and purified membranous particles via size exclusion chromatography (SEC)[63-65] (FIG. 6A). DLS analysis of purified membrane vesicles revealed an intensity particle size distribution (PSD) that directly overlapped with the proposed vesicle peak from our DLS traces of crude extracts. (FIG. 1A). Nanoparticle Tracking Analysis (NTA), an orthogonal method for sizing and quantitating nanoparticles in solution, revealed an average purified vesicle diameter of 118.5±0.7 nm, corroborating the size range measured with DLS (FIG. 6B). The zeta potential of purified vesicles was ~14.5±~1.0 mV, indicating a negative particle surface charge consistent with phospholipid vesicles (FIG. 6C). Cryo-electron microscopy (cryo-EM) of extracts showed small (≤20 nm) particles and other larger, circular particles consistent with vesicle morphology (FIG. 1C).

Figure 1C:
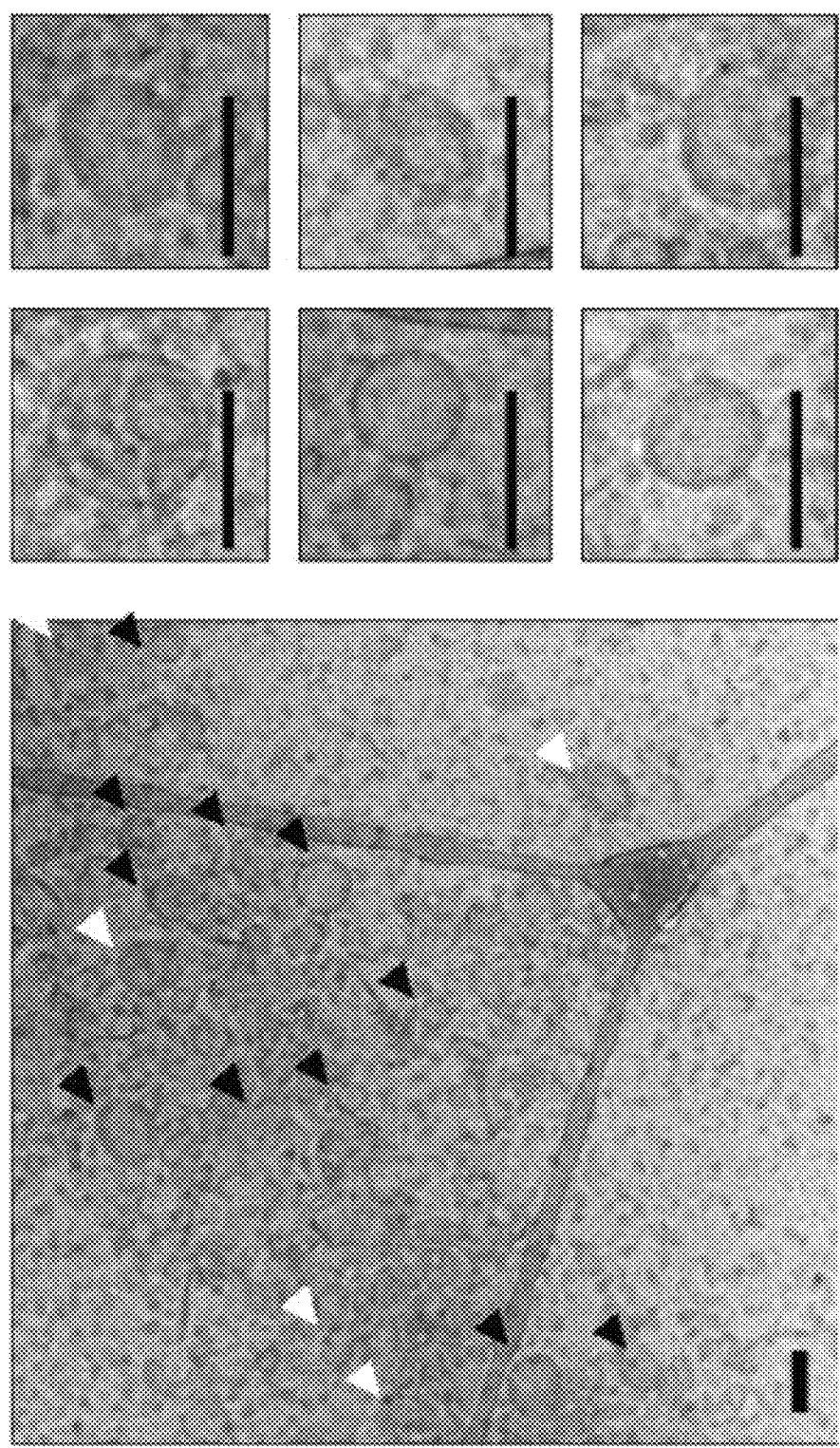
Figure 1D:
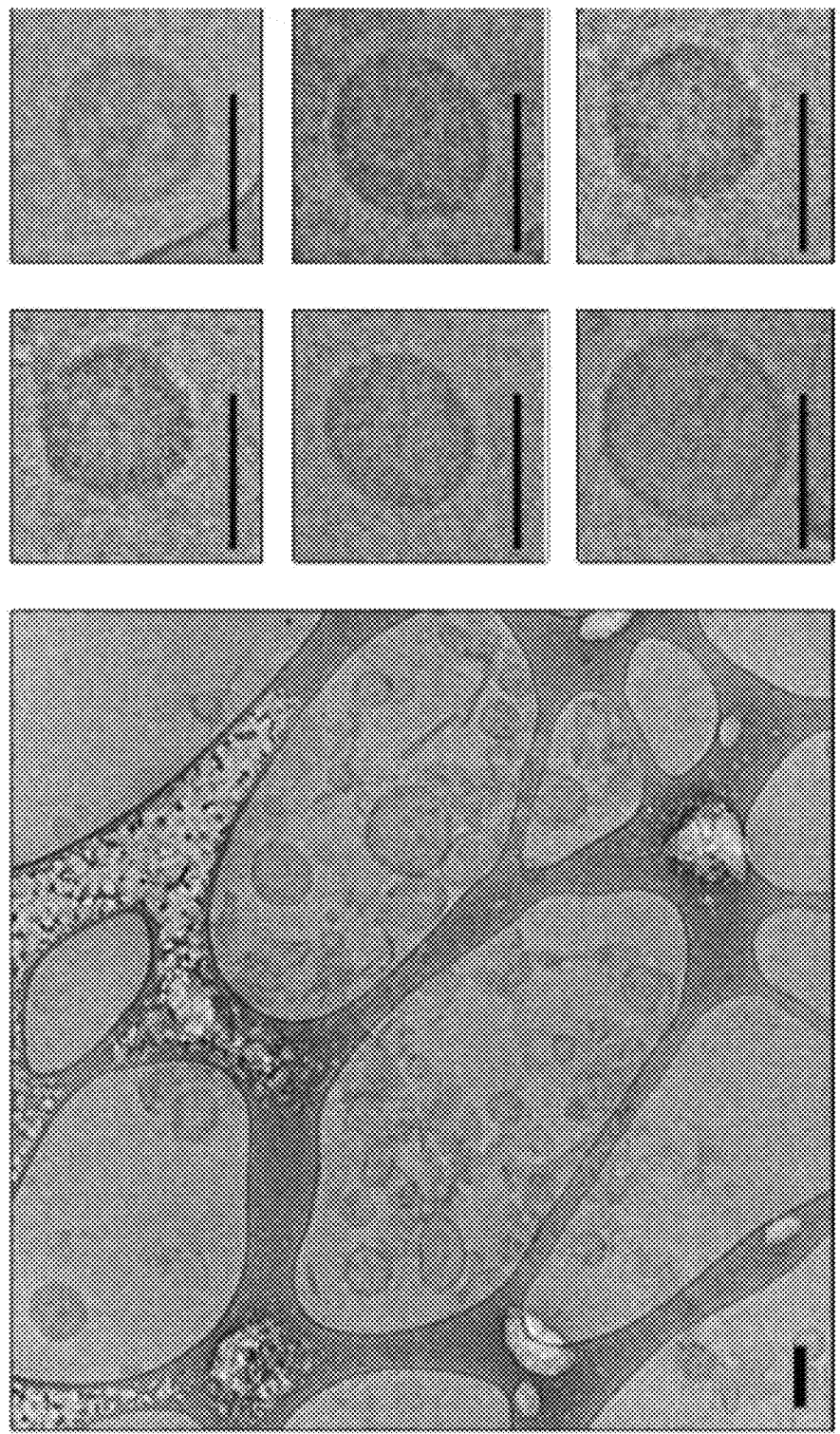

Cryo-EM micrographs of extracts revealed vesicles between ~40 nm and ~150 nm in size, and morphologies were consistent pre- and post-SEC purification (FIG. 1C-1D). Comparisons between measurements reveal that DLS, a bulk, in-solution measurement, over-estimates vesicle diameter. DLS, however, is a useful tool for quickly characterizing crude extract particle profiles because it can detect particles<50 nm (including ribosomes) that are smaller than vesicles and are below the size limit of detection of NTA. Together, these results show particle profiles of crude extracts and reveal that vesicles are polydisperse, are on the order of tens to hundreds of nm across, and are relatively low in concentration compared with ribosomes and other small complexes.

Figure 2A:
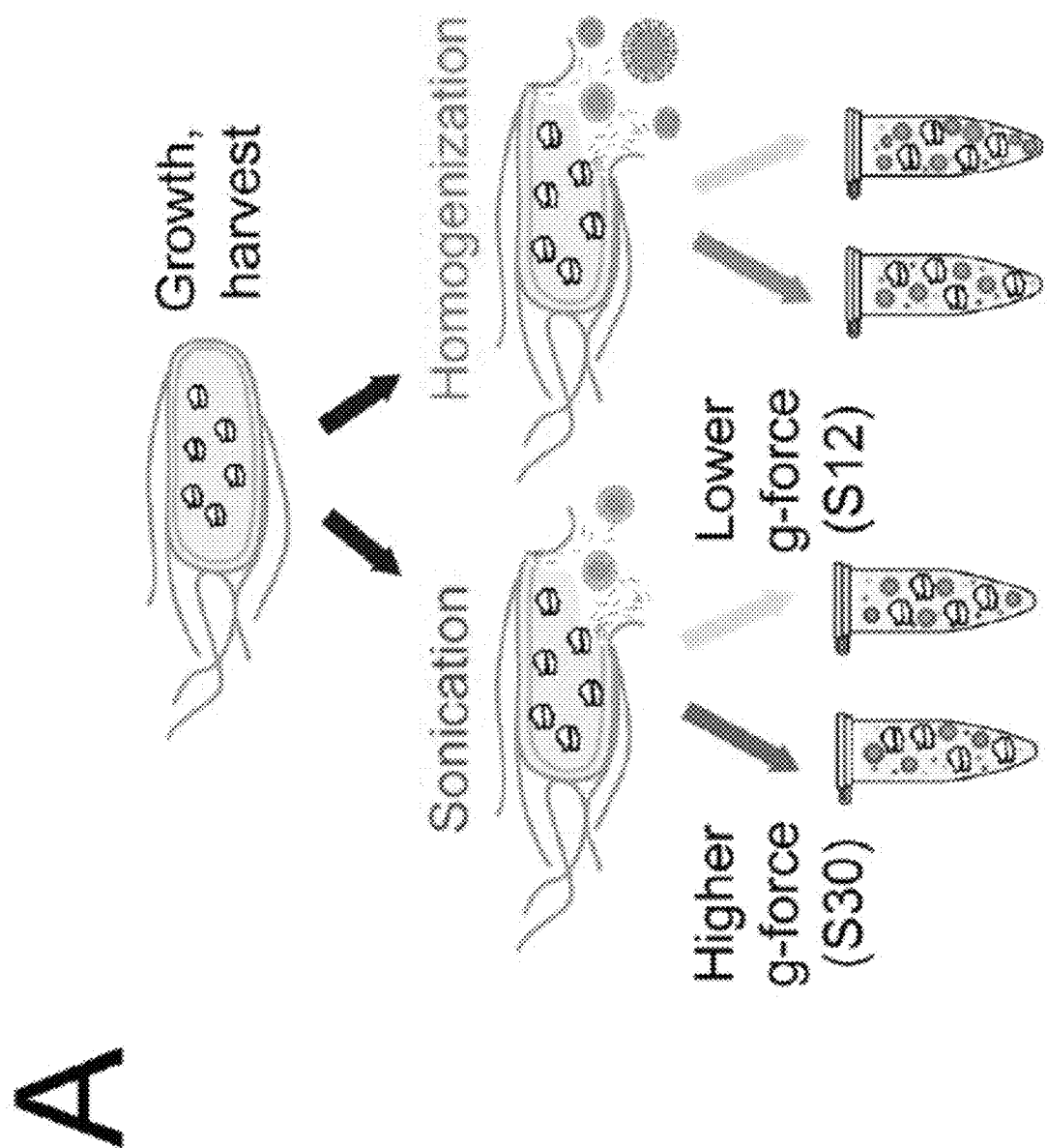
FIGS. 2A-2D. Extract processing impacts vesicle size distributions and concentrations. (A) Illustration of extract processing conditions. Extracts were prepared in triplicate for each condition shown. (B) Nanoparticle Tracking Analysis (NTA) concentration analysis of vesicles in sonicated (blue) and homogenized (green) extracts. Asterisk indicates base case conditions for extract preparation. For NTA analyses, error bars represent the standard deviation of measurements of three independently prepared extracts. (C) NTA particle size distribution (PSD) of vesicles in sonicated (blue) and homogenized (green) S30 extracts. (D) NTA PSD of sonicated (blue) and homogenized (green) S12 extracts.
Figure 7A:
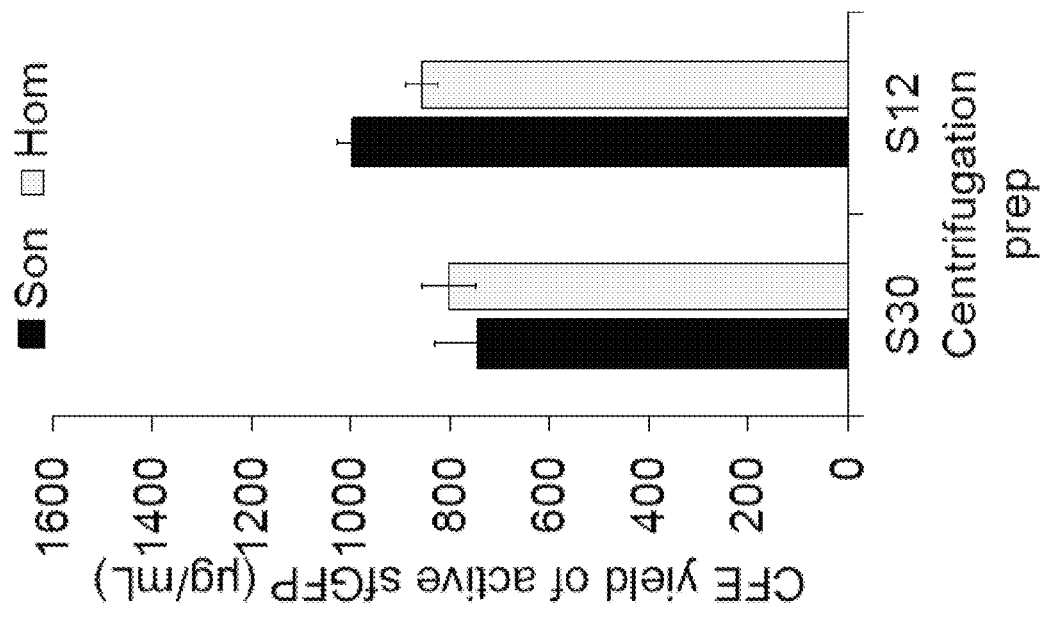
FIGS. 7A-7C. CFE productivities of all S30 and S12 extracts characterized in this study. Reactions were run for 20 h at 30° C. under standard conditions. Extracts in (A) correspond with 'blank' chassis strains with no overexpressed components. These extracts are characterized in FIG. 1, FIG. 2. (B) show extracts enriched with membrane proteins, characterized in FIG. 3. (C) shows CFGpS extracts with enrichment of C. jejuni LLO and the denoted enzyme in the strain. CFGpS extracts are characterized in FIG. 4. Error bars represent standard deviations of triplicate independent reactions.

Extract processing impacts vesicle size distributions and concentrations. To understand how to control membrane vesicles in extracts, we next sought to study how protocols to process extracts impacted vesicle properties. Specifically, we studied cell lysis and extract centrifugation because cell membranes are ruptured during lysis, and centrifugation dictates particle separation. We lysed cells using standard sonication (constant input energy per volume of cell suspension) or homogenization protocols (~20,000 psig)[28,48], then subjected lysates to a traditional 30,000×g centrifugation protocol (termed 'S30 prep'), or a lower g-force protocol where the maximum centrifugation speed was 12,000×g (termed 'S12 prep') (FIG. 2A)[28,29]. These combinations of lysis and centrifugation protocols resulted in four distinct extract conditions, all of which were active for protein synthesis in standard CFE reaction conditions (FIG. 7A). The combination of a standard homogenization and S30 prep represents our base case because extracts used in our previously described one-pot cell-free glycoprotein synthesis platform were prepared with these conditions, as well as the extracts used in FIG. 1.

Figure 2B:
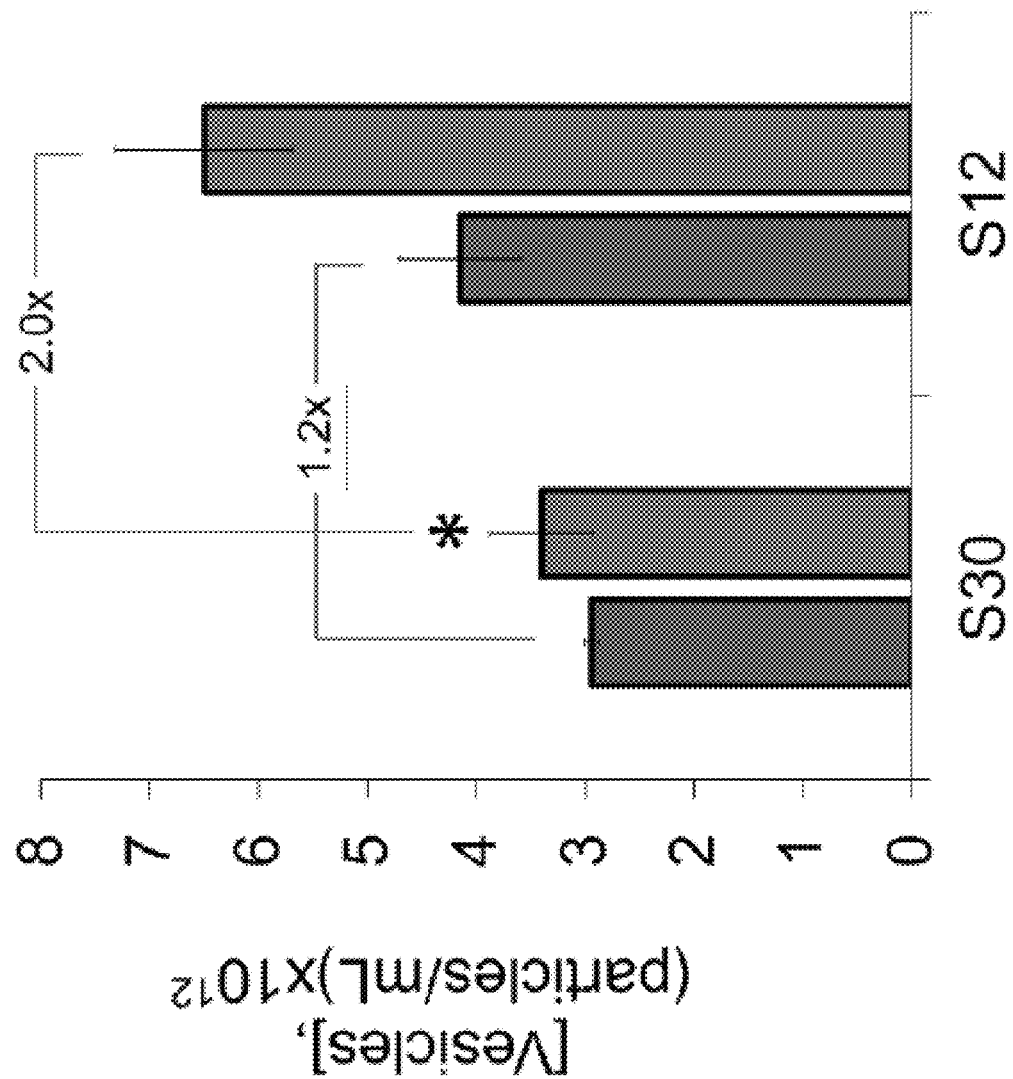

Of the conditions tested, the centrifugation protocol had the most impact on vesicle concentrations. We observed significantly higher numbers of vesicles in S12 extracts for both lysis methods. Specifically, we observed 1.2- and 2.0-fold enrichments of vesicles in sonicated and homogenized S12 extracts, respectively (FIG. 2B). Homogenized S12 extracts contained the highest concentration of vesicles with $6.5\pm0.8\times10^{12}$ particles/mL (as compared to $3.4\pm0.05\times10^{12}$ particles in the base case), making it the most promising condition for enriching vesicles.

Figure 2C:
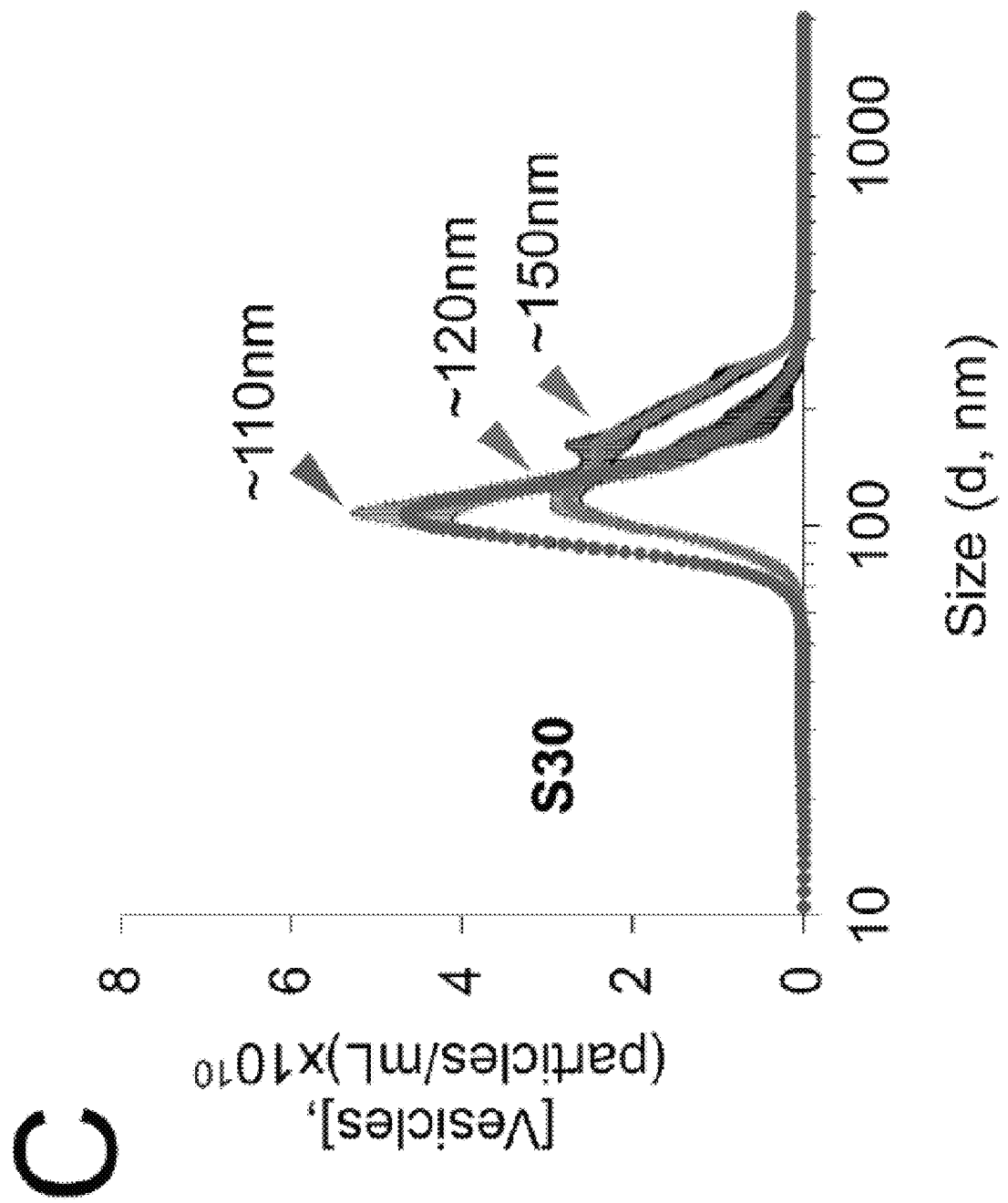
Figure 2D:
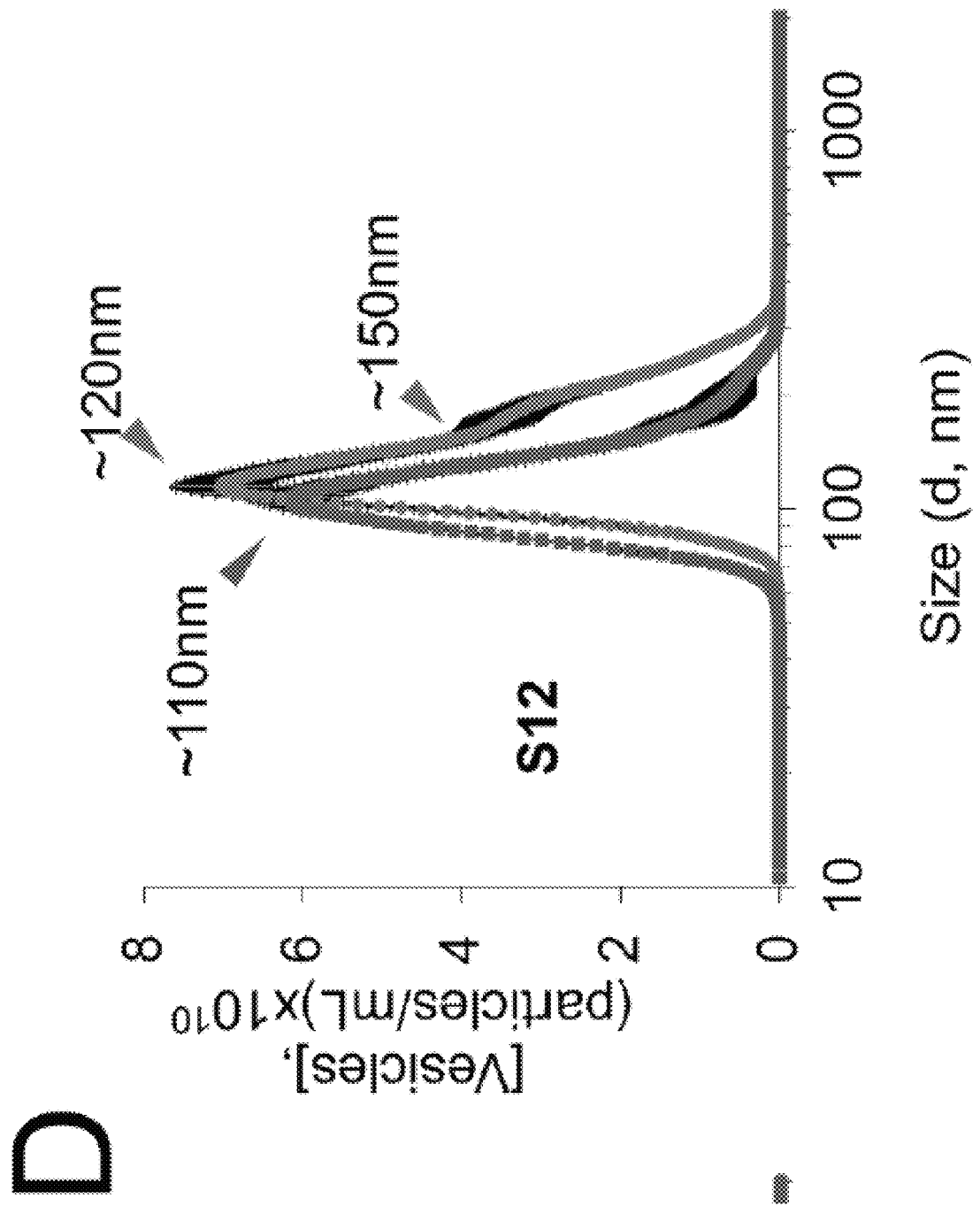
Figure 8A:
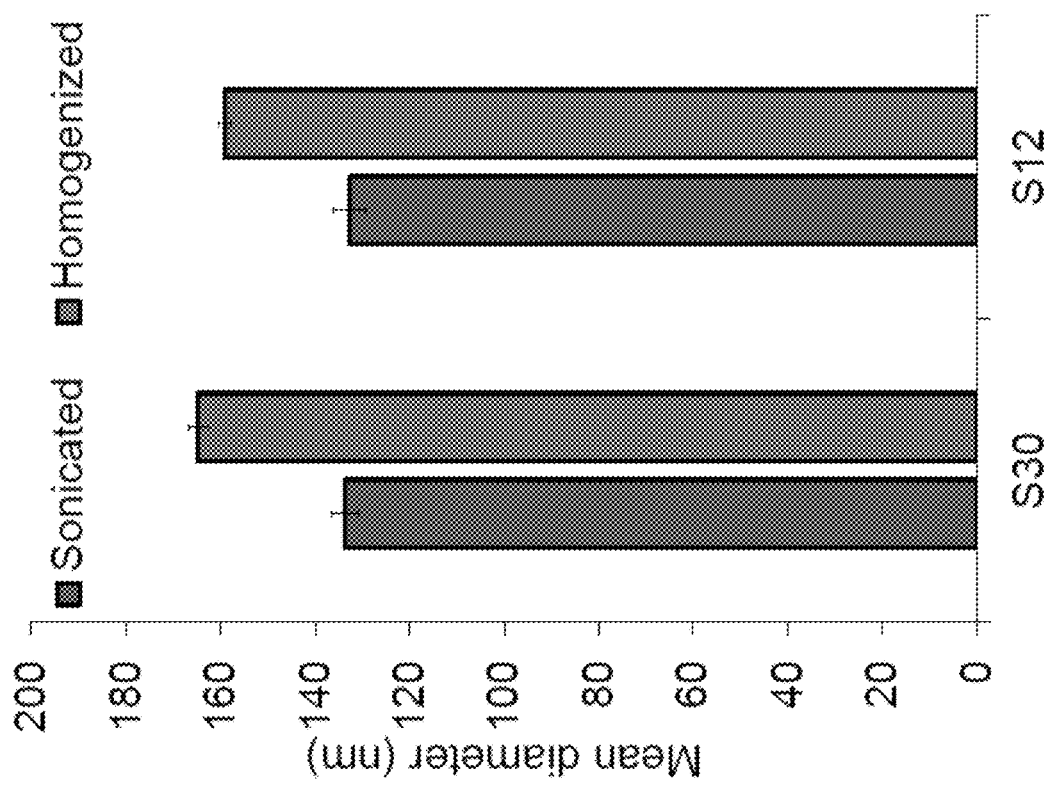
FIGS. 8A-8C. Additional light scattering characterization of extracts presented in FIG. 2. (A) shows mean vesicle diameters in extracts, determined by NTA. DLS analysis of (B) S30 and (C) S12 extracts. Spectra corroborate a larger, right-shifted peak in homogenized extracts in both cases. Consistent with NTA particle counting, the relative peak heights of ~20 nm peak (ribosomes/small cellular complexes) to vesicle peak indicates that homogenized extracts contain higher concentrations of vesicles than sonicated extracts for each given prep method. Error bars represent standard deviations of measurements of three independent extracts.
Figure 8B:
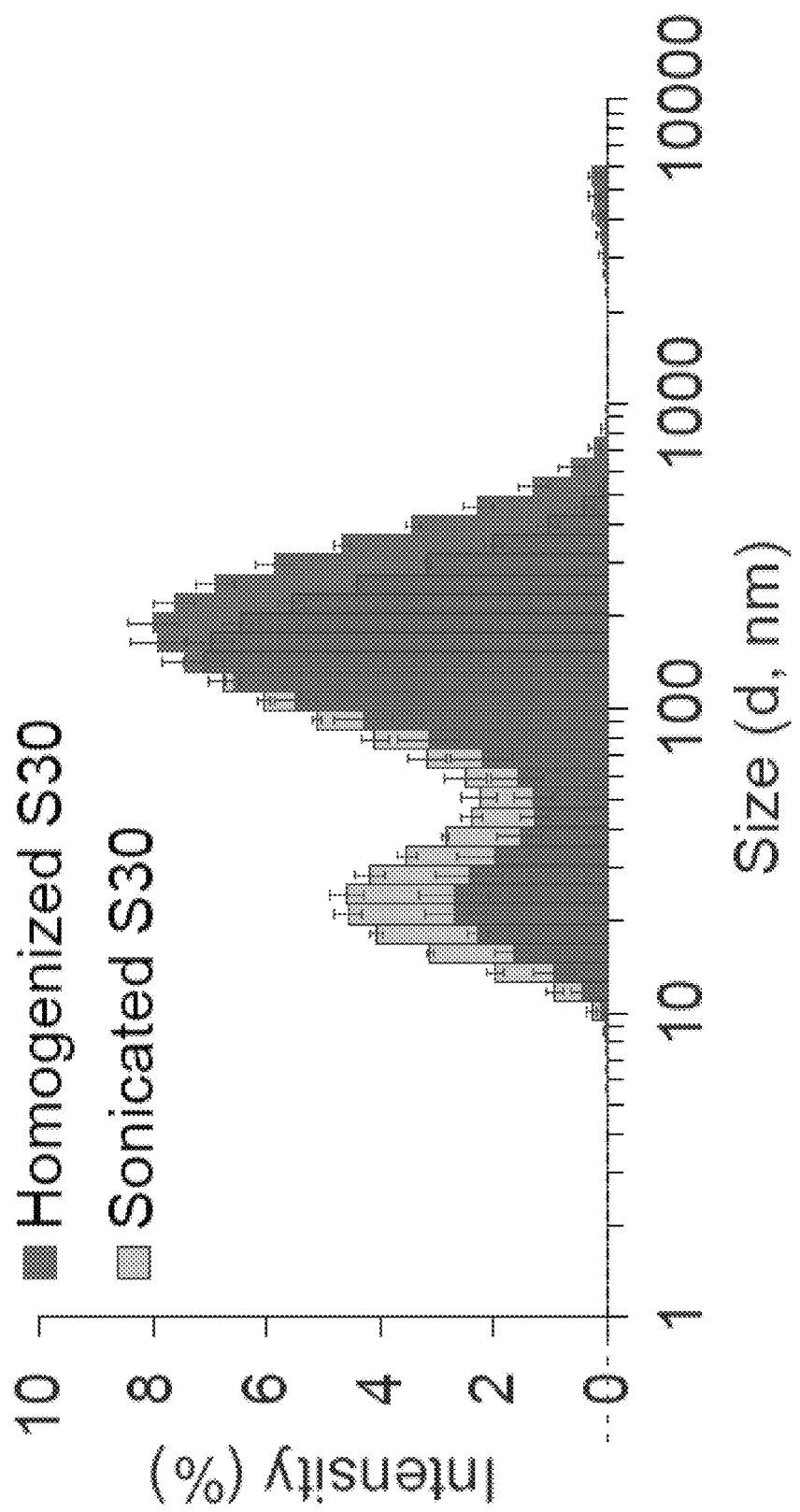
Figure 8C:
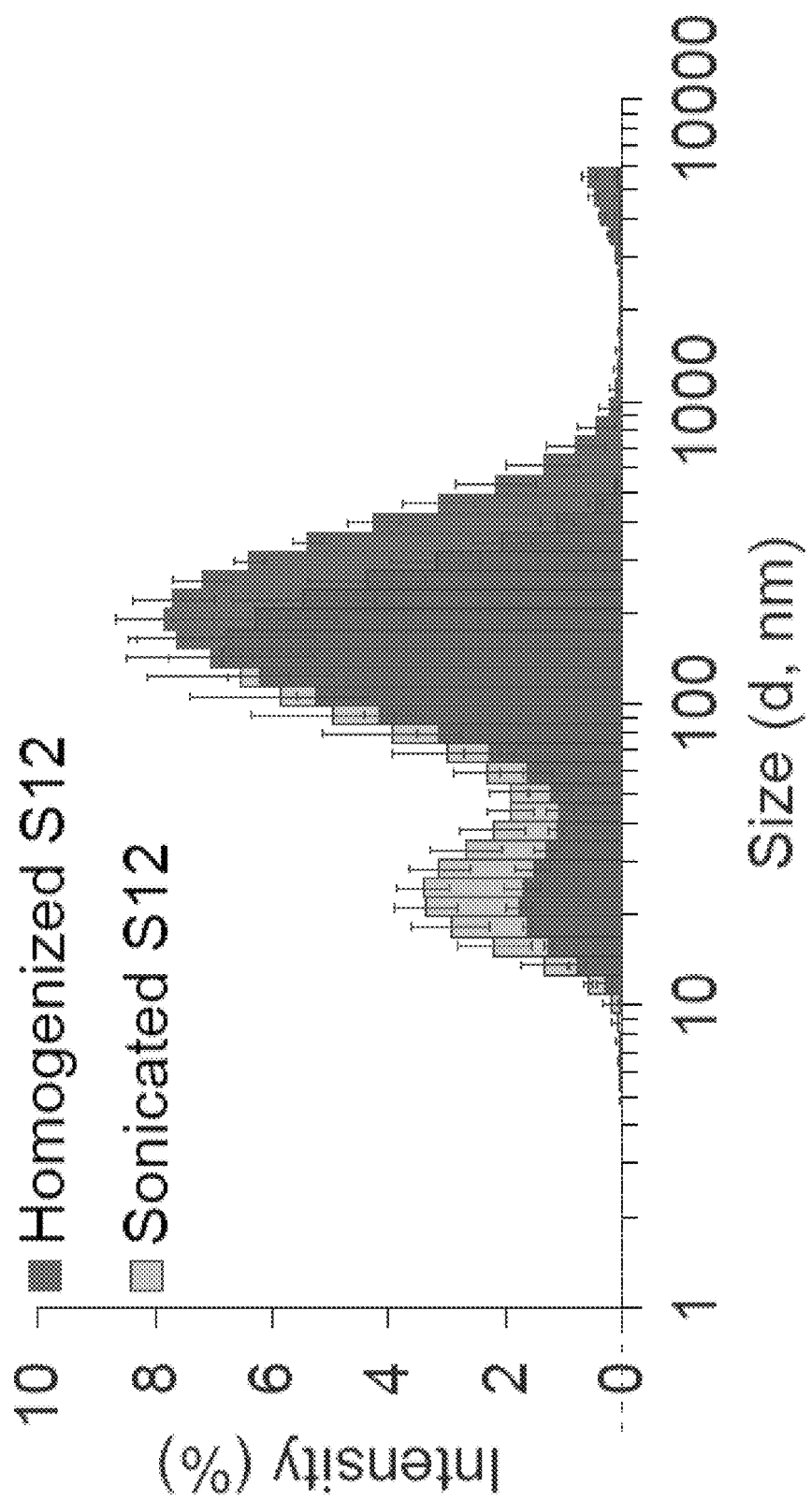

While centrifugation impacted vesicle concentration, lysis method impacted vesicle size. Sonicated extracts contained smaller vesicles with narrower size distributions than homogenized extracts, regardless of centrifugation protocol. Our observations that lysis method impacts vesicle size is consistent with studies showing that varying experimental parameters to disperse phospholipids (or amphiphiles in general) impacts vesicle sizes[66]. PSDs of sonicated extracts reached single maxima at ~110 nm, with average particle diameters of ~130 nm; homogenized extracts had higher average particle diameters of ~160 nm, displaying distinct peaks at ~120 nm, and considerable shoulder peaks at ~150 nm (FIG. 2C-2D, FIG. 8A). Homogenized PSDs may indicate the presence of multiple, discrete, vesicle populations (FIG. 2C-2D). DLS measurements confirmed the observation that sonicated extracts contained relatively smaller, less polydisperse vesicles than homogenized extracts (FIGS. 8B-8C). Notably, direct vesicle analysis in extracts enabled us to gauge the impacts of extract processing in ways that have not been previously accessible and provides benchmarks for intact vesicle concentrations in extracts.

Figure 3A:
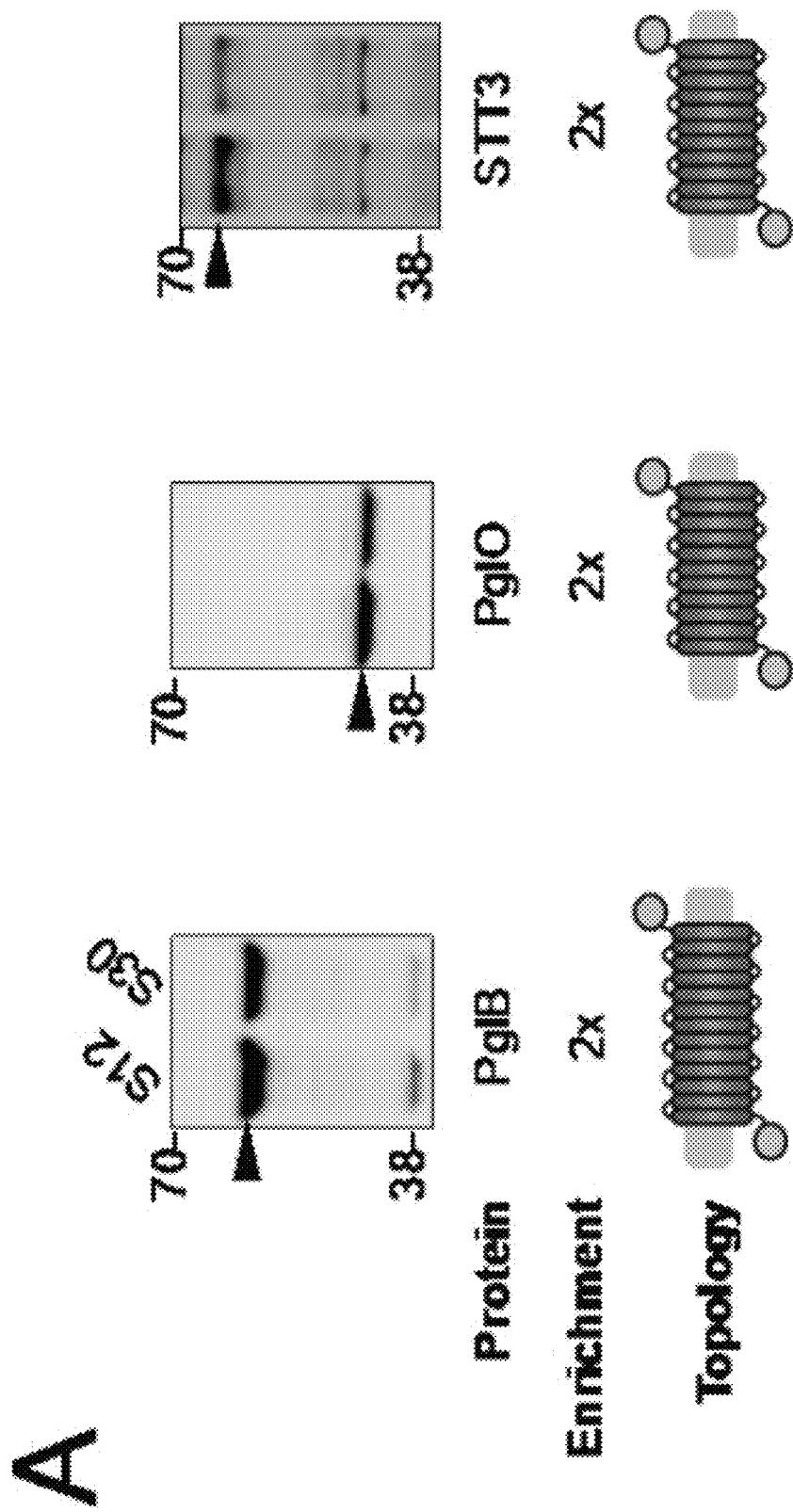
FIGS. 3A-3D. Heterologous membrane-bound cargo can be controllably enriched via membrane vesicles. Enrichment of heterologous membrane proteins in S12 and S30 extracts was quantitated using α-FLAG Western blots against the heterologous proteins for (A) glycosylation enzymes and (B) signal transduction proteins. (C) Cytosolic sfGFP control with no transmembrane helices. On each Western blot, left lanes are S12 extracts and right lanes are S30 extracts. Black arrow indicates the membrane protein of interest. Molecular weight (kDa) from protein ladder standards are indicated to the left of each blot. Protein names and enrichment ratio of bands (S12/S30) are shown directly below each blot. All blots are representative of 3 independent experiments. Cartoons depict the transmembrane topology for each protein. See Supplementary Table 1 for taxonomical origin, transmembrane topology, functions(s), theoretical size, and UniProt ID. (D) Fluorescence chromatograms of SEC analysis of extracts probed with a fluorescent α-FLAG antibody. Strains used to prepare extracts were enriched with no membrane protein (gray trace), PglB (dark purple trace), or PglO (light purple trace). Characteristic vesicle elution fraction from 3 independent experiments is highlighted in gray.
Figure 3B:
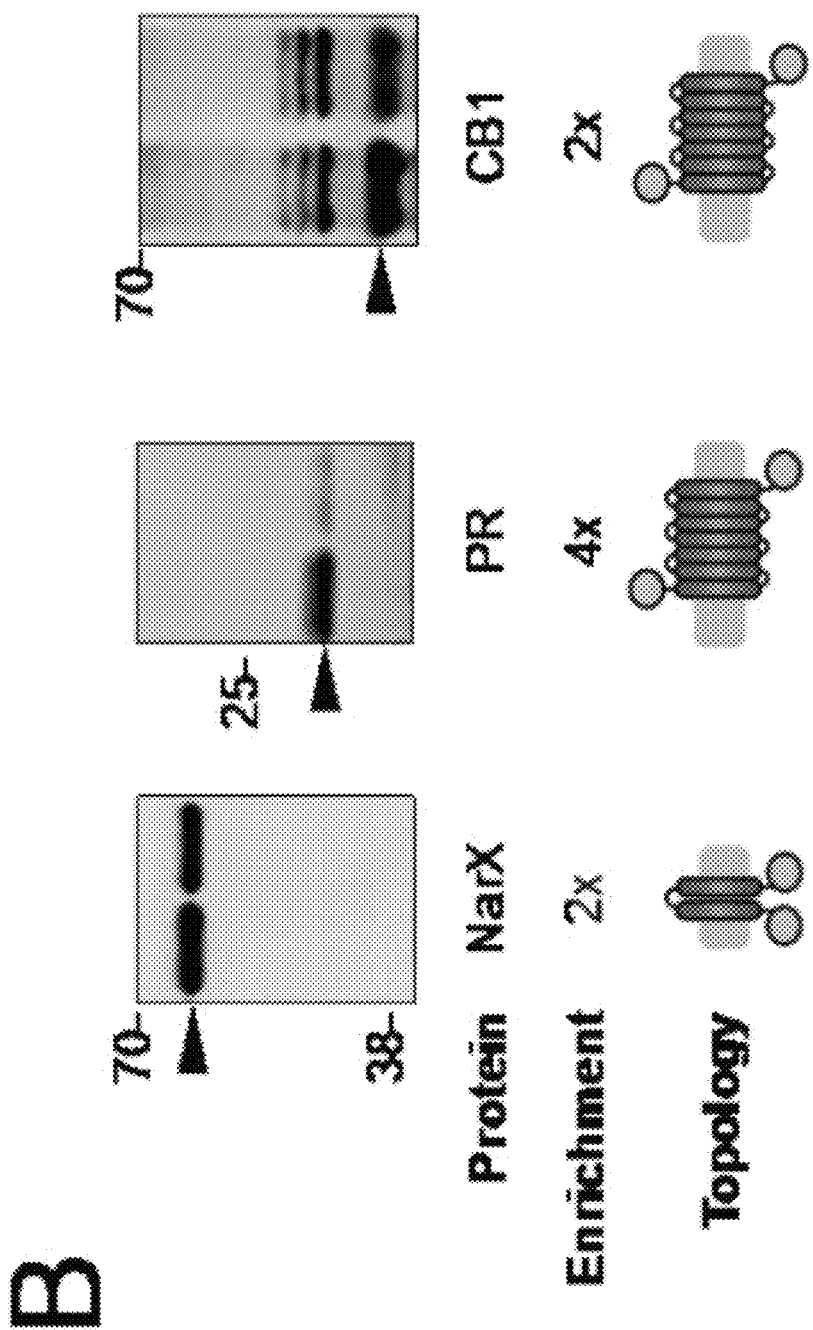
Figure 3C:
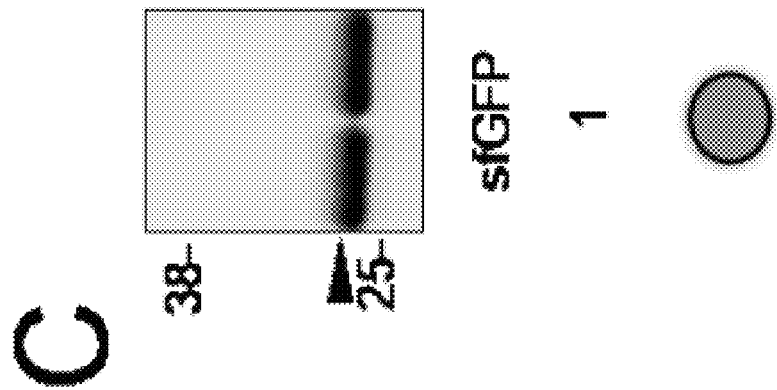
Figure 7B:
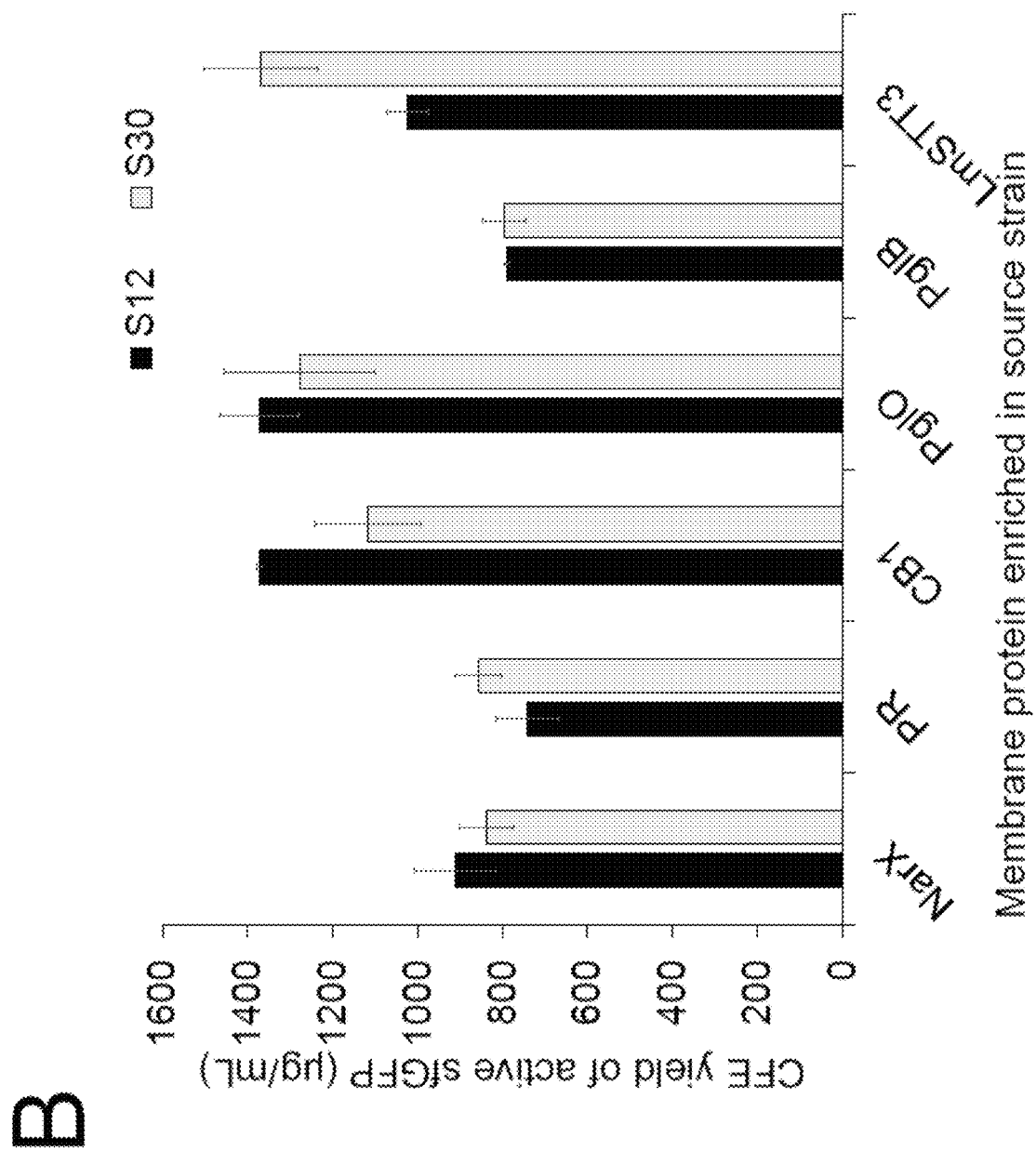
Figure 7C:
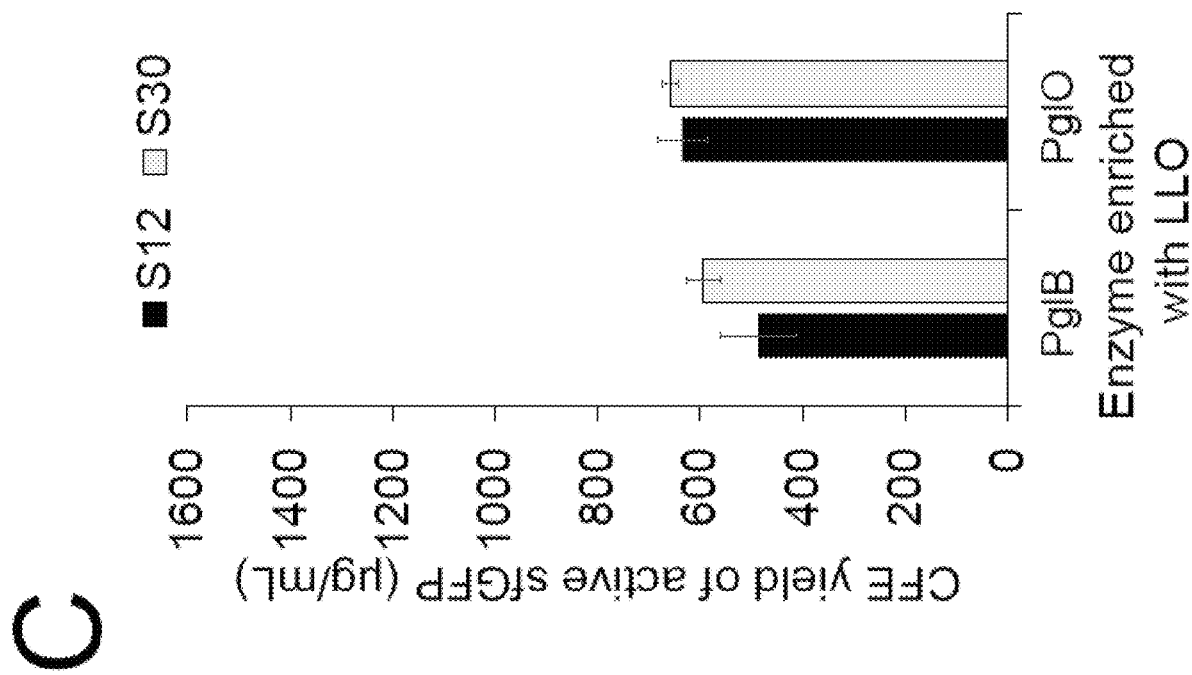
Figure 9A:
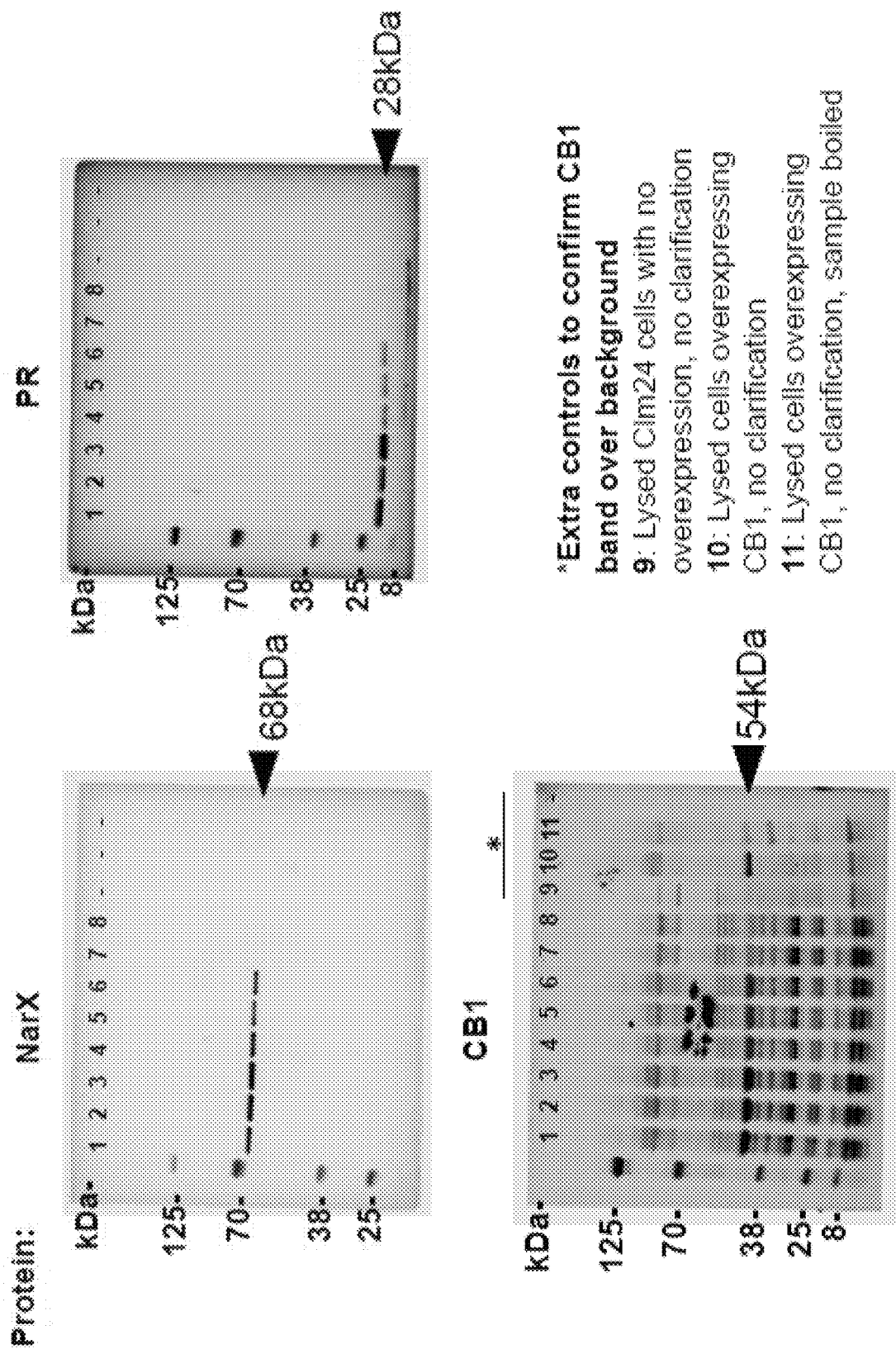
Figure 9B:
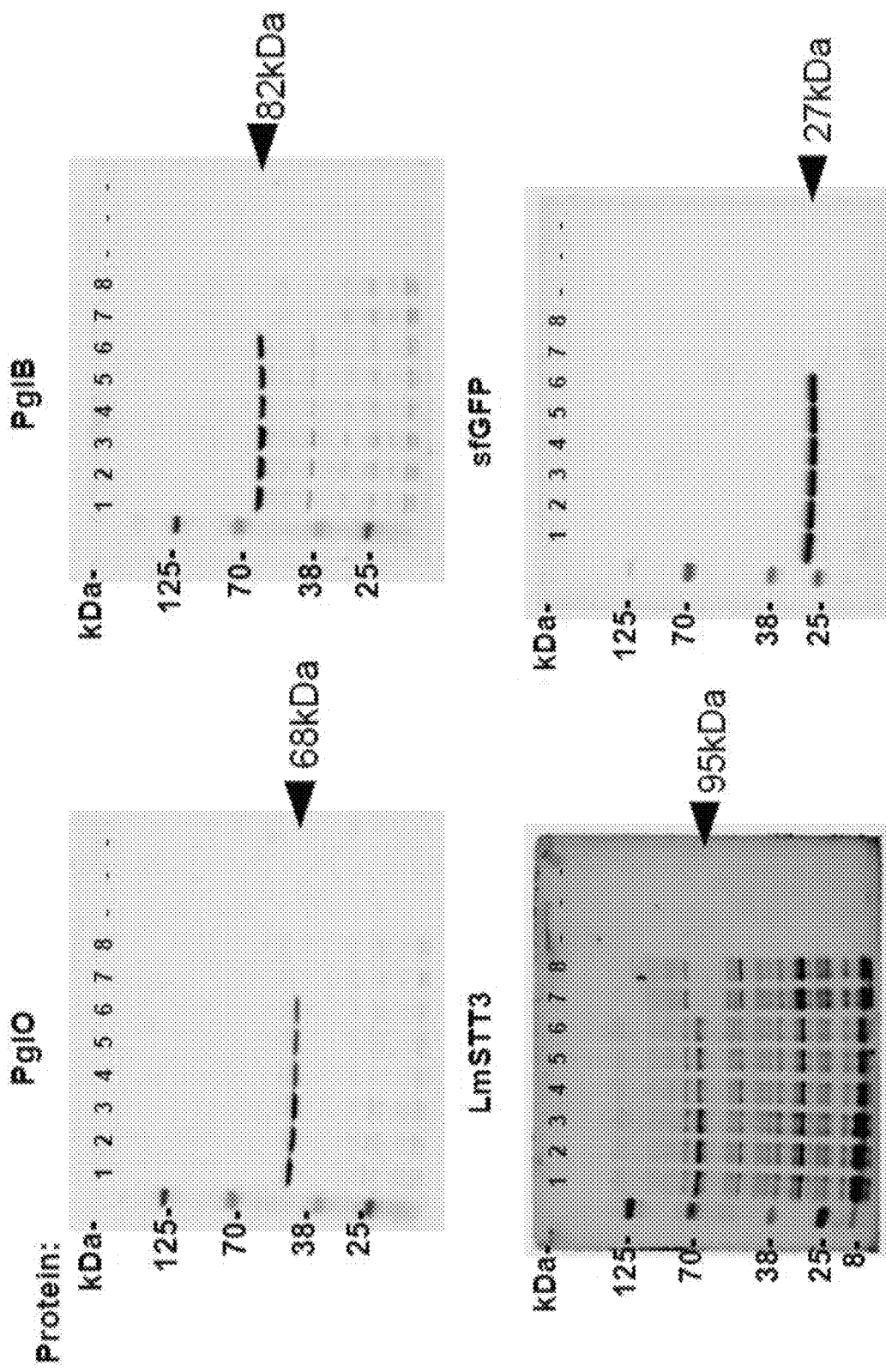

Heterologous membrane-bound cargo can be controllably enriched via membrane vesicles. With a better understanding of the characteristics and concentrations of native vesicles, we sought to enrich extracts with vesicles containing heterologous cargo derived from the periplasmic membrane of *E. coli*. Since S12 extracts contain higher concentrations of vesicles than S30 extracts, we hypothesized that S12 extracts would also contain higher concentrations of associated heterologous cargo. The highest dynamic range of vesicle concentration between S12 and S30 preps was observed with homogenization, so we proceeded with homogenization for enrichment experiments (FIG. 2B). We overexpressed six membrane-bound proteins of various sizes, transmembrane topologies, biological functions, and taxonomical origins to test for enrichment: PglB, *Campylobacter jejuni*, UnitProt ID Q5HTX9; PglO, *Neisseria gonorrhoeae*, UniProt ID Q5FA54; NarX *Escherichia coli*, UniProt ID POAFA2; Proteorhodopsin, Uncultured marine gamma proteobacterium EBAC3108, UniProt ID Q9F7P4; Cannabinoid receptor 1 (CB1), *Homo sapiens*, UniProt ID P21554; and STT3D, *Leishmania major*, UniProt ID E9AET9. The proteins selected for enrichment encompass classes of proteins that could enable new functionalities in CFE, including glycosylation enzymes (PglB, PglO, STT3) and signal transduction/sensing proteins (NarX, PR, CB1). We expressed each membrane protein in vivo with a C-terminal FLAG tag, prepared S30 and S12 extracts, then analyzed concentrations of the overexpressed membrane protein using quantitative Western blotting. We observed 2-fold membrane protein enrichment in S12 over S30 (S12/S30) extracts for all proteins other than PR, for which we observed 4-fold enrichment (FIG. 3A-3B). As a control, when sfGFP with no transmembrane helices was expressed in vivo, we did not observe significant S12/S30 enrichment (FIG. 3C). Full blots for FIG. 3A-3C are shown in FIG. 9. Notably, enrichment values obtained via blotting correspond closely with the 2-fold vesicle enrichment observed via NTA in homogenized S12 and S30 extracts with no overexpression (FIG. 2B). All extracts with pre-enriched membrane proteins displayed protein synthesis activity (FIG. 7B).

Figure 3D:
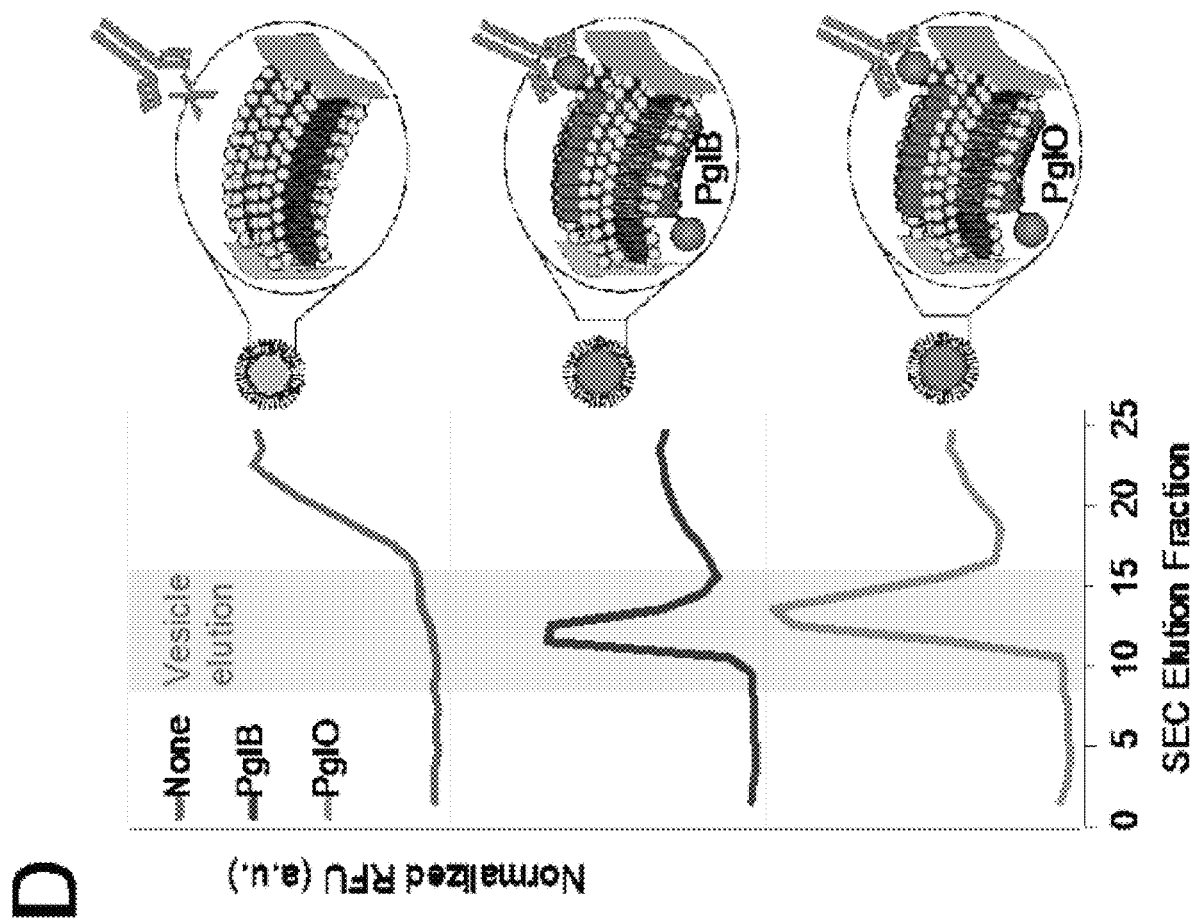

We next confirmed that PglB and PglO, key enzymes for glycosylation, were associated with membrane vesicles, as opposed to free in solution (FIG. 3D). Extracts with pre-enriched PglB or PglO were probed with a green fluorescent α-FLAG antibody, then analyzed via SEC. Fluorescence chromatograms are shown in FIG. 3D, with the characteristic vesicle elution fraction highlighted in gray (FIG. 6A). The characteristic vesicle elution peak corresponded with green fluorescence for extracts containing PglB or PglO and no corresponding peak was observed in an extract with no overexpressed membrane protein (FIG. 3D). Our results show that heterologous, periplasmic membrane cargo can be pre-enriched in extract and tuned via vesicles.

Figure 10A:
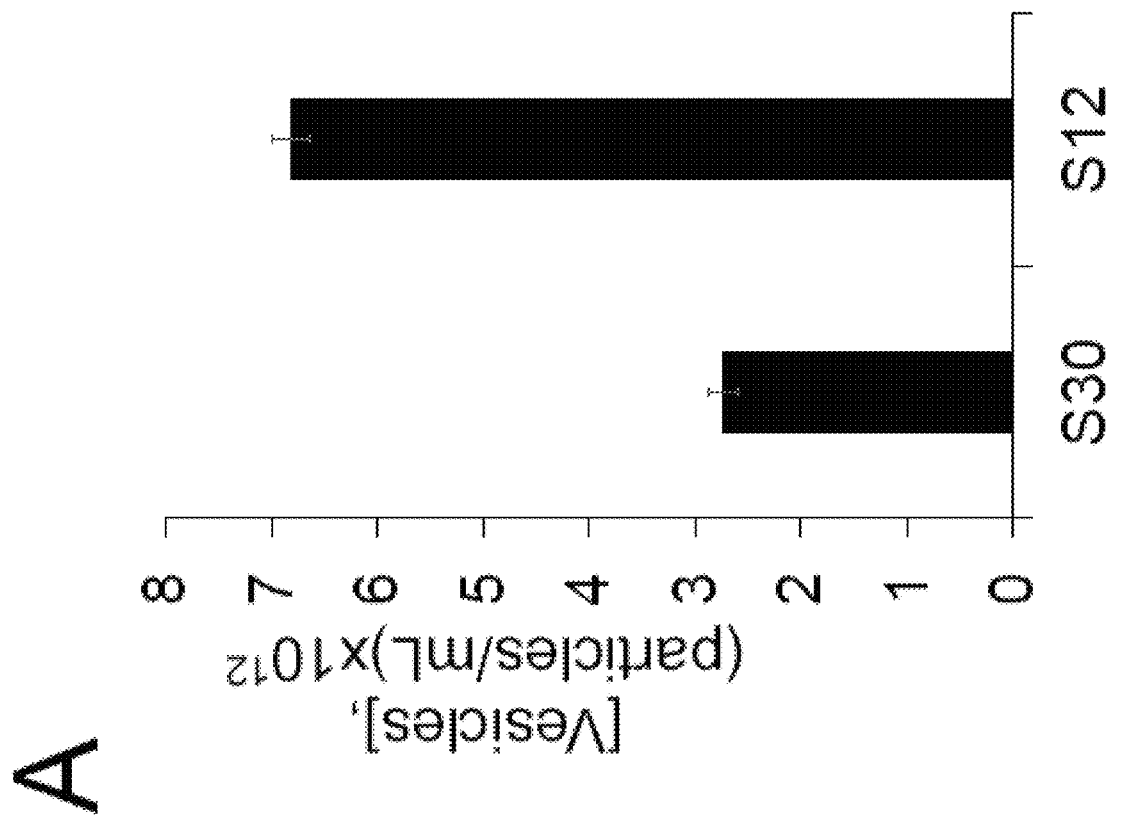
FIGS. 10A-10B. Characterization of vesicle and PglB enrichment in CFGpS extracts. (A) Concentrations of vesicles in extracts enriched with PglB and C. jejuni LLO, measured via NTA. Error bars represent standard deviation of measurements of three independent extracts. (B, left) α-FLAG Western blot against PglB in an extract enriched with both OST and LLO and corresponding lane key (B, right).
Figure 10B:
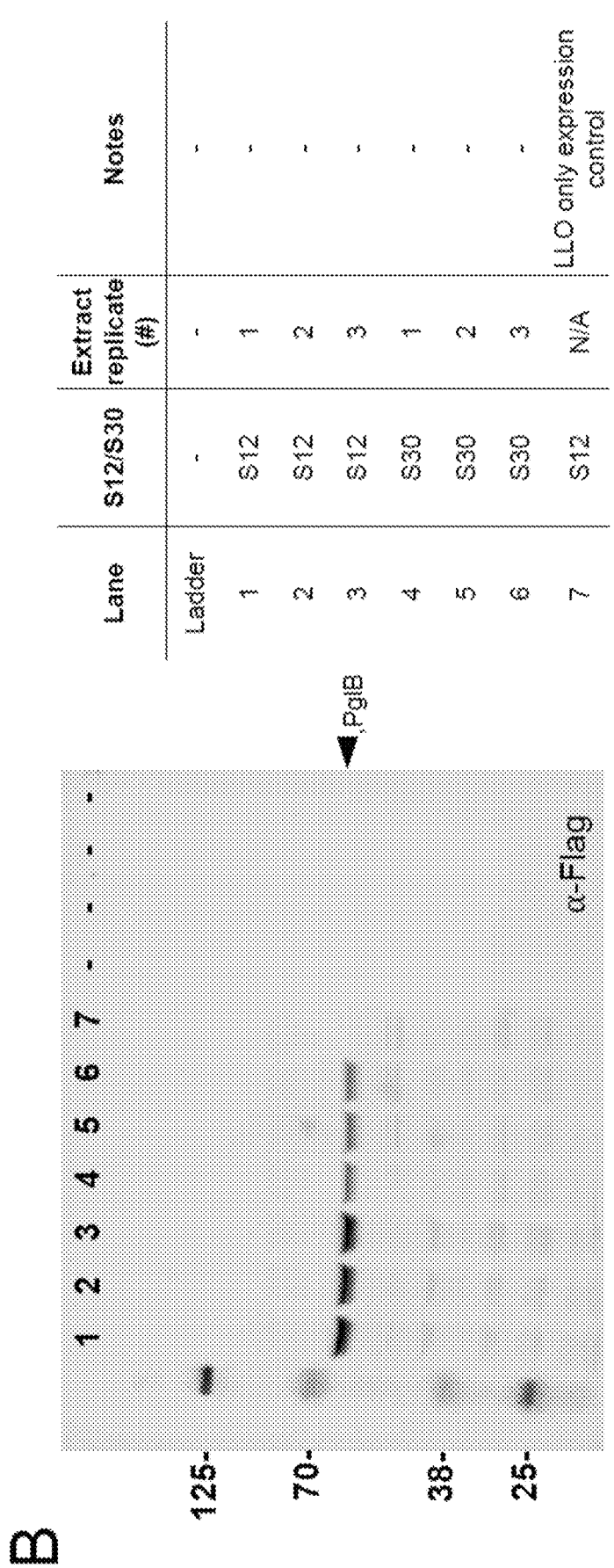
Figure 11A:
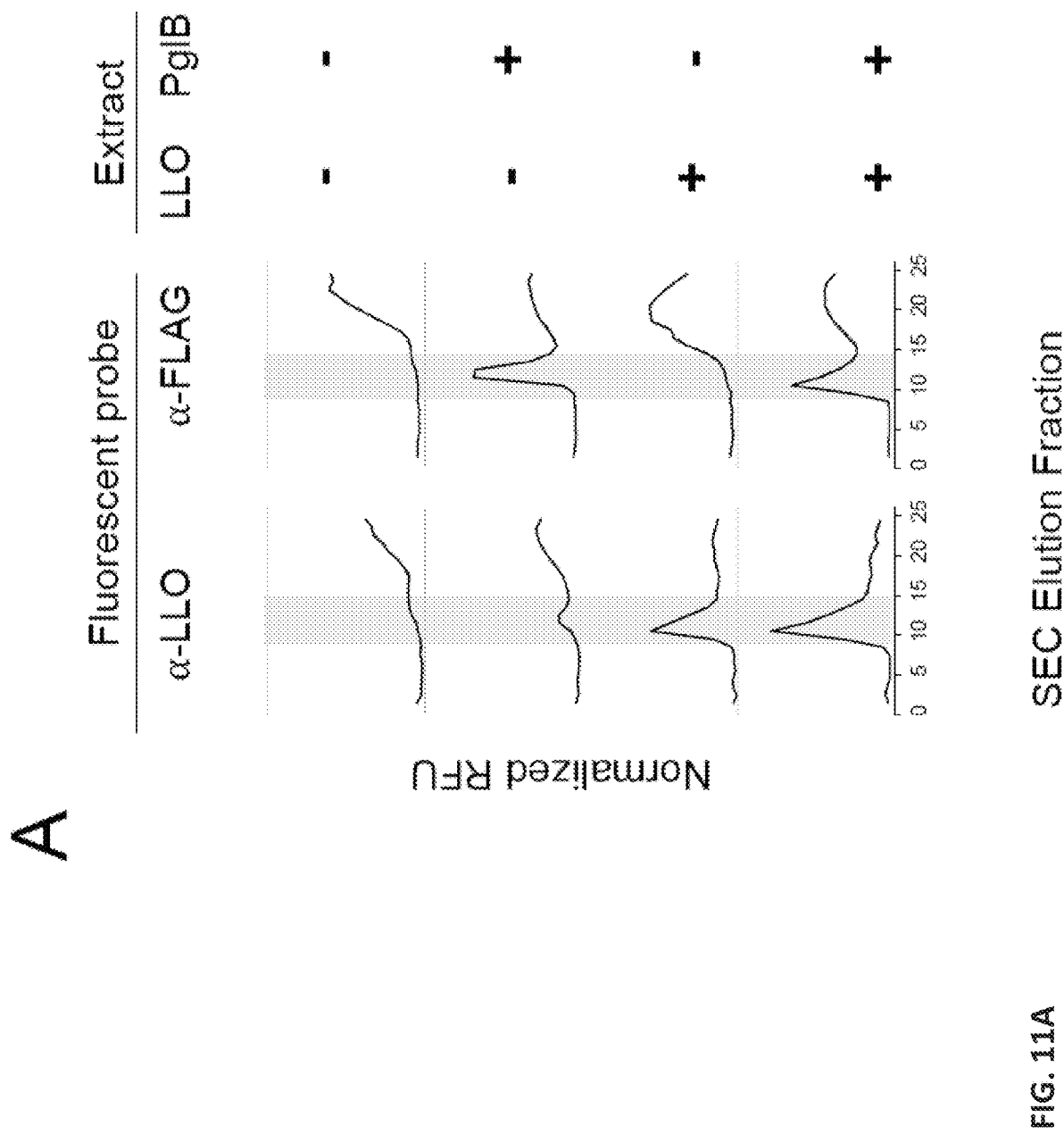
FIGS. 11A-11B. Glycosylation components are embedded in membrane vesicles. Fluorescence SEC chromatograms of S30 extracts probed with α-LLO and α-OST reagents are presented. Vesicle elution fraction is highlighted in gray. analysis of extracts and controls with the N-linked PglB OST are presented in (A) and for the O-linked PglO OST in (B).

Increasing vesicle concentrations improves cell-free glycoprotein synthesis (CFGpS) for N- and O-linked glycosylation systems. We next set out to exploit our ability to enrich vesicles harboring heterologous cargo in an application. We focused on protein glycosylation, because glycosylation plays critical roles in cellular function, human health, and biotechnology. As a model, we sought to increase glycoprotein yields in a previously reported CFGpS platform[48] by charging reactions with S12 extracts containing higher concentrations of membrane-bound glycosylation machinery. We prepared S30 and S12 extracts from strains overexpressing the model N-linked glycosylation pathway from *Campylobacter jejuni*, which consists of the membrane-bound oligosaccharyltransferase (OST) PglB that catalyzes glycosylation, and a lipid-linked oligosaccharide (LLO) donor of the form: GalNAc-α1,4-GalNAc-α1,4-(Glcp1,3)-GalNAc-α1,4-GalNAc-α1,4-GalNAc-α1,3-Bac (where Bac is 2,4-diacetamido-2,4,6-trideoxyglucopyranose) from an undecaprenylpyrophosphate-linked donor[67]. NTA and Western blot analysis of CFGpS extracts revealed 2.5-fold S12/S30 enrichment of vesicles and a corresponding 2-fold S12/S30 enrichment of PglB (FIG. 10). Fluorescence staining and SEC analysis confirmed the presence of LLO and PglB in vesicles (FIG. 11A).

Figure 4A:
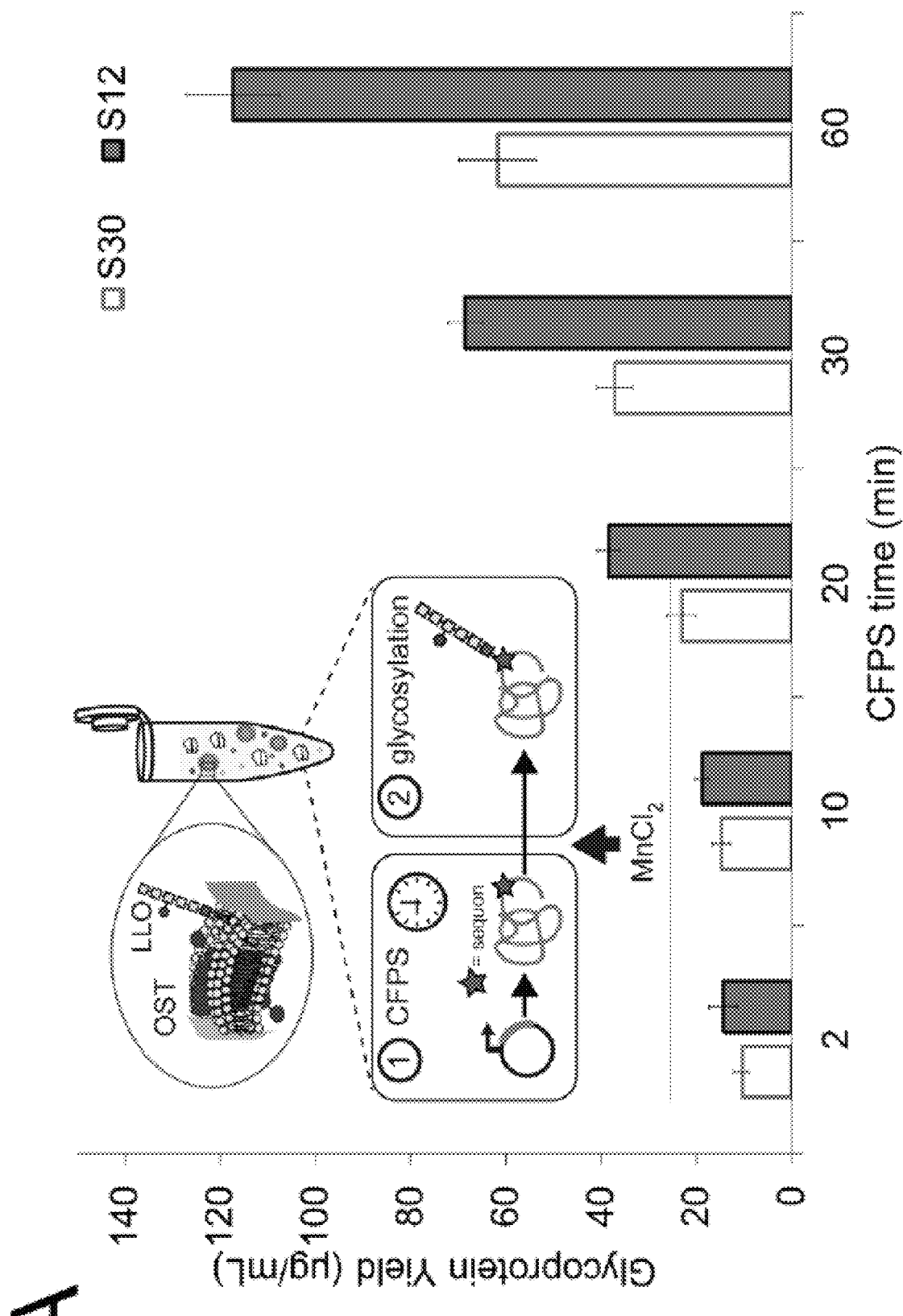
FIGS. 4A-4E. Increasing vesicle concentrations improves cell-free glycoprotein synthesis (CFGpS) for N- and O-linked glycosylation systems. (A) Glycoprotein yields of CFGpS reactions charged with S12 or S30 extracts enriched with PglB and C. jejuni LLO. Error bars represent standard deviation of 3 independent CFGpS reactions, each run with an independent extract. (Inset) Schematic of 2-phase CFGpS reactions. (B) Glycosylated (dark green) and total (light green) protein yields of N-linked CFGpS reactions with 20 minute CFPS times. Error bars represent standard deviation of 3 independent reactions. (Inset) Sequon preferences for general N-OST mediated (gray star) and PglB (pink star) mediated glycosylation. Glycosylated residue is bolded. (C) Western blots of acceptor proteins from representative reactions in (B), where $g_o$ denotes aglycosylated acceptor protein and $g_1$ indicates glycoprotein. (D) Glycosylated (dark purple) and total (light purple) protein yields from O-linked CFGpS reactions with 20 minute CFPS times. (Inset) Sequon preferences for general 0-OST (gray star) and PglO (pink star) mediated glycosylation. Glycosylated residue is bolded. (E) Western blots of acceptor proteins from representative reactions in (D). All gels are representative of 3 independent CFGpS reactions.
Figure 4B:
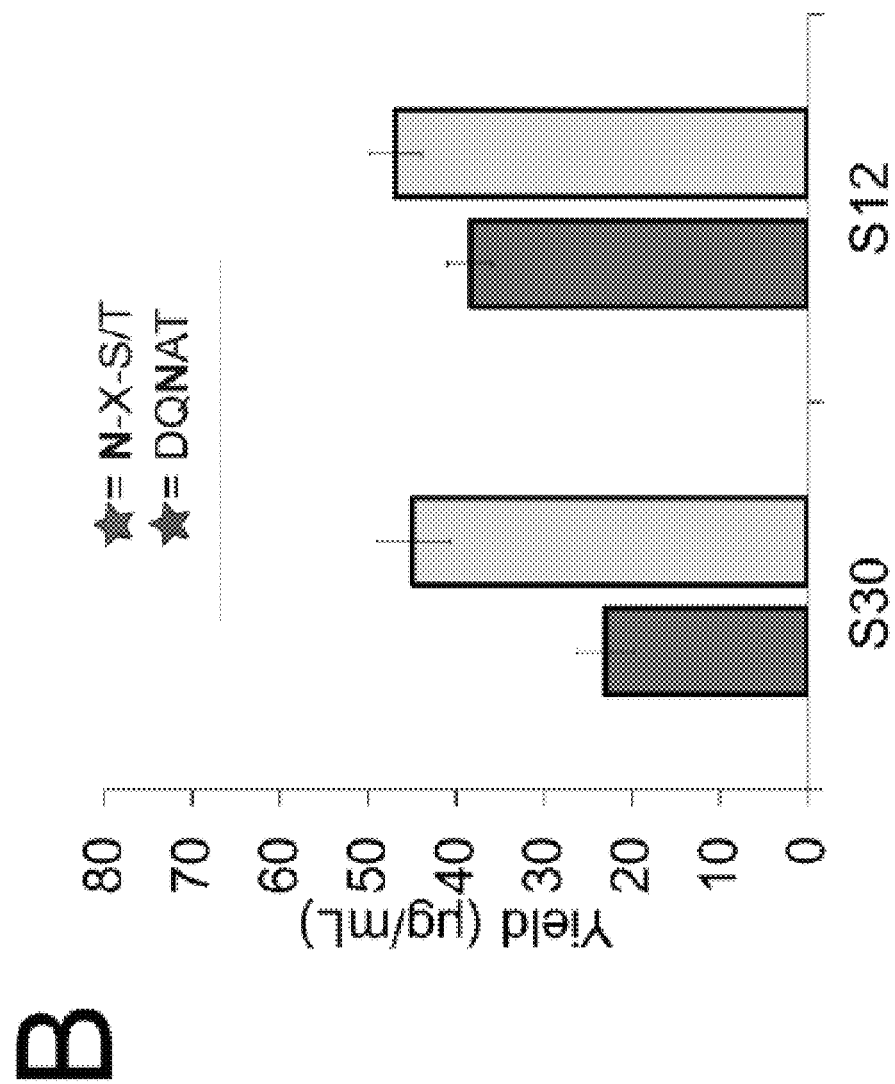
Figure 4C:
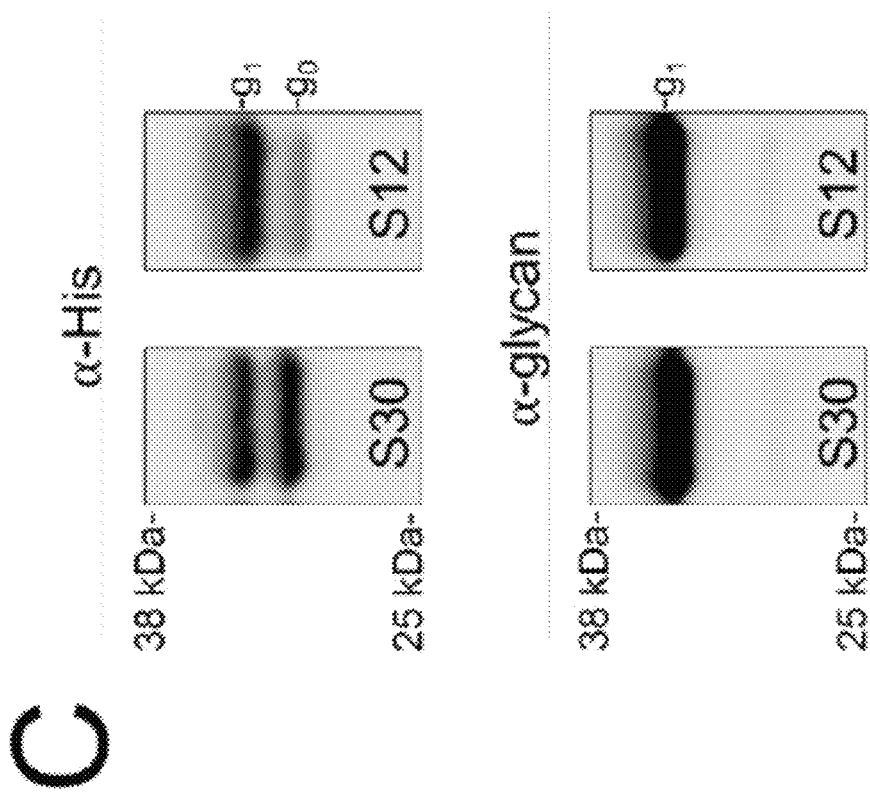
Figure 12A:
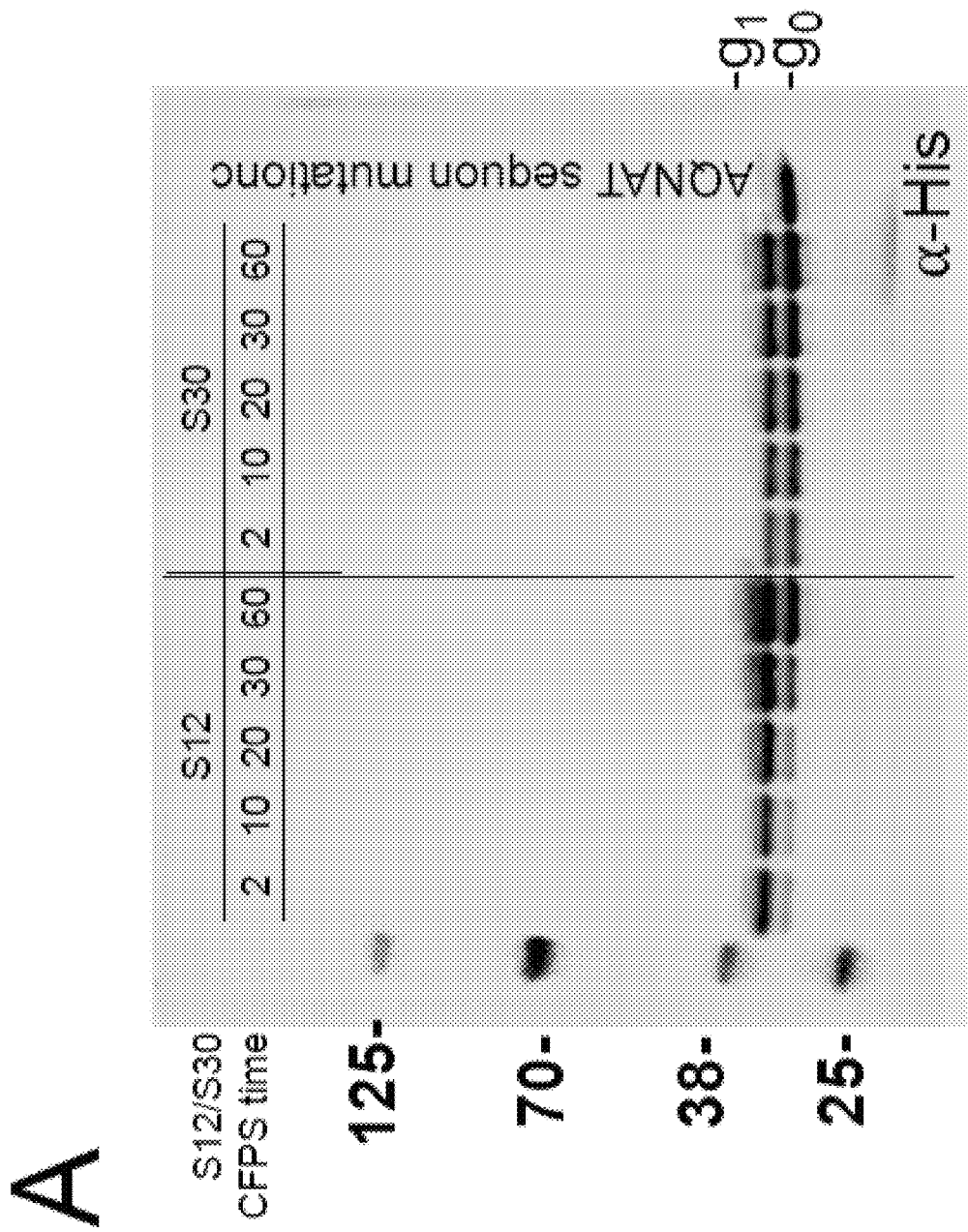
FIGS. 12A-12F. Characterization of N-linked glycosylation in CFGpS extracts. Triplicate α-His Western blots against CFGpS acceptor proteins are shown in (A)-(C) corresponding with extract replicates 1-3. Western blots in (A)-(C) were used to calculate glycoprotein yields in FIG. 4. (D) α-glycan blot of the corresponding reactions in (A). (E) Total acceptor protein produced and (F) percent of acceptor protein converted to glycoprotein at each condition. Error bars represent standard deviation of three independent reactions.
Figure 12B:
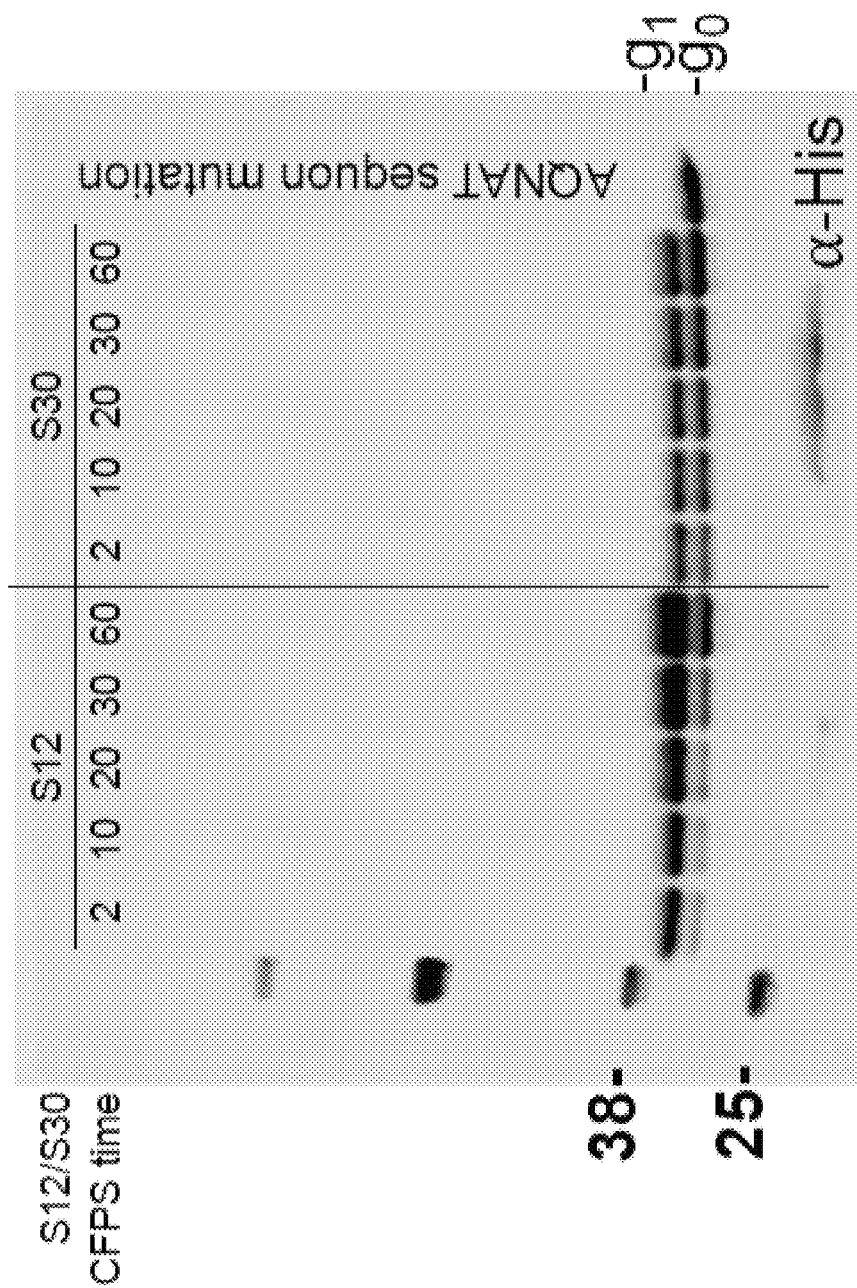
Figure 12C:
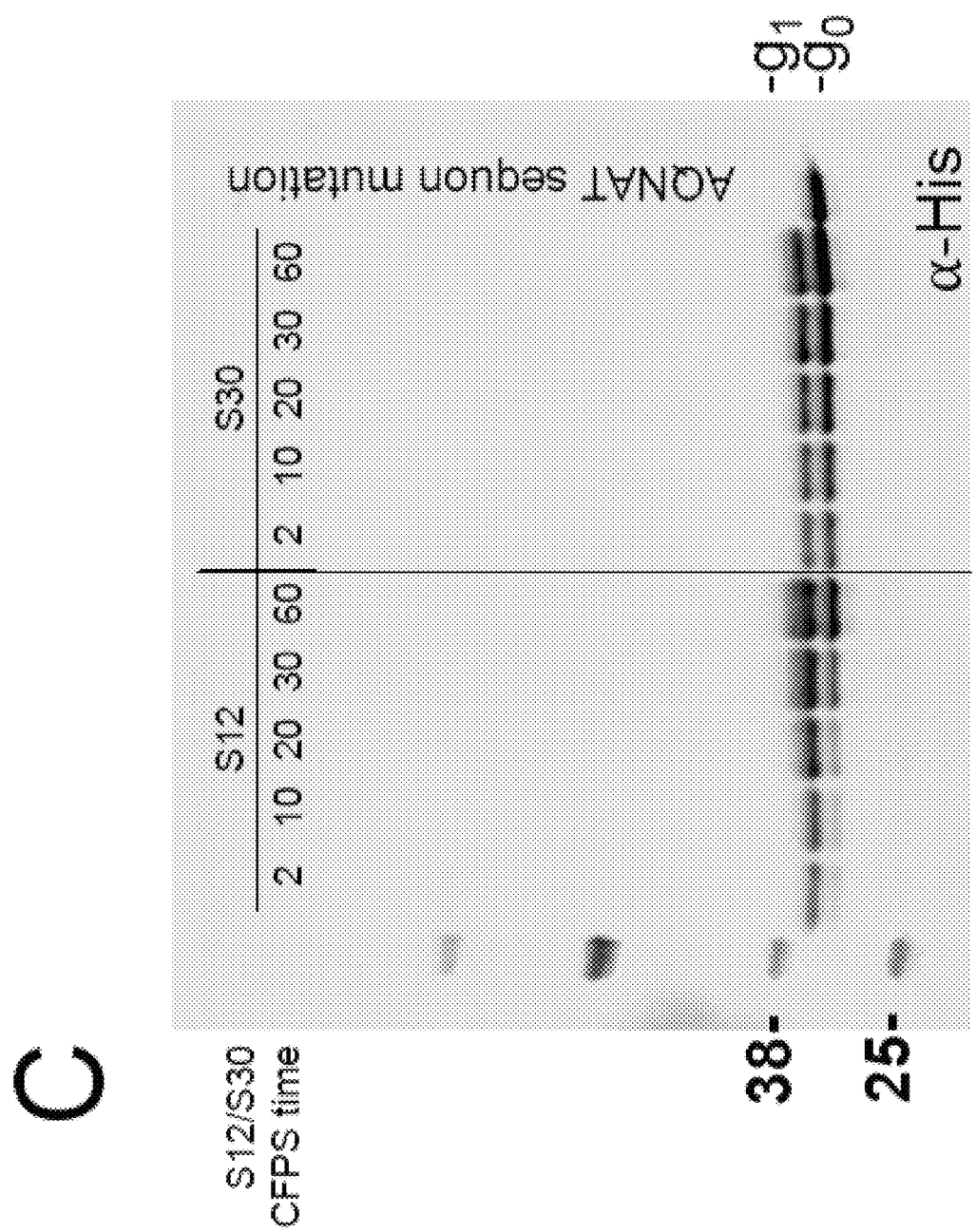
Figure 12D:
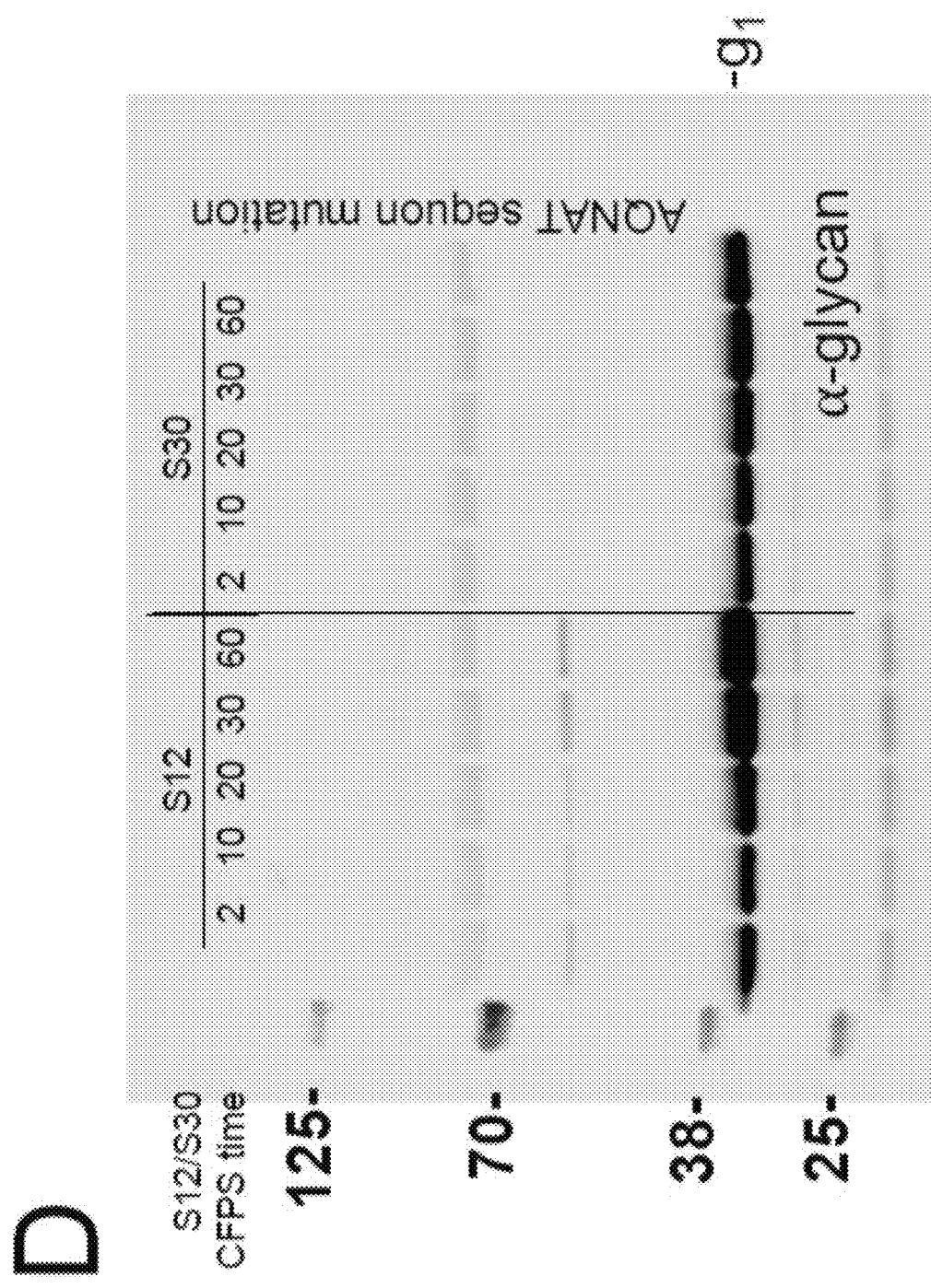
Figure 12E:
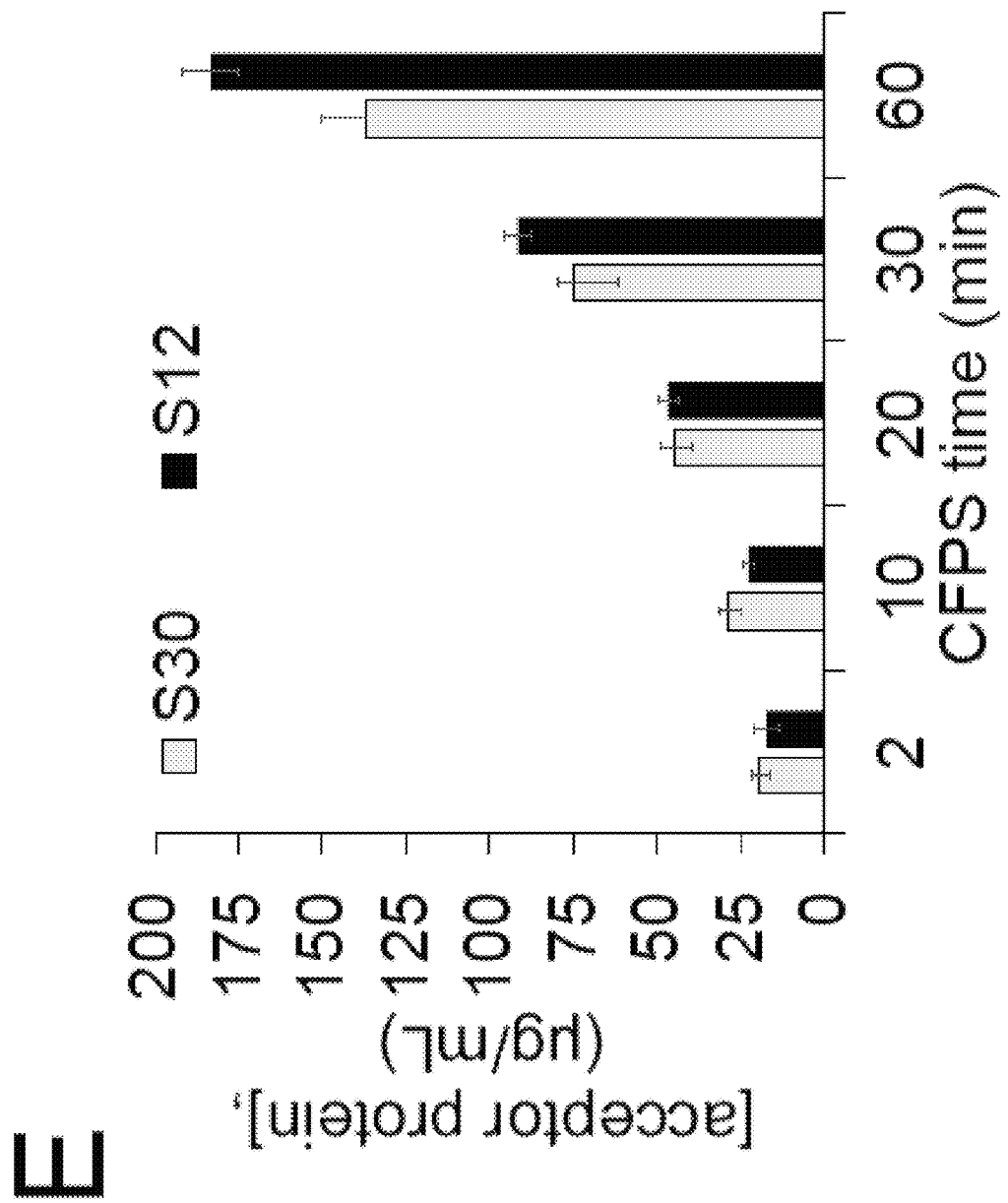
Figure 12F:
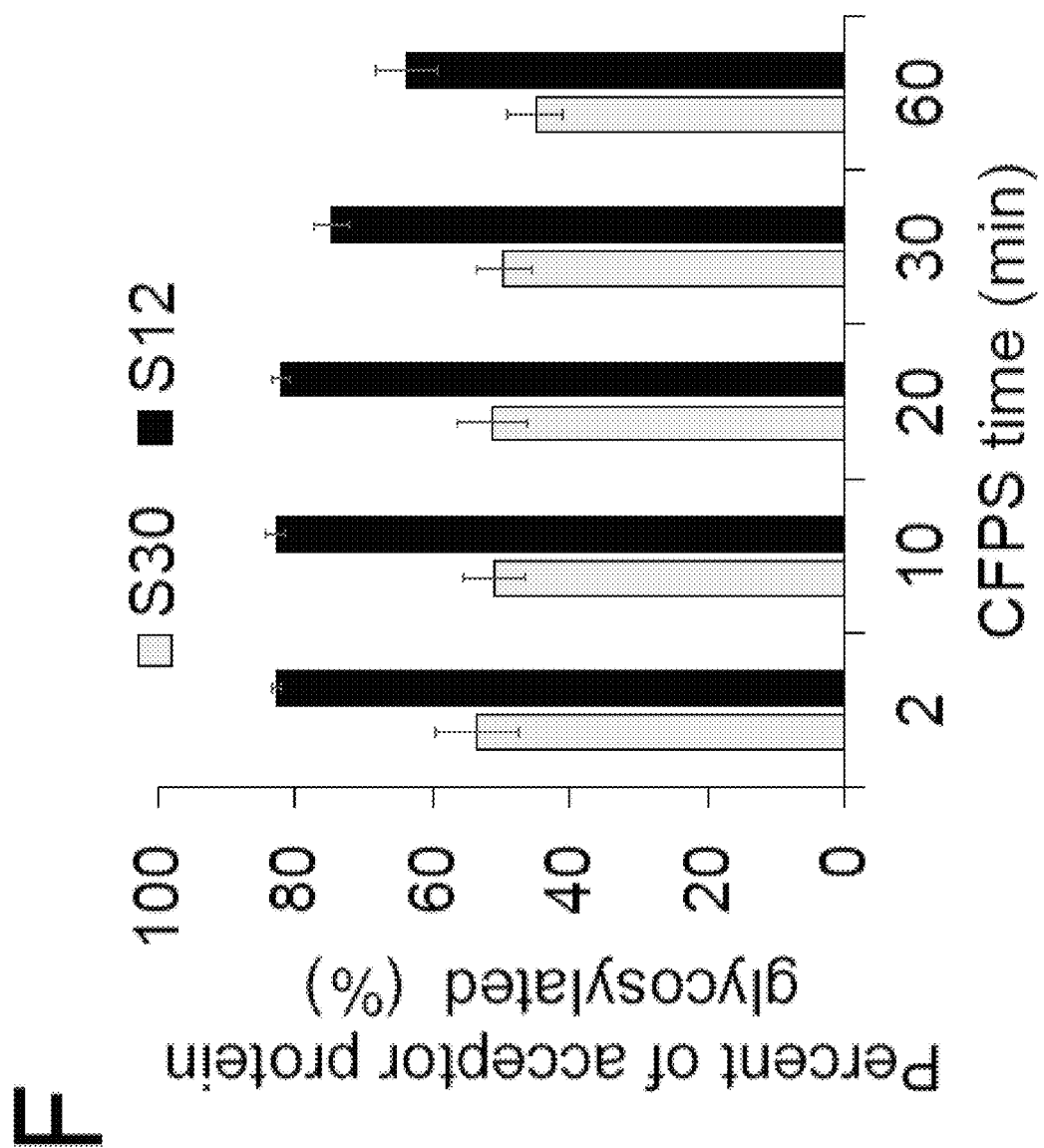

To assess the impact of enriched vesicles on cell-free glycoprotein synthesis, we carried out reactions in two phases (FIG. 4A, Inset)[39]. First, cell-free protein synthesis (CFPS) of the acceptor protein was run for a defined time, termed 'CFPS time'. At the CFPS time, reactions were spiked with $MnCl_2$, quenching CFPS and initiating glycosylation by providing the OST with its $Mn^{2+}$ cofactor. CFGpS reactions charged with S30 or S12 extracts were run for CFPS times of 2, 10, 20, 30, and 60 minutes using a His-tagged sfGFPDQNAT acceptor protein, where DQNAT is a permissible PglB sequon. Endpoint glycoprotein yields were quantified using total acceptor protein fluorescence and % glycosylation determined by Western blotting (FIG. 4A, FIG. 12A-12D). At longer CFPS times we observed that S12 extracts produced significantly more glycoprotein than S30 extracts. Because total acceptor protein concentrations for S30 and S12 reactions were similar for each CFPS time (FIG. 12E), increased glycoprotein yield in S12 extracts is due to higher glycosylation activity and not higher CFE yields. Specifically, at 20, 30, and 60-minute CFPS times, we observed 66%, 85%, and 90% increases in glycoprotein yield in the S12 reactions, respectively. At the 60-minute CFPS time, S12 reactions yielded 117.2±9.9 µg/mL in batch, synthesizing glycoprotein titers on the order of hundreds µg/mL for the first time to our knowledge. (FIG. 4A). S12 reactions also had significantly higher terminal % glycosylation, or percent of CFPS-derived acceptor protein that is glycosylated at the end of a 16-hour glycosylation reaction. This was true for all CFPS times tested (FIG. 12F). For example, for reactions with 20-minute CFPS times, we observed an increase from 51% glycosylation for S30 reactions to 82% glycosylation for S12 reactions (FIG. 4B). α-His (showing glycosylated and aglycosylated acceptor protein) and α-glycan (against the *C. jejuni* glycan) Western blots of representative reactions are shown in FIG. 4C. Taken together, these results indicate that the presence of higher vesicle concentrations in S12 extracts has a measurable effect on CFGpS, improving glycoprotein yields and endpoint % glycosylation.

Figure 4D:
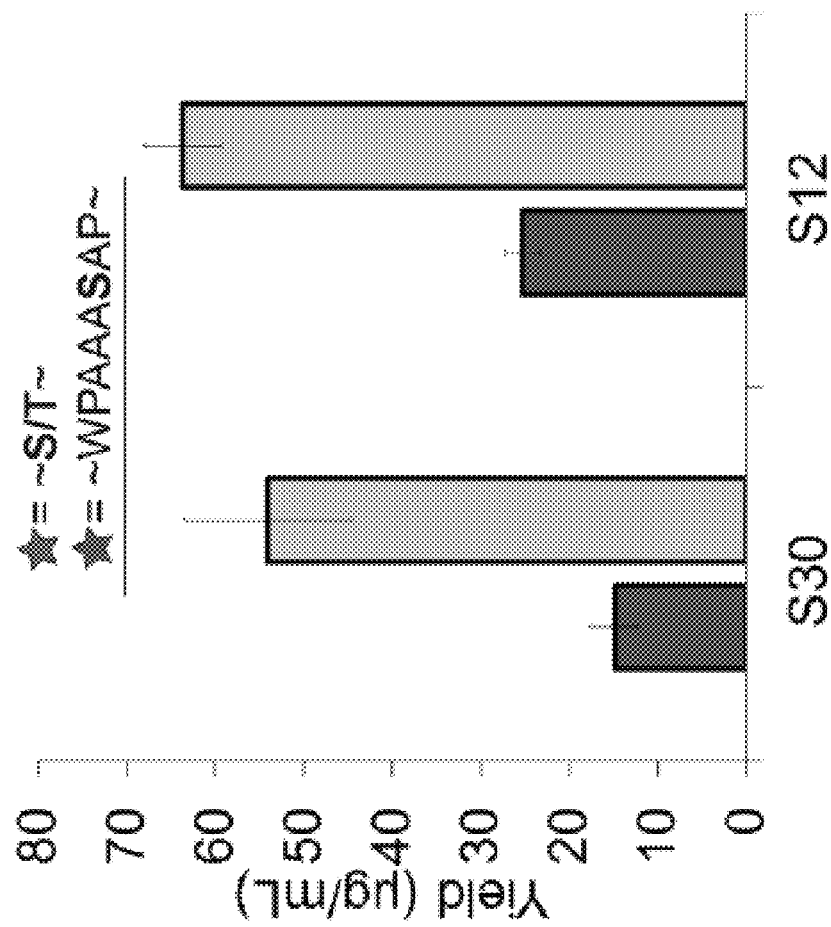
Figure 4E:
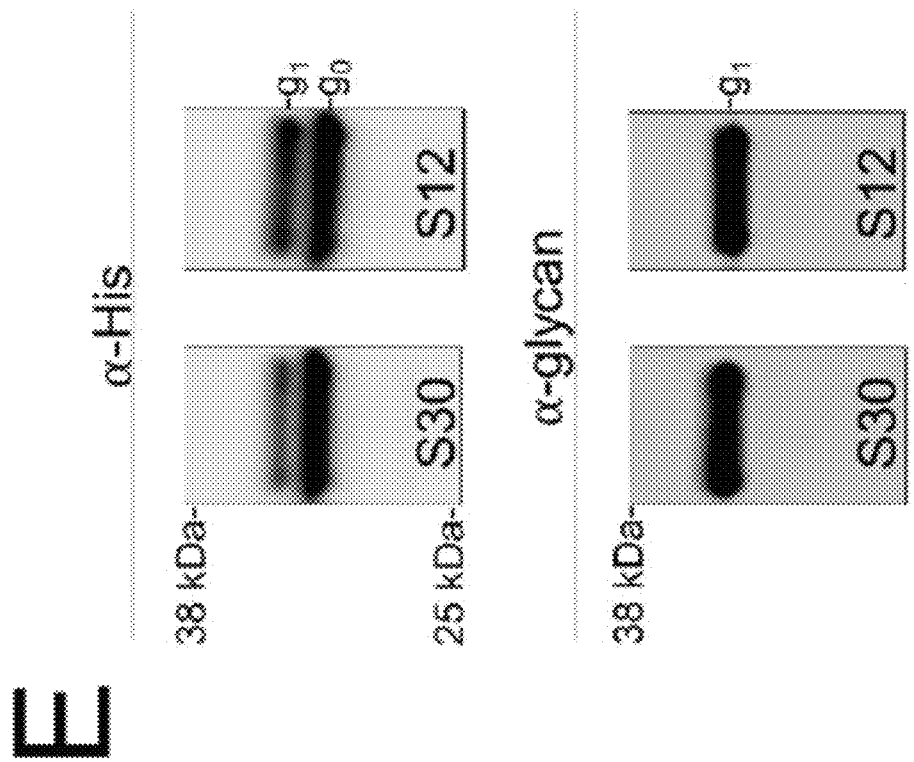
Figure 11B:
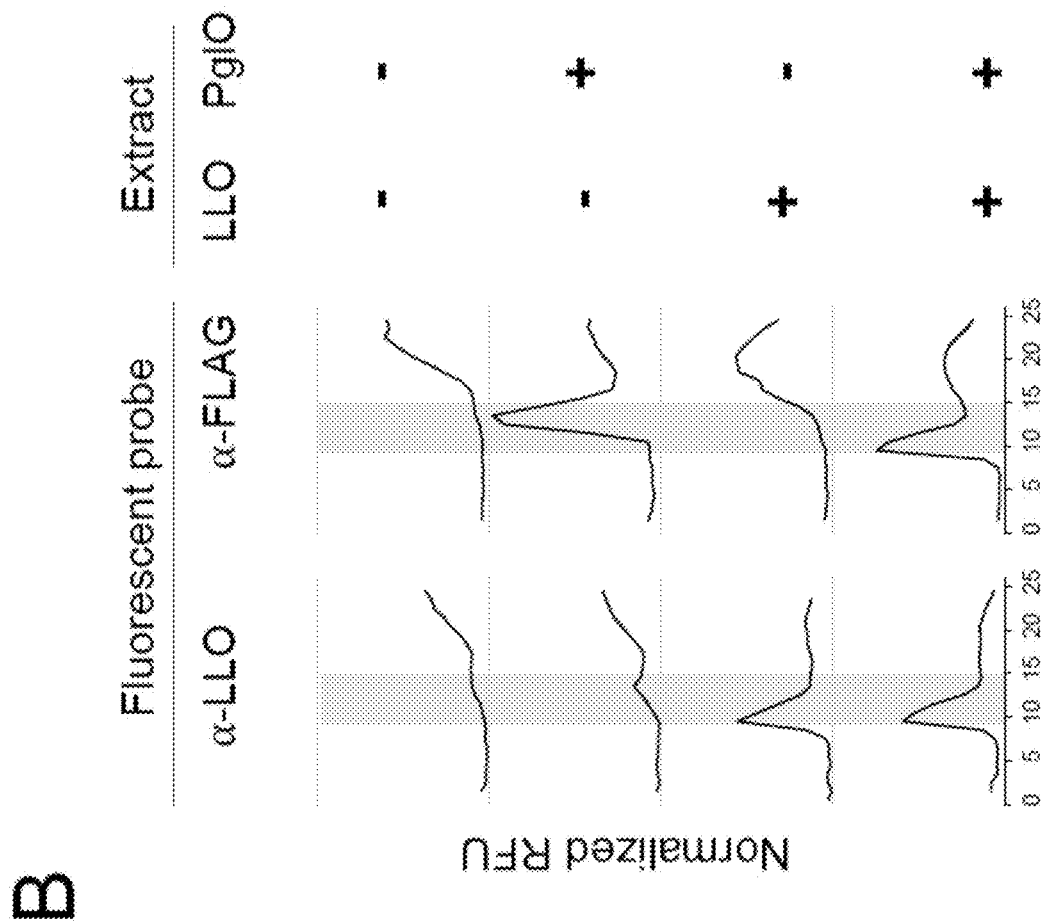
Figure 13A:
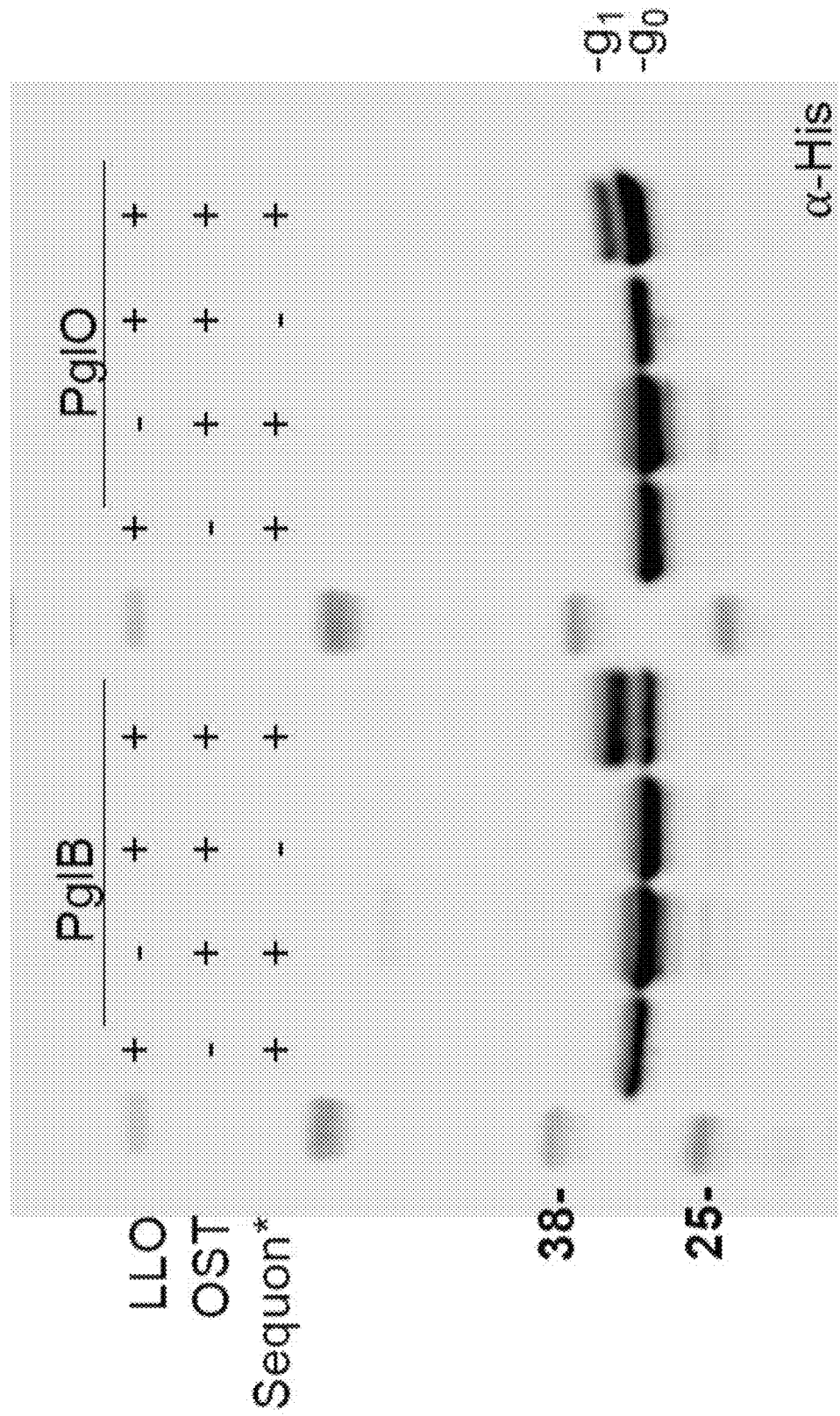
FIGS. 13A-13B. Residue-specific glycosylation of acceptor proteins with permissible sequons for PglB and PglO. Generally, glycosylation preferences of PglO are less understood then those for PglB. PglB samples are used as blotting references for positive and negative controls, as the sequon specificities for positive and negative sequons are well-characterized for PglB. (A) α-His blot of CFGpS reactions run with a 5 minute CFPS time. Glycosylated bands are only present when all glycosylation components and a permissible sequon are present. (B) corresponding α-glycan blot, showing a signal only for g1 when all glycosylation components are present.
Figure 13B:
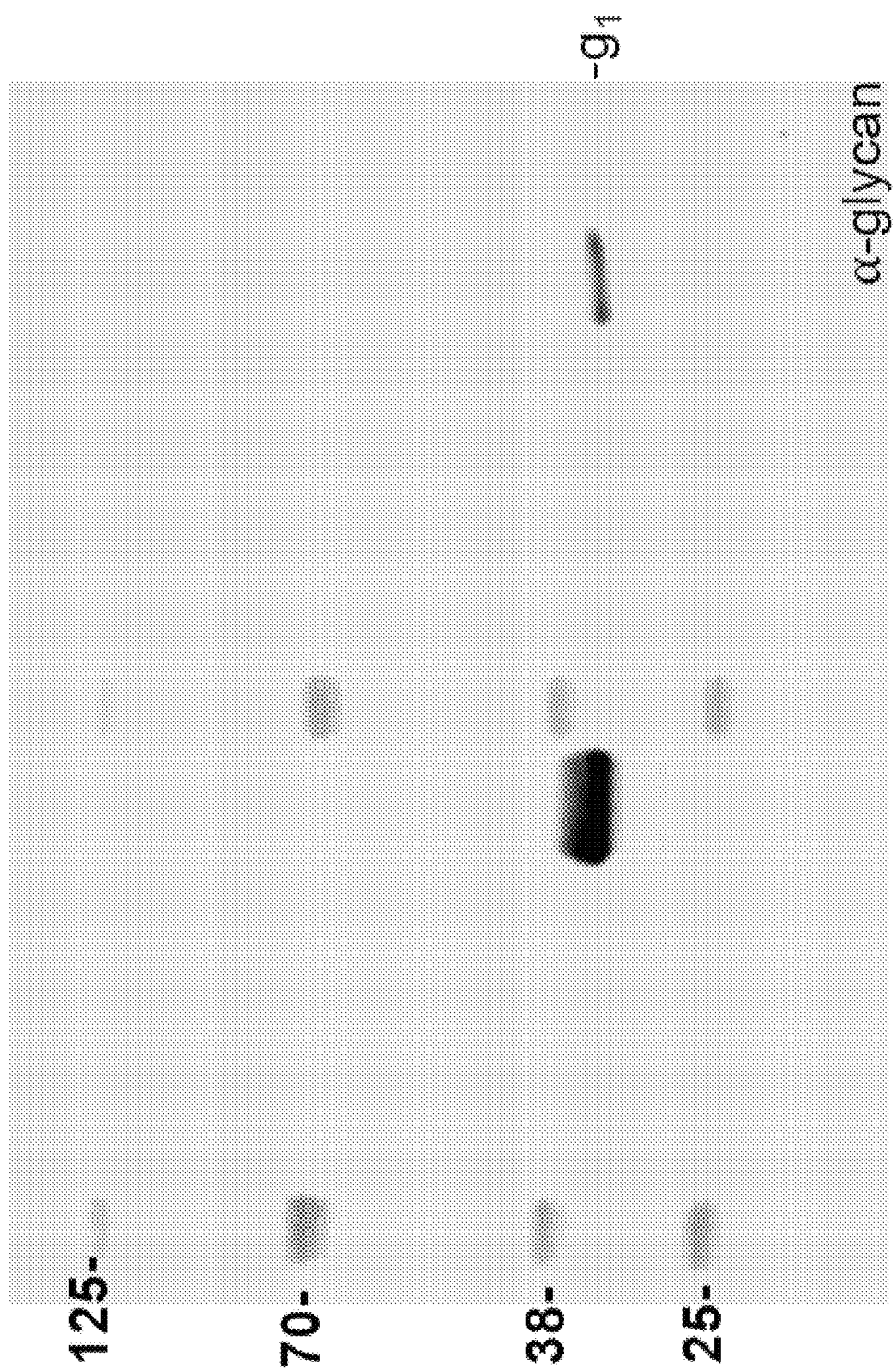
Figure 14A:
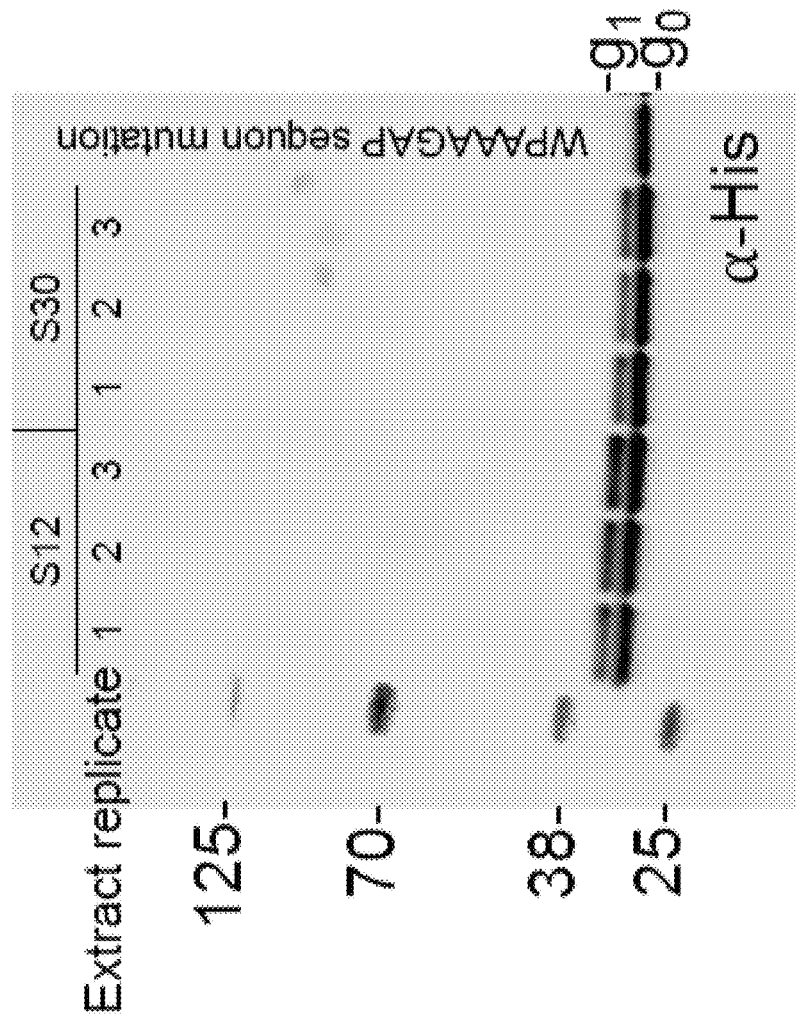
FIGS. 14A-14C. Characterization of O-linked glycosylation in CFGpS extracts. (A) α-His Western blot of PglO CFGpS reactions run with 20 minute CFPS times and (B) corresponding α-glycan blot. (C) Percent of acceptor protein converted to glycoprotein. Error bars represent standard deviation of analyzing three independent CFGpS reactions.
Figure 14B:
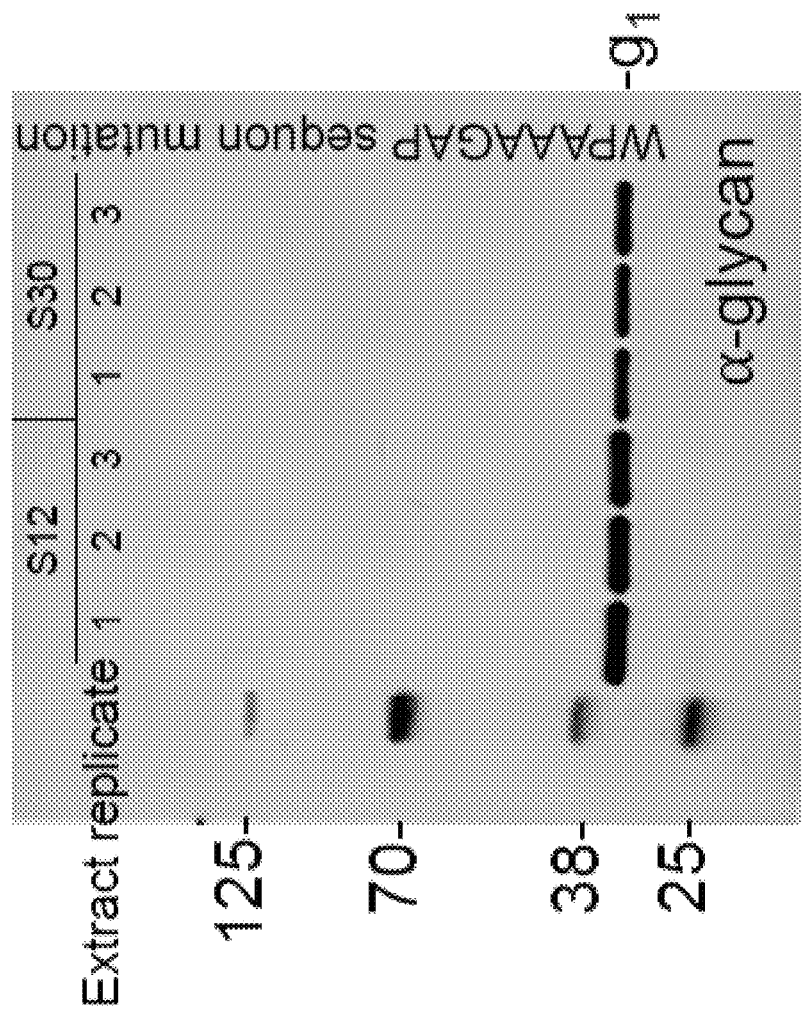
Figure 14C:
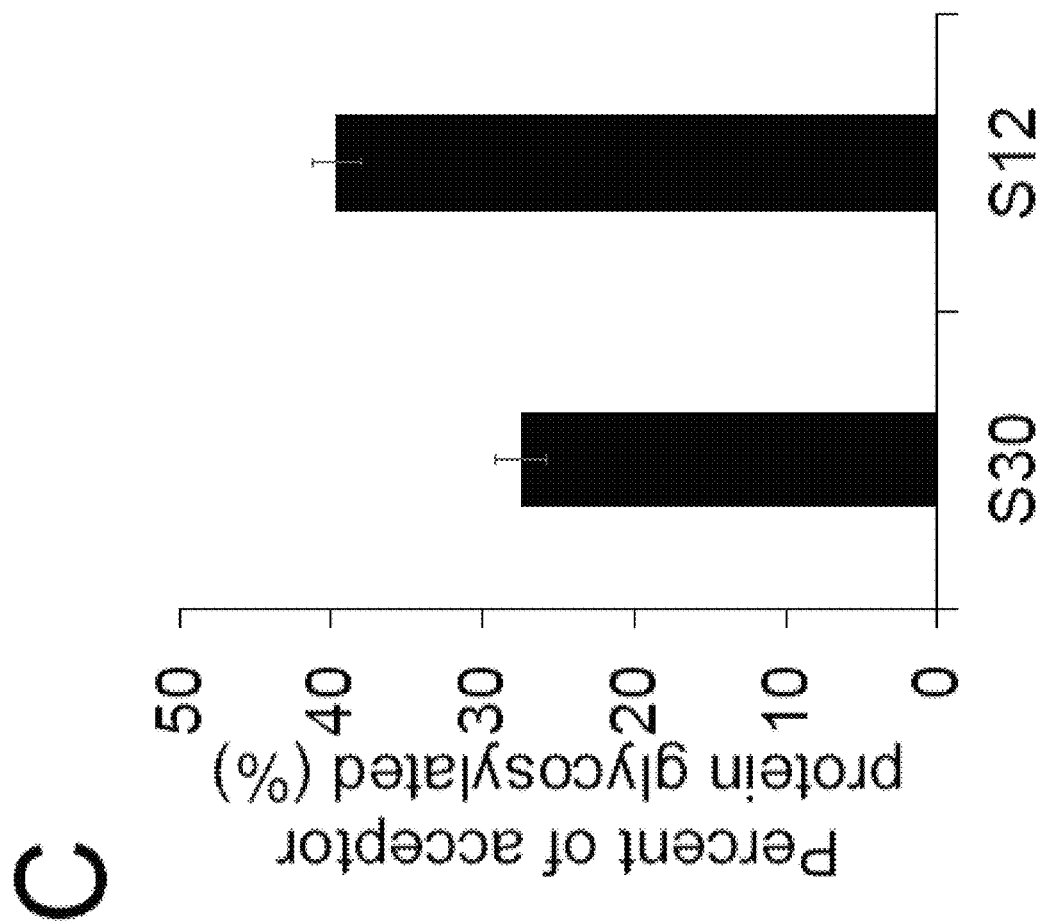

With a long-term interest in synthesizing diverse glycoproteins in cell-free systems, we next ported an O-linked glycosylation system, known to have broad glycan specificity, into the CFGpS platform[61,68,69]. We selected the O-OST PglO from *Neisseria gonorrhoeae* which accepts the *C. jejuni* heptasaccharide LLO as a donor but differs from PglB in acceptor sequence preferences[70]. FIG. 4B and FIG. 4D insets show sequons for PglB and PglO, respectively. For PglO, we used an sfGFP-fusion acceptor protein containing a recently determined 8 amino acid minimum optimal O-linked recognition site (termed 'MOOR')[70]. We confirmed residue-specific O-linked glycosylation and enrichment of PglO and LLO in vesicles (FIG. 13, FIG. 11B). As in PglB-mediated CFGpS, we observed increased endpoint glycoprotein yield and % glycosylation in reactions charged with S12 extracts. Specifically, reactions with CFPS times of 20 minutes resulted in a 68% increase in glycoprotein yield and an increase from 27% to 40% glycosylation in reactions with S12 extracts compared to those containing S30 extracts (FIG. 4D, FIG. 14). Corresponding blots are shown in FIG. 4E and FIG. 14A-14B. Taken together, these results indicate that improvements to glycosylation in S12 extracts translate from the N-linked glycosylation system to the O-linked glycosylation system.

Discussion

In this work, we set out to benchmark, understand, and quality-control protein-enriched vesicles in CFE extracts for expanding and enhancing functionality. We showed that upstream extract processing can be used to tune concentrations of vesicles and associated cargo from the periplasm. Then, we applied this knowledge to improve cell-free glycoprotein synthesis. Our results have several key features.

First, the nanocharacterization tools used here allowed us to quantify intact vesicle numbers and sizes in CFE extracts. This is important because this knowledge informed design rules for enhancing vesicle concentrations and functionality from their associated protein cargo in cell-free systems. Notably, the effective vesicle surface area calculated from NTA measurements (~0.3 $m^2$ membrane/mL extract), is consistent with values calculated from phospholipid concentrations in similar extracts[15].

Second, our results offer insights into field-wide observations and limitations of *E. coli*-based CFE systems. For example, it is well-documented that lysis protocols can profoundly impact CFE productivity[71]. Our findings show that lysis methods impact size distributions of vesicles generated during this step which affect the membrane environment of the machinery necessary for oxidative phosphorylation and ATP regeneration. Since vesicles are key for activating cost-effective energy metabolism from oxidative phosphorylation in CFE, routine vesicle characterization could become a vital quality-control check, leading to improved reproducibility in and between labs[72]. Our results also offer insight into why, despite the presence of vesicles in the *E. coli* CFE system, CFE-derived membrane proteins cannot be synthesized via insertion into native vesicles without additional vesicle supplementation[2,19,21]. With ~6 nM of intact vesicles in CFE reactions (estimated from NTA measurements), the concentration of vesicles is orders of magnitude lower than typical protein titers produced in our CFE extracts (~30 µM of reporter protein or higher).

Third, our work opens the door to engineering systems that rely on enriched membrane-bound components. We show that membrane-bound proteins and lipid-linked oligosaccharides expressed in vivo in the periplasm can be enriched in vesicles, indicating that a population of vesicles is derived from the periplasmic membrane[73,74]. Based on proteomic identification of both outer- and inner-membrane proteins in typical S30 extracts, and the presence of endotoxin in *E. coli* extracts[75], we hypothesize that multiple orientations and compositions (e.g., in/everted and inner/outer membrane) of vesicles may exist. Parsing out these details will require future characterization. Additionally, our workflow easily interfaces with additives that change or alter membrane properties (e.g., composition, size, fluidity, curvature) that could be added to the lysis buffer to tune the biophysical features of vesicles to further improve recombinant enzyme activity[19]. And, while we focus entirely on *E. coli*-based systems here, the reported characterization methods could, in principle, be extended to further optimize insect and CHO-based CFE systems that rely on ER-derived microsomes to perform glycosylation, embed nascent membrane proteins, and perform other membrane-dependent functions.

Looking forward, we anticipate that our work will accelerate efforts to manufacture proteins that require membrane-dependent modifications, such as glycoproteins. For example, the approach described enables N-linked glycoprotein synthesis yields of >100 µg/mL, which increases accessibility for on-demand vaccine production in resource-limited settings. Further, the S12 prep does not require a high-speed centrifuge and is less time-intensive than the base case, simplifying the CFGpS platform. Taken together, our results pave the way for efficient, accessible CFE systems that require membrane-bound activities for expanding system functionality and enabling a variety of synthetic biology applications.

Methods

Extract preparation. The chassis strain used for all extracts was CLM24[48]. Source strains were grown in 1 L of 2×YTPG media at 37° C. with agitation. Cells were grown to OD 3, then harvested by centrifugation (5000×g, 4° C., 15 min). For overexpression of proteins in vivo, CLM24 source strains were grown at 37° C. in 2×YTPG with the appropriate antibiotic(s). Cells were induced with 0.02% (w/v %) L-arabinose at OD 0.6-0.8, shifted to 30° C., and harvested at OD 3. All subsequent steps were carried out at 4° C. and on ice unless otherwise stated. Pelleted cells were washed 3 times in S30 buffer (10 mM Tris acetate pH 8.2, 14 mM magnesium acetate, 60 mM potassium acetate). After the last wash, cells were pelleted at 7000×g for 10 min, flash-frozen and stored at −80° C. After growth and harvest, cells were thawed and resuspended to homogeneity in 1 mL of S30 buffer per gram of wet cell mass. For homogenization, cells were disrupted using an Avestin EmulsiFlex-B15 high-pressure homogenizer at 20,000-25,000 psig with a single pass (Avestin, Inc. Ottawa, ON, Canada). For sonication, input energy was calculated using an empirical correlation as described previously[28] Cells were sonicated on ice using a Q125 Sonicator (Qsonica, Newtown, CT) with a 3.175 mm diameter probe at a frequency of 20 kHz and 50% of amplitude. Energy was delivered to cells in pulses of 45 s followed by 59 s off until the target energy was delivered. Cells were lysed and clarified in triplicate. For S30 prep, lysed cells were centrifuged twice at 30,000×g for 30 min; supernatant was transferred to a fresh tube for each spin. Supernatants were incubated with 250 rpm shaking at 37° C. for 60 min for runoff reactions. Following runoff, lysates were centrifuged at 15,000×g for 15 min. Supernatants were collected, aliquoted, flash-frozen, and stored at −80° C. for further use. For S12 prep, lysed cells were centrifuged once at 12,000×g for 10 min; supernatants were collected and subjected to runoff reactions as described above. Following runoff, lysates were centrifuged at 10,000×g for 10 min at 4° C. Supernatants were collected, aliquoted, flash-frozen in liquid nitrogen, and stored at −80° C.

Dynamic light scattering (DLS) and nanoparticle tracking analysis (NTA) measurements. DLS measurements were performed on a Zetasizer Nano ZS (Malvern Instruments Ltd., UK) with a measurement angle of 1730 in disposable cuvettes (Malvern Instruments Ltd., UK ZEN0040). All measurements were collected in triplicate for 13 scans per measurement. Refractive index and viscosity were obtained from the instrument's parameter library. The instrument's 'General Purpose' setting was used to calculate intensity and number particle size distributions. For DLS of crude extracts, extracts were diluted 1:10 with 0.1 m filtered PBS before analysis. For purified vesicle samples, elutions were analyzed directly without dilution.

NTA measurements were performed on a Nanosight NS300 using a 642 nm red laser (Malvern Instruments Ltd., UK). Samples were diluted to manufacturer-recommended particle concentrations in sterile PBS until a linear trend between dilution factor and concentration measured was found. Samples were flowed into the cell, and the instrument was focused according to manufacturer recommendations. Measurements were collected at room temperature, using a 1 mL syringe and a syringe pump infusion rate of 30 (arbitrary units). Data for each sample was collected in 5 separate 1 min videos, under continuous flow conditions. Mean particle diameters and particle concentrations were obtained from aggregate Nanosight experiment reports of each run, then averaged across triplicates and corrected for dilution factor.

Transmission electron microscopy. For cryo-TEM measurement, 200 mesh Cu grids with a lacey carbon membrane (EMS Cat. #LC200-CU) were placed in a Pelco easiGlow glow discharger (Ted Pella Inc., Redding, CA, USA) and an atmosphere plasma was introduced on the surface of the grids for 30 seconds with a current of 15 mA at a pressure of 0.24 mbar. This treatment creates a negative charge on the carbon membrane, allowing for aqueous liquid samples to spread evenly over of the grid. 4 µL of sample was pipetted onto the grid and blotted for 5 seconds with a blot offset of +0.5 mm, followed by immediate plunging into liquid ethane within a FEI Vitrobot Mark III plunge freezing instrument (Thermo Fisher Scientific, Waltham, MA, USA). Grids were then transferred to liquid nitrogen for storage. The plunge-frozen grids were kept vitreous at −172° C. in a Gatan Cryo Transfer Holder model 626.6 (Gatan Inc., Pleasanton, CA, USA) while viewing in a JEOL JEM1230 LaB6 emission TEM (JEOL USA, Inc., Peabody, MA) at 120 keV. Image data was collected by a Gatan Orius SC1000 CCD camera Model 831 (Gatan Inc., Pleasanton, CA, USA). Image analysis was done using Image J.

Western blotting and densitometry analyses. SDS-PAGE was run using NuPAGE 4-12% Bis-Tris protein gels with MOPS-SDS buffer (Thermo Fisher Scientific, USA). After electrophoresis, proteins were transferred from gels to Immobilon-P polyvinylidene difluoride 0.45 m membranes (Millipore, USA) according to manufacturer's protocol. Membranes were blocked in either Odyssey or Intercept blocking buffer (LI-COR, USA). α-FLAG blots of membrane proteins were probed using α-FLAG antibody (Abcam 2493) as the primary. α-His blots were probed with 6×His-antibody (Abcam, ab 1187) as the primary. For α-glycan blots, hR6 serum from rabbit that binds to the native C. jejuni glycan was used as the primary probe[2]. A fluorescent goat α-Rabbit IgG IRDye 680RD (LI-COR, USA) was used as the secondary for all blots. Blots were imaged using a LI-COR Odyssey Fc (LI-COR Biosciences, USA). Densitometry was preformed using Image Studio Lite software to measure band intensity. Fluorescence background was subtracted from blots before determining band intensities. For determining membrane protein enrichment (S12/S30), band intensities of membrane proteins for three independent S12 extract replicates and three independent S30 replicates were measured for each protein. The rounded averages of triplicate ratios (S12/S30) and associated error are reported as enrichment in FIG. 3. For determining glycoprotein yields from CFGpS reactions, band intensities for glycosylated and aglycosylated bands were obtained from independent, triplicate reactions. The fraction of glycosylated protein and associated standard deviations were calculated via band intensities. To obtain glycoprotein yields, the average fraction glycosylated was multiplied by average total protein yield as calculated from sfGFP fluorescence described below.

Lipid dye staining and fluorescence immunostaining of vesicles. All reagents used for immunostaining and SEC were sterile filtered with a 0.1 m filter (Millex-VV Syringe Filter, Merck Millipore Ltd. or Rapid-Flow Filter, Nalgene). To determine vesicle elution fractions, extract was probed with FM 4-64 lipid dye (Life Technologies), a lipophilic styrene dye that has low fluorescence in aqueous solution and becomes brightly fluorescent upon incorporation into membranes. FM-464 dye preferentially stains the inner membrane of E. coli, but has been used to dye the outer membrane as well[76,77]. FM 4-64 lipid dye was prepared in stock solutions at 10 mg/mL in 100% DMSO, then diluted 1,000-fold in nuclease free water before use. 80 μL of extract, 10 μL 10×PBS, and 10 μL of FM 4-64 were mixed to a final concentration of 1 ng dye/μL. Samples were incubated with dye in the dark for 10 mins at 37° C. prior to SEC. To verify the presence of glycosylation components in vesicles, we probed for the LLO with a red fluorescent soybean agglutinin (SBA) lectin, a protein complex which specifically binds to the C. jejuni LLO[67], and for PglB with an orthogonal green fluorescent α-FLAG antibody as described above. For α-FLAG immunostaining and SBA staining, 90 μL extract and 10 μL of 10×PBS were mixed with 2 μL of α-FLAG-DyLight 488 (Invitrogen, MA191878D488) and 4 μL of SBA-AlexaFluor™ 594 (Invitrogen, 32462). Antibody and SBA were incubated with extract in the dark with agitation overnight at 4° C. prior to SEC.

Size exclusion chromatography (SEC) of vesicles. 100 μL of extract mixture (stained with lipid dye or antibody) was flowed over a size exclusion chromatography column with PBS. Elution fractions were collected into a clear polystyrene 96-well plate (Costar 3370, Corning Inc., USA) at a rate of 0.4 min/well using a Gilson FC 204 Fraction Collector (Gilson, Inc., USA). Poly-Prep chromatography columns (Bio-Rad, USA) were packed with 8 mL of Sepharose 4B resin 45-165 μm bead diameter, (Sigma Aldrich, USA) and washed with sterile PBS 3 times before use. Elution fluorescence was measured using a Synergy H1 microplate reader (Biotek, USA). Excitation and emission wavelengths for SBA-AlexaFluor™ 594 were 590 and 617 nm, respectively. Excitation and emission wavelengths for α-FLAG-DyLight 488 were 493 and 528 nm, respectively. Vesicles stained with FM 4-64 lipid dye were used to determine the characteristic vesicle elution fraction. Reference samples probed with FM 4-64 were used to determine the characteristic vesicle elution fraction in each experiment. For plots, each curve was background subtracted and normalized to the highest RFUs measured for each respective fluorescent elution profile.

CFE reactions. Protein synthesis was carried out with a modified PANOx-SP system in triplicate reactions, with each reaction containing a uniquely-prepared extract[71]. Specifically, 1.5 mL microcentrifuge tubes (Axygen, MCT-150-C) were charged with 15 μL reactions containing 200 ng pJL1-sfGFP plasmid, 30% (v/v %) extract and the following: 6 mM magnesium glutamate (Sigma, 49605), 10 mM ammonium glutamate (MP, 02180595), 130 mM potassium glutamate (Sigma, G1501), 1.2 mM adenosine triphosphate (Sigma A2383), 0.85 mM guanosine triphosphate (Sigma, G8877), 0.85 mM uridine triphosphate (Sigma U6625), 0.85 mM cytidine triphosphate (Sigma, C1506), 0.034 mg/mL folinic acid, 0.171 mg/mL E. coli tRNA (Roche 10108294001), 2 mM each of 20 amino acids, 30 mM phosphoenolpyruvate (PEP, Roche 10108294001), 0.4 mM nicotinamide adenine dinucleotide (Sigma N8535-15VL), 0.27 mM coenzyme-A (Sigma C3144), 4 mM oxalic acid (Sigma, P0963), 1 mM putrescine (Sigma, P5780), 1.5 mM spermidine (Sigma, S2626), and 57 mM HEPES (Sigma, H3375). To gauge extract CFE productivity, reactions were carried out for 20 hours at 30° C.

GFP fluorescence assay. The activity of cell-free-derived sfGFP was determined using an in-extract fluorescence analysis as described previously[48]. Briefly, 2 μL of cell-free reaction product was diluted into 48 μL of Ambion nanopure water (Invitrogen, USA). The solution was then placed in a Costar 96-well black assay plate (Corning, USA). Fluorescence was measured using a Synergy H1 microplate reader (Biotek, USA). Excitation and emission wavelengths for sfGFP fluorescence were 485 and 528 nm, respectively.

Cell-free glycoprotein synthesis (CFGpS) reactions. For crude extract-based expression of glycoproteins, a two-phase scheme was implemented as previously described[48]. In this work, protein synthesis was carried out as described above at 15 μL in PCR strip tubes (Thermo Scientific AB-2000) with 50 ng template DNA. Reactions were supplemented with the plasmids encoding permissible or non-permissible sequons on sfGFP acceptor proteins. pJL1-sfGFP-DQNAT-His (permissible) and pJL1-sfGFP-AQNAT-His (non-permissible) were used for PglB-mediated glycosylation; pJL1-sfGFP-MOOR-His (permissible) and pJL1-sfGFP-MOOR$_{mut}$-His (non-permissible) were used for PglO-mediated glycosylation. Reactions were set up in triplicate on ice, with each reaction containing a uniquely-prepared extract. CFPS time was measured as the time at which reactions were moved to 30° C. to the time when reactions were spiked with MnCl$_2$. In the second phase, protein glycosylation was initiated by the addition of MnCl$_2$ at a final concentration of 25 mM. In addition to MnCl$_2$ (Sigma 63535), either 0.1% (w/v %) DDM (Anatrace, D310S) or 100 mM sucrose was supplemented to PglB or PglO reactions, respectively. Glycosylation proceeded at 30° C. for 16 hrs. After glycosylation, GFP fluorescence was used to quantitate the total amount of acceptor protein synthesized, and Western blots were used to calculate the fraction of glycosylated and aglycosylated proteins.

Estimation of vesicle membrane area. The equation below was used to calculate vesicle surface area (m$^2$/mL), where R$_{ave}$ is average vesicle radius (m), C is concentration of particles measured by NTA (particles/mL).

$$\text{vesicle surface area} = 4 * \pi * (R_{ave})^2 * C$$

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. A method of synthesizing and glycosylating a target protein in a cell-free glycoprotein synthesis (CFGpS) reaction in vitro, the method comprising:
   contacting an expression vector encoding the target protein to an *Escherichia coli* (*E. coli*) cell S12 homogenized lysate, wherein the *E. coli* cells are engineered to express heterologous glycosylation machinery:
   i) transcribing and translating the target protein in the *E. coli* S12 homogenized lysate; and
   ii) glycosylating the target protein in the *E. coli* S12 homogenized lysate,
   wherein the lysate comprises membrane vesicles enriched in the heterologous glycosylation machinery as compared to an S30 *E. coli* homogenized lysate, or an S12 or S30 sonicated *E. coli* lysate.

2. The method of claim 1, wherein the glycosylation machinery A comprises one or more proteins selected from PglB, PglO, STT3, NarX, PR and CB1.

3. The method of claim 1, wherein the glycosylation machinery comprises a transmembrane oligosaccharyltransferase selected from PglB, PglO, and STT3.

* * * * *